United States Patent
Mukai et al.

(10) Patent No.: US 12,068,546 B2
(45) Date of Patent: Aug. 20, 2024

(54) ANTENNA DEVICE AND ELECTRONIC APPARATUS

(71) Applicant: Murata Manufacturing Co., Ltd., Nagaokakyo (JP)

(72) Inventors: Tsuyoshi Mukai, Nagaokakyo (JP); Hiromitsu Ito, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 311 days.

(21) Appl. No.: 17/683,403

(22) Filed: Mar. 1, 2022

(65) Prior Publication Data

US 2022/0190478 A1 Jun. 16, 2022

Related U.S. Application Data

(63) Continuation of application No. PCT/JP2020/034075, filed on Sep. 9, 2020.

(30) Foreign Application Priority Data

Sep. 10, 2019 (JP) .................. 2019-164548
Jan. 22, 2020 (JP) .................. 2020-008158

(51) Int. Cl.
*H04B 5/26* (2024.01)
*H01Q 1/22* (2006.01)
(Continued)

(52) U.S. Cl.
CPC ............. *H01Q 7/00* (2013.01); *H01Q 1/2208* (2013.01); *H01Q 1/38* (2013.01)

(58) Field of Classification Search
CPC .......... H01Q 7/00; H01Q 1/2208; H01Q 1/38; H04B 5/43; H04B 5/263; G06K 19/077; H02J 50/12
See application file for complete search history.

(56) References Cited

U.S. PATENT DOCUMENTS 6,137,447 A * 10/2000 Saitoh ................ G06K 7/10336
343/742
2014/0168019 A1 6/2014 Hirobe et al.
(Continued)

FOREIGN PATENT DOCUMENTS

JP 09-98014 A 4/1997
JP 2013-138404 A 7/2013
(Continued)

OTHER PUBLICATIONS

Official Communication issued in International Patent Application No. PCT/JP2020/034075, mailed on Nov. 2, 2020.

*Primary Examiner* — David E Lotter
(74) *Attorney, Agent, or Firm* — Keating & Bennett, LLP

(57) ABSTRACT

An antenna device includes first and second coils. A portion of the first coil overlaps a coil opening of the second coil, and a portion of the second coil overlaps a coil opening of the first coil. The first coil includes a first coil conductor on a first surface of a base material and a first coil conductor on a second surface. The first coil includes a single-layer portion in which the first coil conductor is only on the first surface of the base material, and the second coil conductor intersects the first coil conductor at a portion facing the single-layer portion on the second surface of the base material.

20 Claims, 52 Drawing Sheets

(51) Int. Cl.
*H01Q 1/38* (2006.01)
*H01Q 7/00* (2006.01)

(56) References Cited

U.S. PATENT DOCUMENTS

2018/0254552 A1* 9/2018 Ito .......................... H01Q 7/06
2019/0385787 A1* 12/2019 Ichikawa ............ H01F 27/2876
2019/0393604 A1   12/2019 Ichikawa

FOREIGN PATENT DOCUMENTS

| WO | 2017/094355 A1 | 6/2017 |
| WO | 2017/094466 A1 | 6/2017 |
| WO | 2017/119215 A1 | 7/2017 |
| WO | 2019/163675 A1 | 8/2019 |
| WO | 2019/176636 A1 | 9/2019 |

* cited by examiner

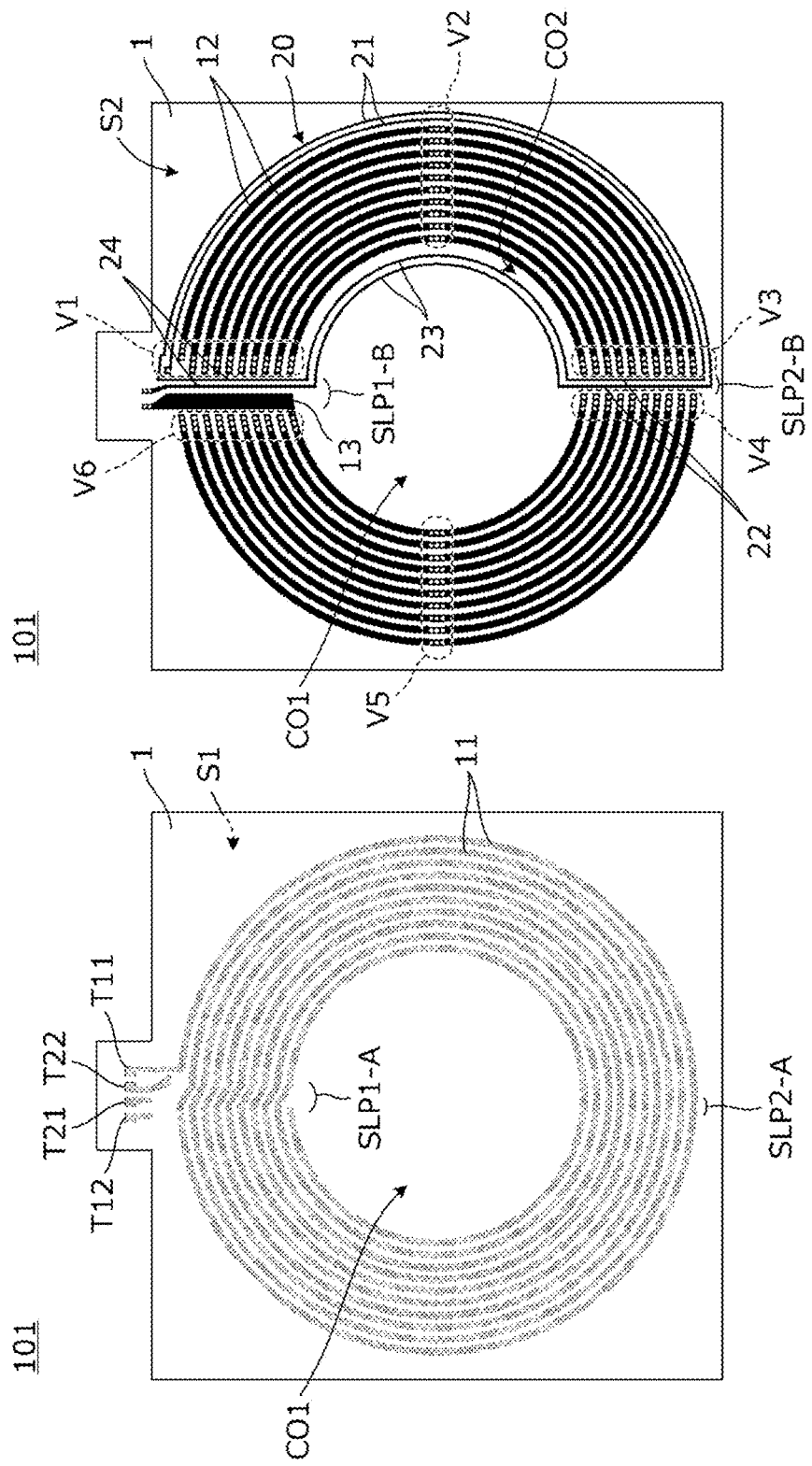

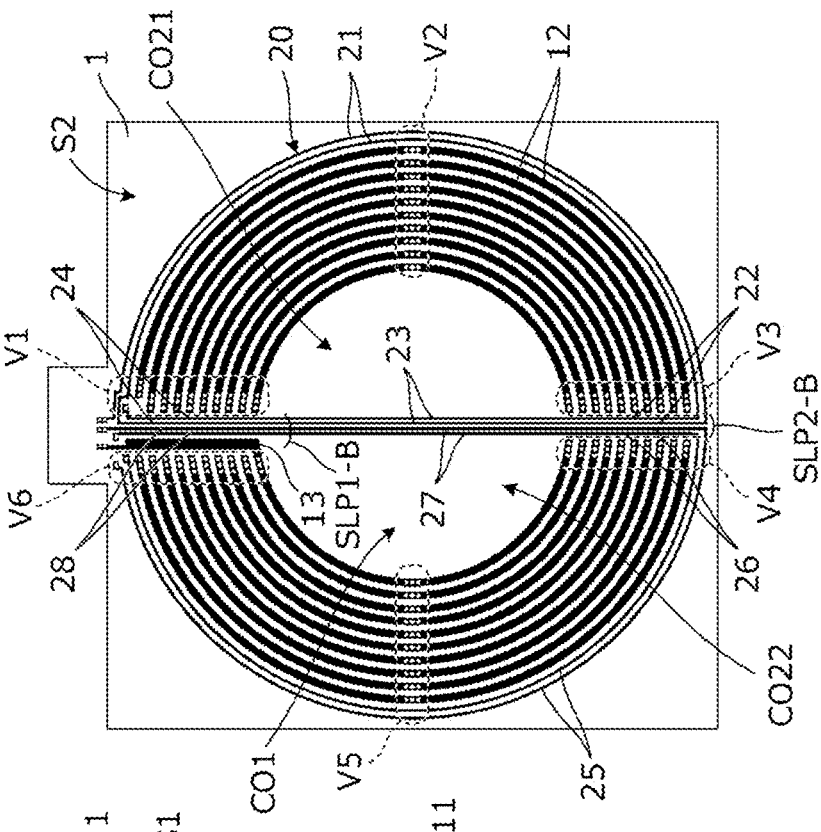
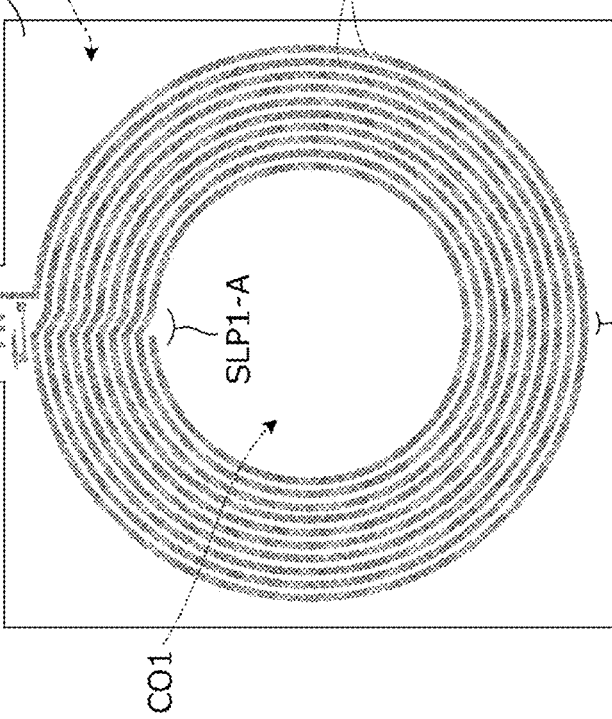

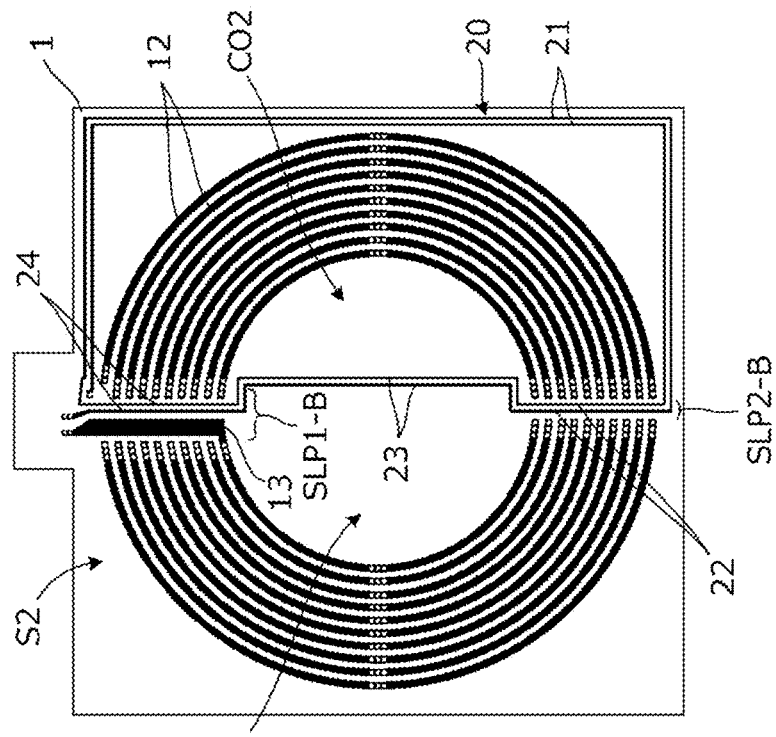
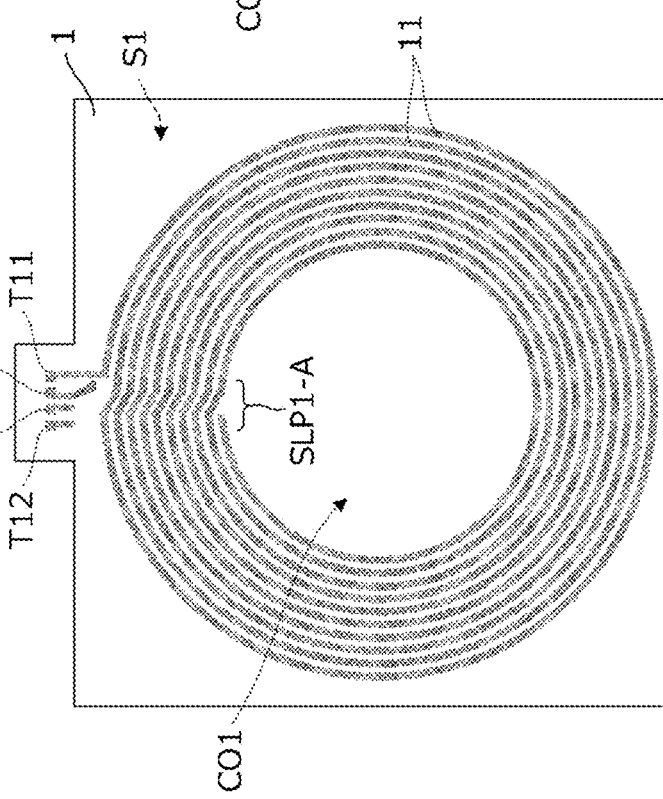

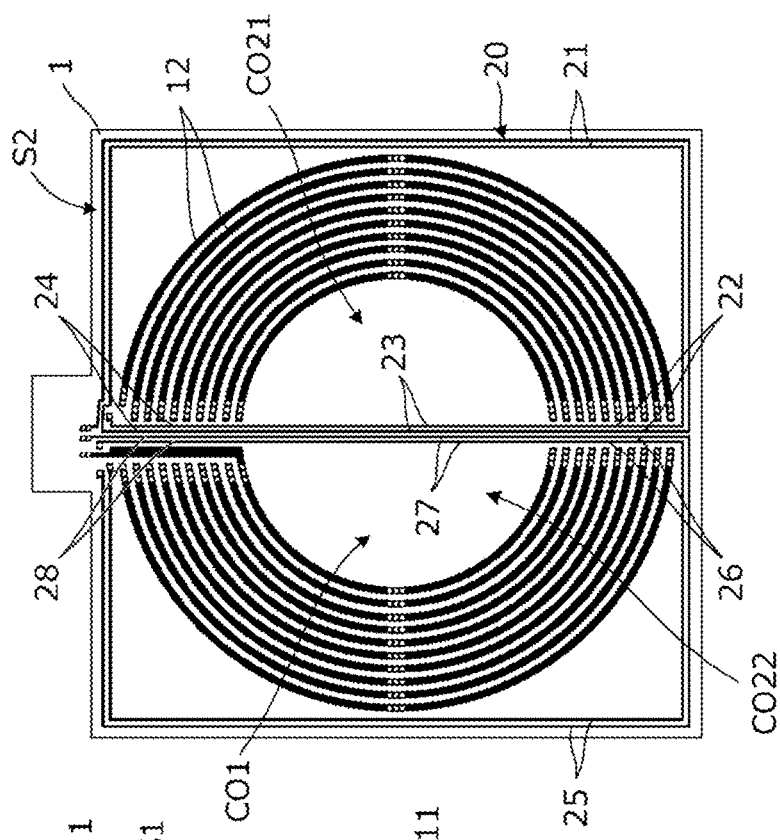
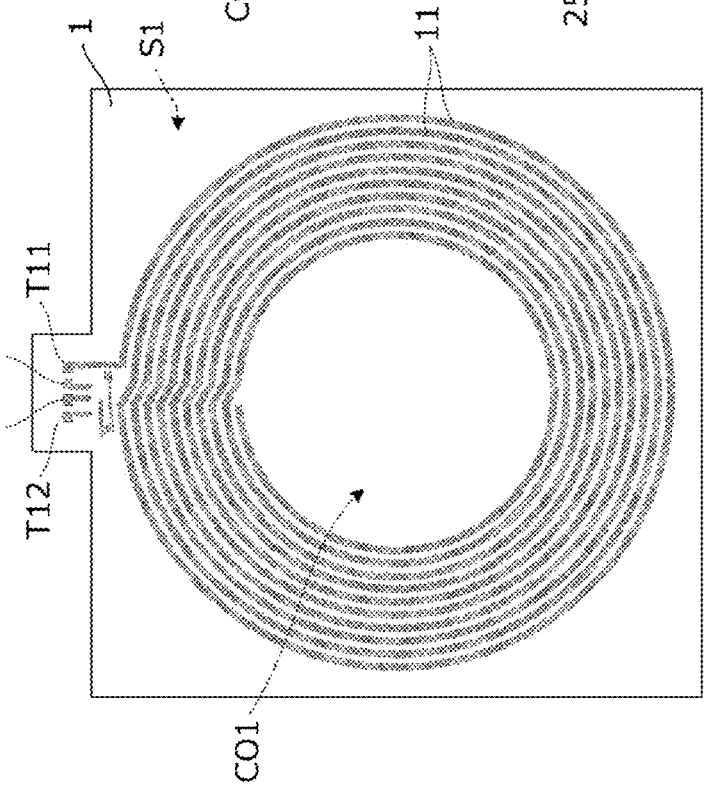

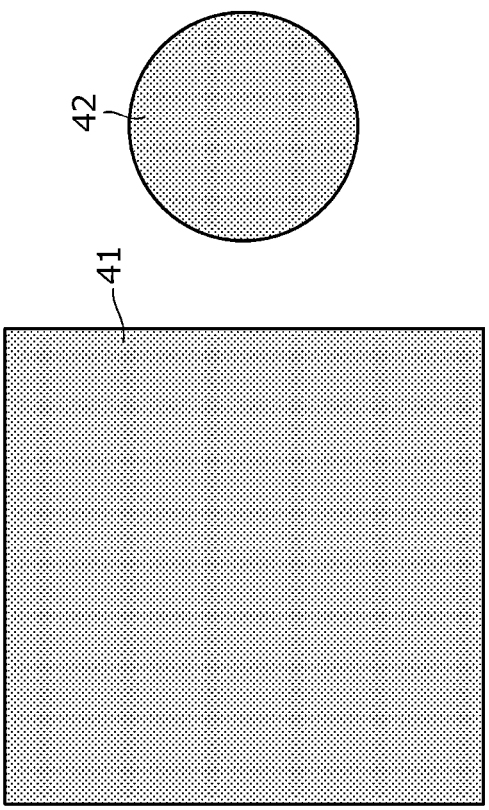

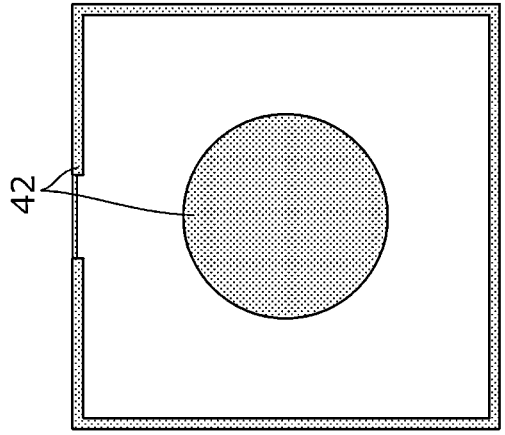
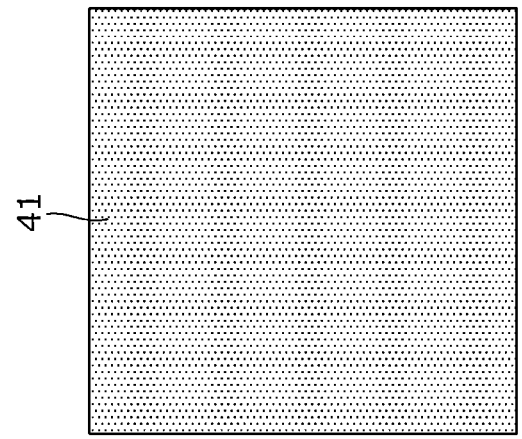
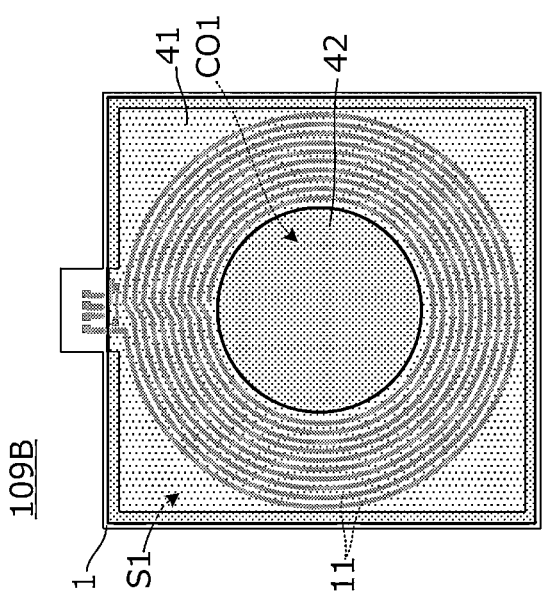

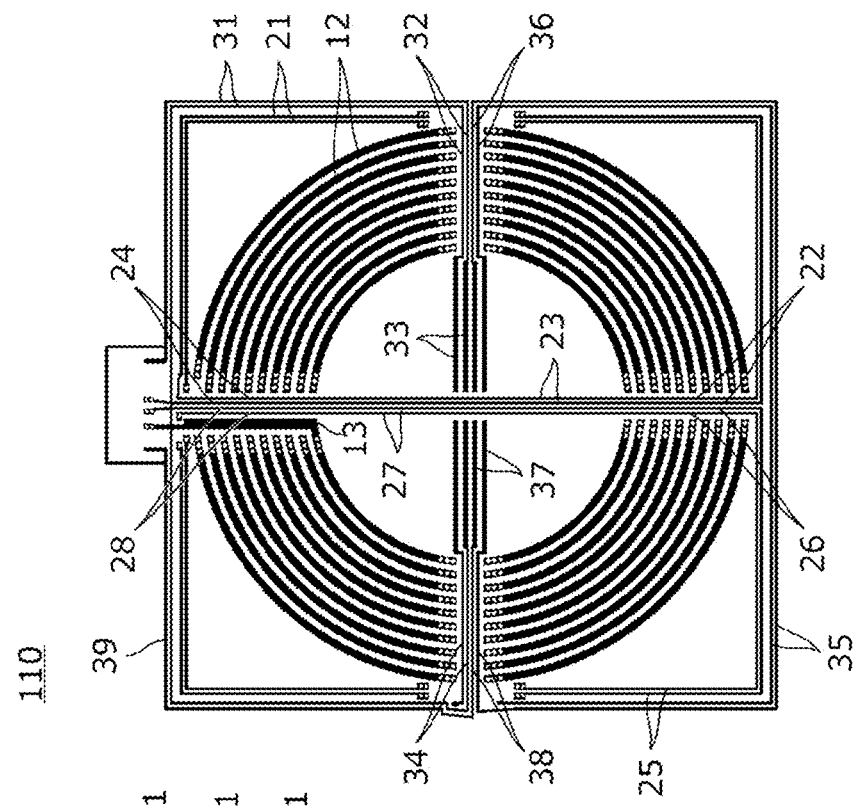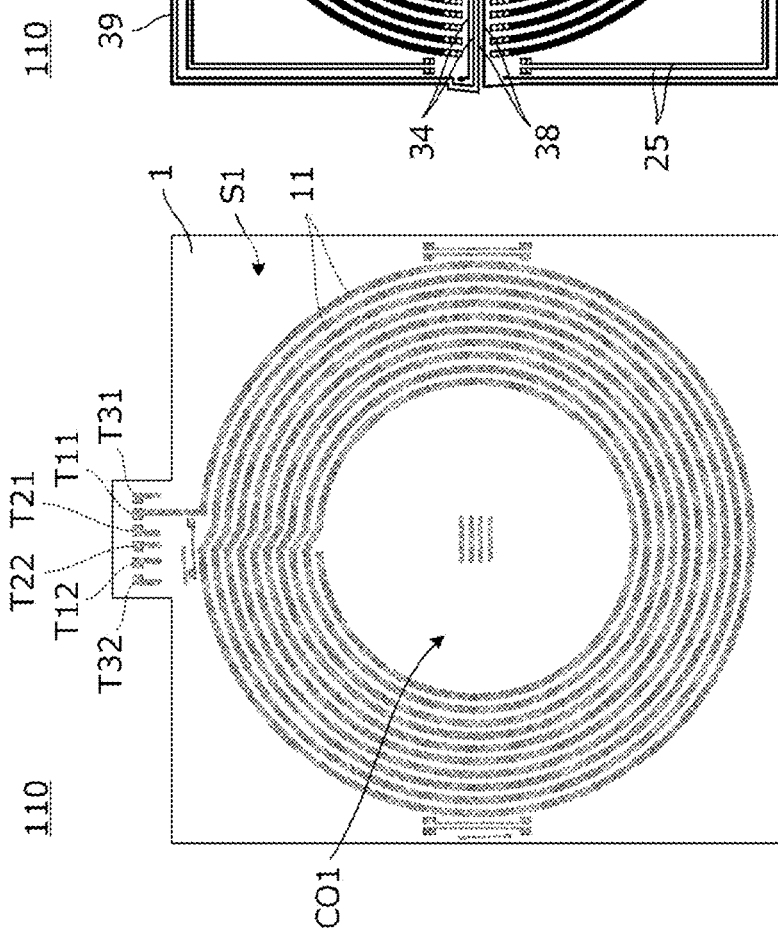

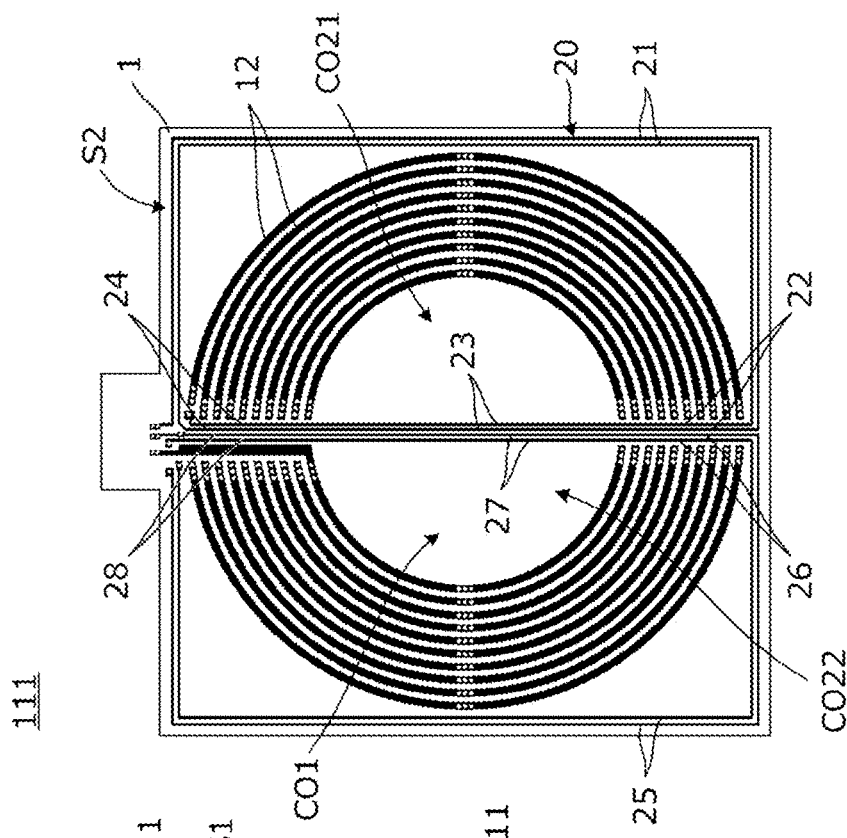

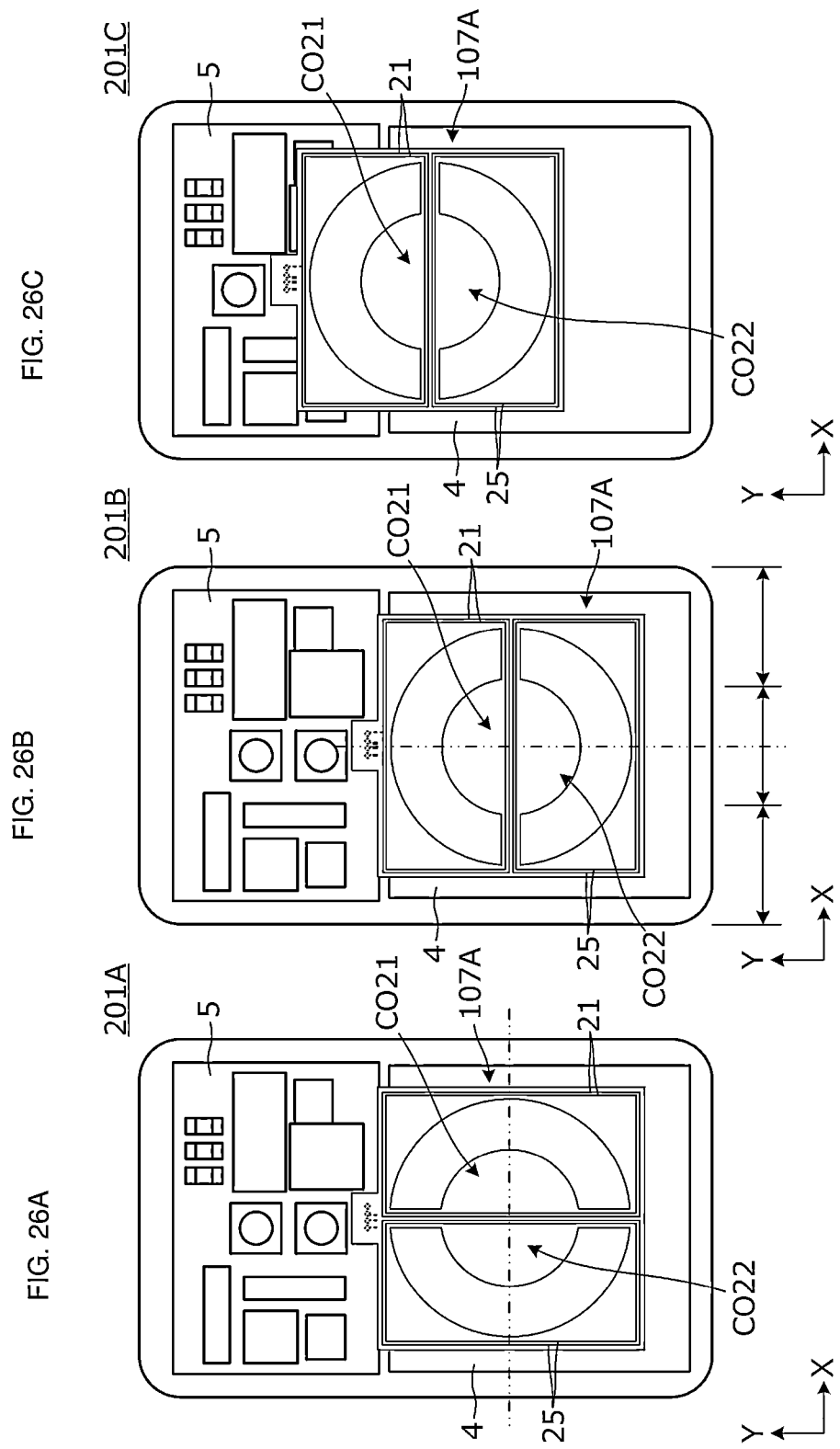

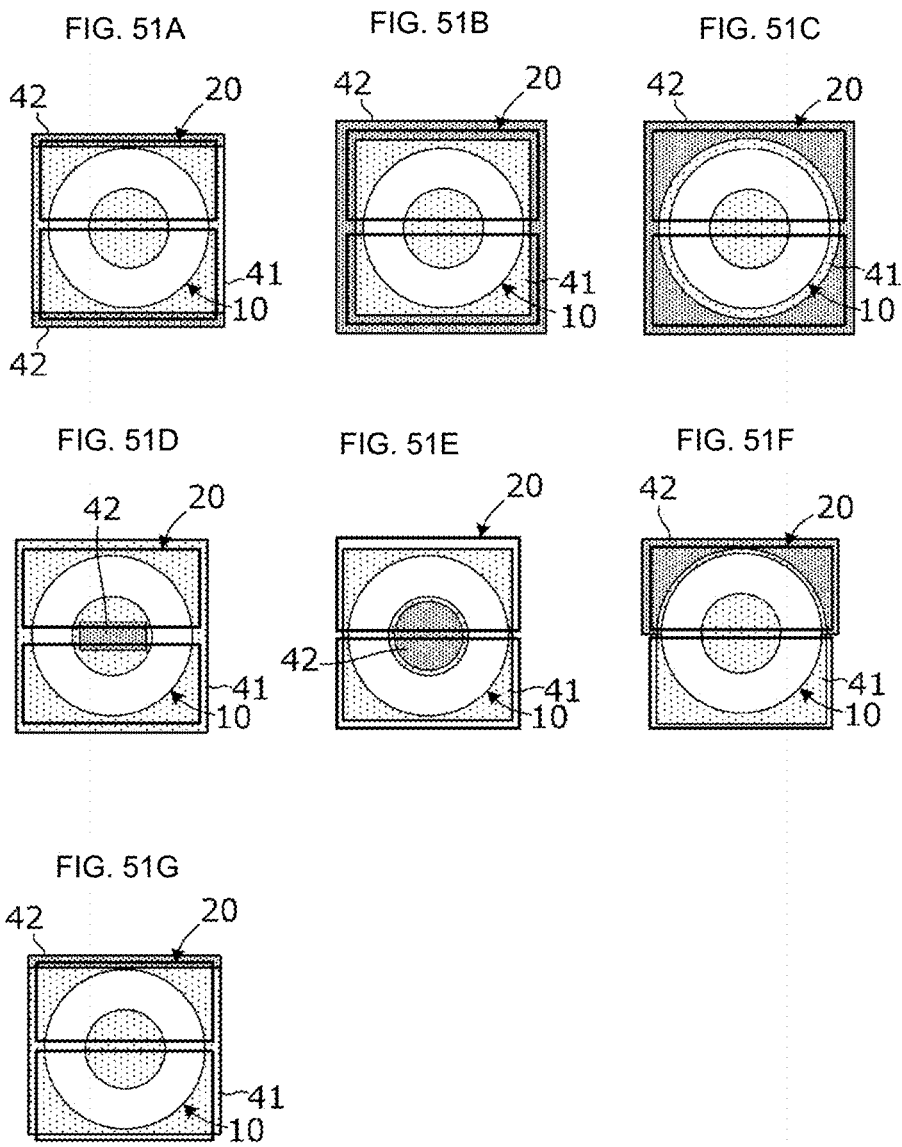

ANTENNA DEVICE AND ELECTRONIC APPARATUS

CROSS REFERENCE TO RELATED APPLICATIONS

This application claims the benefit of priority to Japanese Patent Application No. 2019-164548 filed on Sep. 10, 2019 and Japanese Patent Application No. 2020-008158 filed on Jan. 22, 2020, and is a Continuation Application of PCT Application No. PCT/JP2020/034075 filed on Sep. 9, 2020. The entire contents of each application are hereby incorporated herein by reference.

BACKGROUND OF THE INVENTION

1. Field of the Invention

The present invention relates to an antenna device including antennas to be used in a plurality of systems, and an electronic apparatus including the antenna device.

2. Description of the Related Art

International Publication No. 2017/094355 discloses a device in which a coil to be used as an antenna for wireless power transmission and a coil to be used as an antenna for short-range communication are configured in one module. In this device, a coil for a wireless power transmission device and a coil for short-range communication are formed on substantially the same plane, and the two coils are not unnecessarily coupled. Therefore, although two coils are provided, the overall size is reduced, and an electronic apparatus including the antenna device is also reduced in size.

The antenna device described in International Publication No. 2017/094355 has the following problems.

When a second coil for a second system is provided inside a first coil for a first system, obtaining the described performance of an antenna for the second system is difficult because the second coil for the second system can be provided only in a limited region. That is, the sizes of the first coil for the first system and the second coil for the second system are each restricted.

In a case where the first coil for the first system and the second coil for the second system overlap each other and intersect each other in a lamination direction, since the intersecting portion becomes thick, it is not possible to reduce the thickness as a whole.

SUMMARY OF THE INVENTION

Preferred embodiments of the present invention provide miniaturized antenna devices and electronic apparatuses each including such antenna devices by reducing restrictions on a size of each of a first coil for a first system and a second coil for a second system or by reducing or preventing an increase in thickness due to overlapping of the first coil and the second coil.

An antenna device according to a preferred embodiment of the present invention includes a base material including a first surface and a second surface opposed to each other, a first coil on the base material and including a first coil conductor and a coil opening, and a second coil on the base material and including a second coil conductor and a coil opening. A portion of the first coil overlaps the coil opening of the second coil in a plan view with respect to the base material, a portion of the second coil overlaps the coil opening of first coil in the plan view with respect to the base material, the first coil conductor is on the first surface and the second surface, the first coil includes a portion in which the first coil conductor on the first surface and the first coil conductor on the second surface overlap each other in the plan view with respect to the base material, the first coil includes a first single-layer portion and a second single-layer portion in which the first coil conductor on the first surface and the first coil conductor on the second surface do not overlap each other in the plan view with respect to the base material and the first coil conductor is only on the first surface of the base material, and a portion at which the second coil conductor intersects the first coil conductor is a portion of the second surface facing the first single-layer portion and a portion of the second surface facing the second single-layer portion in the plan view with respect to the base material.

An electronic apparatus according to a preferred embodiment of the present invention includes an antenna device according to a preferred embodiment of the present invention, and a first system circuit and a second system circuit connected to the antenna device.

According to preferred embodiments of the present invention, it is possible to obtain miniaturized antenna devices and electronic apparatuses each including such antenna devices in each of which a restriction on the size of each of a first coil for a first system and a second coil for a second system is reduced, or an increase in thickness due to overlapping of the first coil and the second coil is reduced or prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 8A and 8B are plan views illustrating a specific configuration of the antenna device 102 according to the second preferred embodiment of the present invention.

FIGS. 9A and 9B are plan views illustrating an antenna device 103A according to a third preferred embodiment of the present invention.

FIGS. 10A and 10B are plan views illustrating another antenna device 103B according to the third preferred embodiment of the present invention.

FIG. 17A is a plan view of an antenna device 109A according to a ninth preferred embodiment of the present invention, FIG. 17B is a plan view of the first magnetic body 41 included in the antenna device 109A, and FIG. 17C is a plan view of a second magnetic body 42 included in the antenna device 109A.

FIG. 18A is a plan view of another antenna device 109B according to the ninth preferred embodiment of the present invention, FIG. 18B is a plan view of the first magnetic body 41 included in the antenna device 109B, and FIG. 18C is a plan view of the second magnetic body 42 included in the antenna device 109B.

FIGS. 22A and 22B are plan views illustrating a specific configuration of the antenna device 110 according to the tenth preferred embodiment of the present invention.

FIGS. 23A and 23B are plan views illustrating an antenna device 111 according to an eleventh preferred embodiment of the present invention.

FIGS. 26A to 26C are plan views illustrating an internal configuration of an electronic apparatus according to a thirteenth preferred embodiment of the present invention.

FIGS. 49A to 49H are schematic plan views of another antenna device according to the twenty-ninth preferred embodiment of the present invention.

FIGS. 51A to 51G are schematic plan views of another antenna device according to the twenty-ninth preferred embodiment of the present invention.

DETAILED DESCRIPTION OF THE PREFERRED EMBODIMENTS

Figure 1:
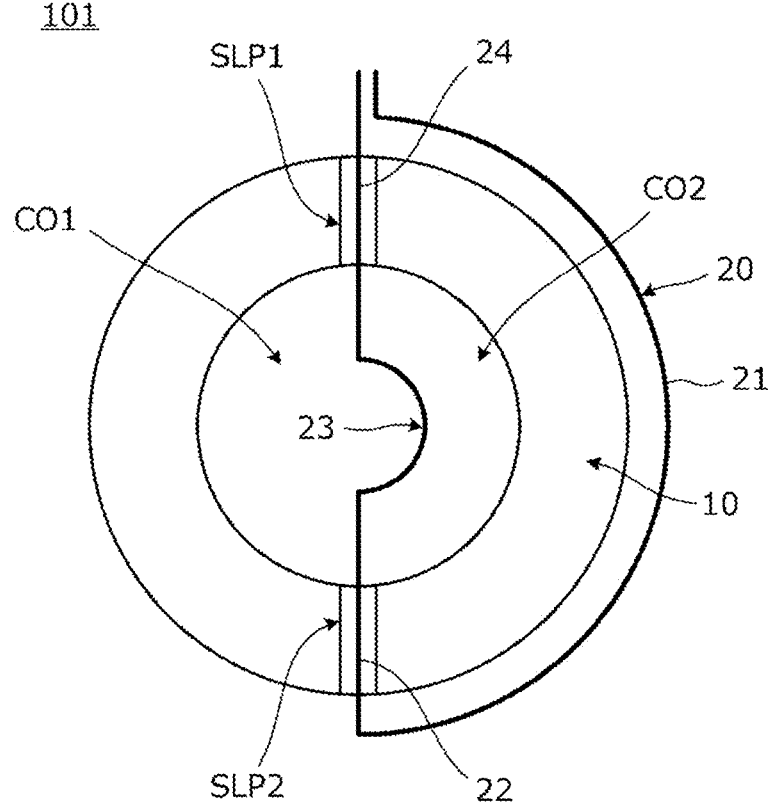
FIG. 1 is a plan view illustrating an antenna device 101 according to a first preferred embodiment of the present invention.

Hereinafter, preferred embodiments of the present invention will be described with reference to the accompanying drawings by describing specific examples. In the drawings, the same or corresponding portions and elements are denoted by the same reference numerals. In consideration of the description of the main points or ease of understanding, the preferred embodiments are illustrated separately for convenience, but partial replacement or combination of configurations illustrated in different preferred embodiments is possible. In the second and subsequent preferred embodiments, description of matters common to the first preferred embodiment will be omitted, and only different points will be described. In particular, the same operations and advantageous effects of the same or corresponding configuration will not be sequentially described for each preferred embodiment.

An "antenna device" described in each preferred embodiment is an antenna device to be used in a "wireless transmission system". Here, the "wireless transmission system" is a system that performs wireless transmission by magnetic field coupling with a transmission partner (an antenna of an external device). The "transmission" includes both transmission and reception of a signal and transmission and reception of power. In addition, the "wireless transmission system" includes both a short-range wireless communication system and a wireless power supply system. Since the antenna device performs wireless transmission by magnetic field coupling, a length of a current path of the antenna device, that is, a line length of a coil conductor described later is sufficiently smaller than a wavelength $\lambda$ at a frequency used for wireless transmission, and is equal to or less than about $\lambda/10$, for example. Therefore, the radiation efficiency of electromagnetic waves is low in the frequency band used for wireless transmission. Both ends of the coil conductor are connected to a feeding circuit, and a current with a uniform or substantially uniform magnitude flows through a current path of the antenna device, that is, through the coil conductor.

The "antenna device" described in each preferred embodiment can be applied to both a transmission (power transmission) side and a reception (power reception) side of a signal (or power). Even when the "antenna device" is described as an antenna that radiates magnetic flux, the antenna device is not limited to being a source of magnetic flux. Even when receiving the magnetic flux generated by the antenna device on the transmission partner side (interlinkage), that is, even when the transmission and reception are in the opposite relationship to each other, the same or substantially the operations and advantageous effects can be achieved.

In addition, NFC (Near Field Communication) is an example of short-range communication used in the "antenna device" according to each preferred embodiment. The frequency band used in short-range communication is, for example, the HF band, and in particular, the frequency band of 13.56 MHz and a vicinity thereof.

In addition, examples of a wireless power supply method used in the "antenna device" according to each preferred embodiment include a magnetic field coupling method such as an electromagnetic induction method and a magnetic field resonance method. As a wireless power supply standard of the electromagnetic induction method, for example, there is a standard "Qi (registered trademark)" developed by the WPC (Wireless Power Consortium). The frequency band used in the electromagnetic induction method is included in, for example, a range from about 110 kHz to about 205 kHz and a frequency band in the vicinity of this range. As a wireless power supply standard of the magnetic field resonance method, for example, there is a standard "AirFuel Resonant" developed by AirFuel (registered trademark) Alliance. The frequency band used in the magnetic field resonance method is, for example, the 6.78 MHz band or the 100 kHz band and a vicinity thereof.

In each preferred embodiment, an "electronic apparatus" refers to various electronic apparatuses, for example, mobile phone terminals such as smartphones and feature phones, wearable terminals such as smart watches and smart glasses, portable PCs such as notebook PCs and tablet PCs, information devices such as cameras, game machines, and toys, and information media such as IC tags, SD cards, SIM cards, and IC cards.

First Preferred Embodiment

FIG. 1 is a plan view illustrating an antenna device 101 according to a first preferred embodiment of the present invention. The antenna device 101 includes a first coil 10 including a first coil conductor and a first coil opening CO1 and a second coil 20 including a second coil conductor and a second coil opening CO2. Both the first coil 10 and the second coil 20 are provided on a base material, but illustration of the base material is omitted in FIG. 1.

The first coil 10 is to be used for power transmission by, for example, an electromagnetic induction method, and the second coil 20 is to be used, for example, for short-range communication.

The first coil 10 includes a first coil conductor wound a plurality of times in a spiral shape. The first coil conductor is provided on both surfaces of the base material, and the first coil conductor provided on the first surface of the base material and the first coil conductor provided on the second surface are connected in parallel through a via conductor. However, the first coil 10 includes a first single-layer portion SLP1 and a second single-layer portion SLP2 in which the first coil conductor is provided only on the first surface (a back surface of the paper surface in FIG. 1) of the base material.

The second coil 20 includes second coil conductors 21, 22, 23, and 24 provided on the second surface (a front surface of the paper surface in FIG. 1) of the above-described base material, and a semicircular or substantially semicircular pattern is defined by these second coil conductors 21 to 24.

A portion of the first coil 10 overlaps the second coil opening CO2 of the second coil 20 in a plan view with respect to the base material, and a portion of the second coil 20 overlaps the first coil opening CO1 of the first coil 10 in a plan view with respect to the base material.

The second coil 20 intersects the first coil conductor at a portion facing the first single-layer portion SLP1 and a portion facing the second single-layer portion SLP2 on the second surface of the base material. In the example illustrated in FIG. 1, the second coil conductor 22 is provided at a portion facing the second single-layer portion SLP2, and the second coil conductor 24 is provided at a portion facing the first single-layer portion SLP1.

Figure 2:
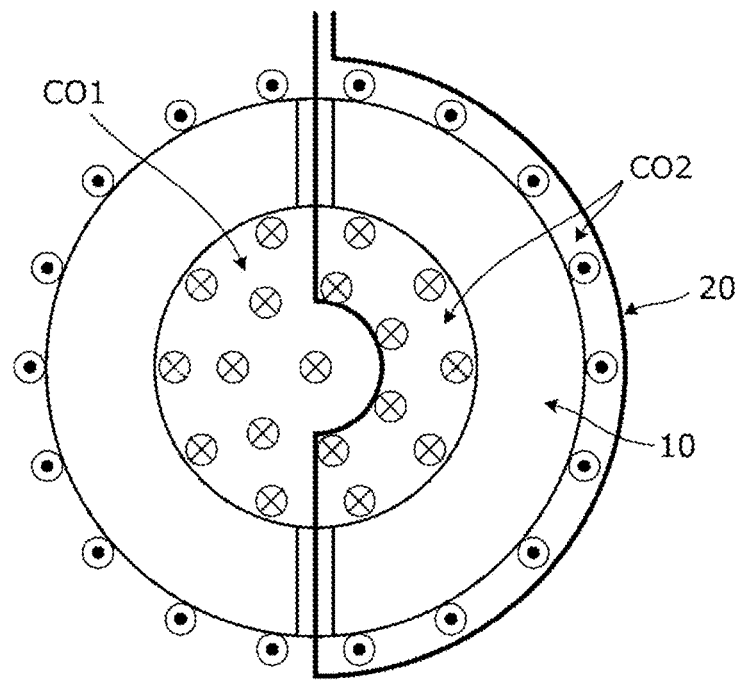
FIG. 2 is a diagram illustrating an example of a direction of a magnetic field passing through the inside and outside of a coil opening of a first coil 10 in the antenna device 101.

FIG. 2 is a diagram illustrating an example of a direction of a magnetic field passing through the inside and outside of the coil opening of the first coil 10 in the antenna device 101. In a phase in which a clockwise current flows through the first coil 10, the magnetic flux going from the front surface to the back surface of the paper surface is generated in the first coil opening CO1 of the first coil 10, and the magnetic flux going from the back surface to the front surface of the paper surface is generated in an outer side portion of the first coil 10. A portion of the magnetic flux (first magnetic flux) going through the first coil opening CO1 of the first coil 10 goes through the second coil opening CO2 of the second coil 20, and a portion of the magnetic flux (second magnetic fluxes) passing the outer side portion of the first coil 10 goes through the second coil opening CO2 of the second coil 20.

Since the first magnetic flux and the second magnetic flux have polarities opposite to each other in a plan view of the first surface of the base material, magnetic field coupling between the first coil 10 and the second coil 20 is reduced or prevented. When the first magnetic flux and the second magnetic flux are equal or substantially equal, the coupling coefficient between the first coil 10 and the second coil 20 is extremely low.

Figure 3:
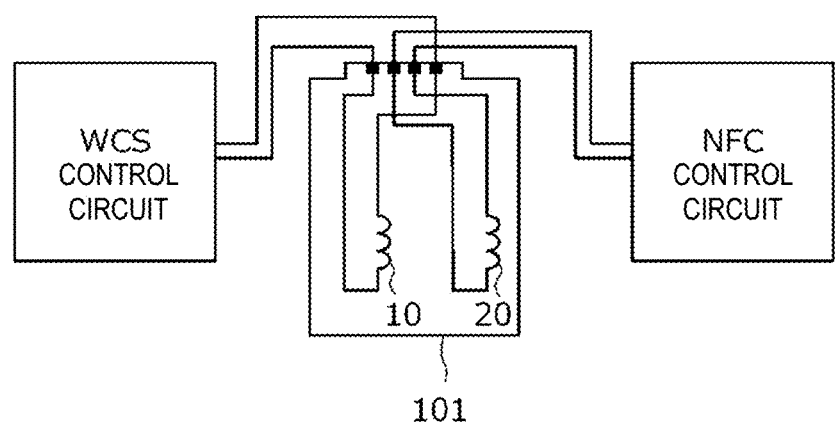
FIG. 3 is a circuit diagram illustrating a connection state of two circuits with respect to the antenna device 101.

FIG. 3 is a circuit diagram illustrating a connection state of two circuits to the antenna device 101. The first coil 10 of the antenna device 101 is connected to the wireless charging control circuit, and the second coil 20 of the antenna device 101 is connected to the NFC control circuit. The wireless charging control circuit charges the secondary battery with power received by the first coil 10. The NFC control circuit performs short-range communication via the second coil 20. In the present preferred embodiment, since the coupling coefficient between the first coil 10 and the second coil 20 is low, they are electromagnetically independent from each other and do not interfere with each other. Therefore, wireless charging control and NFC control are performed independently.

Figure 4F:
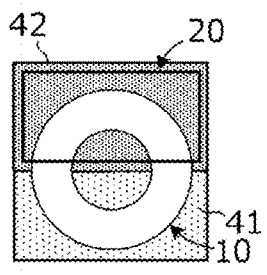
FIGS. 4A and FIG. 4B are plan views illustrating a specific configuration of the antenna device 101 according to the first preferred embodiment of the present invention.
Figure 49G:
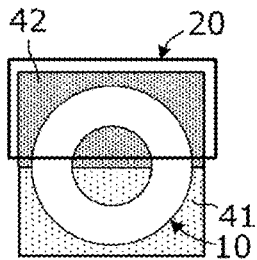
Figure 49H:
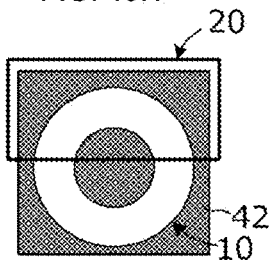
Figure 50A:
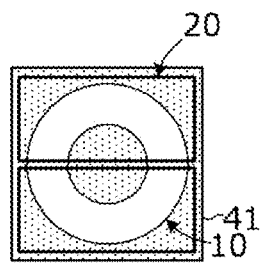
FIGS. 50A to 50G are schematic plan views of another antenna device according to the twenty-ninth preferred embodiment of the present invention.
Figure 50B:
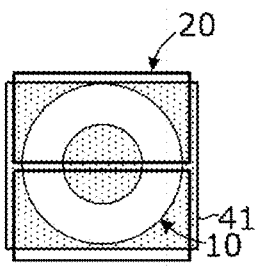
Figure 50C:
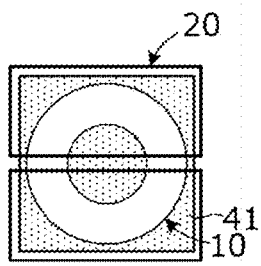
Figure 50D:
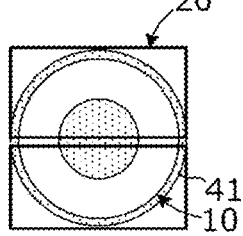
Figure 50E:
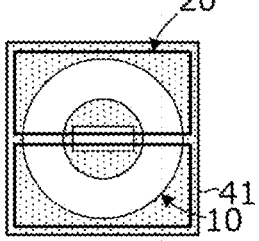
Figure 50F:
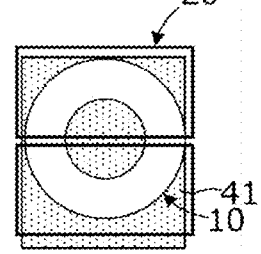
Figure 50G:
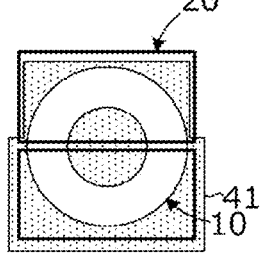

FIGS. 4A and 4B are plan views illustrating a specific configuration of the antenna device 101 according to the first preferred embodiment. FIG. 4A is a diagram illustrating a conductor pattern provided on the first surface S1 of a base material 1, and FIG. 4B is a diagram illustrating a conductor pattern provided on the second surface S2 of the base material 1. A spiral first coil conductor 11 wound a plurality of times is provided on the first surface S1 of the base material 1, which is the back surface side of the paper surface. A spiral first coil conductor 12 wound a plurality of times is provided on the second surface S2 of the base material 1, which is the front surface side of the paper surface. In FIG. 4A, for the sake of clarity of the drawing, the conductor pattern provided on the first surface S1 of the base material 1 is represented by a gray solid line instead of a broken line. The same applies to other preferred embodiments described below.

The first coil conductor 11 and the first coil conductor 12 are connected by a plurality of via conductors at a plurality of locations. Regions V1, V2, V3, V4, V5, and V6 illustrated in FIG. 4B are formation regions of the via conductors. The first coil conductor 11 and the first coil conductor 12 are electrically connected to each other in parallel through the plurality of via conductors. As a result, the conductor resistance of the first coil 10 (see FIG. 1) is reduced or prevented.

An outer peripheral end of the first coil 10 (an outer peripheral end of the first coil conductor 11) is connected to a first coil terminal T11. An inner peripheral end of the first coil 10 (an inner peripheral end of the first coil conductor 12) is electrically connected to one end of an extended conductor 13, and the other end of the extended conductor 13 is connected to a first coil terminal T12 located outside the first coil through the via conductor. Here, the extended conductor 13 extends from the inner peripheral end of the first coil to the outside of the first coil.

The second coil 20 includes the second coil conductors 21, 22, 23, and 24 and has a semicircular or substantially semicircular shape with two turns. An inner peripheral end of the second coil 20 is connected to a second coil terminal T21 through the via conductor. An outer peripheral end of the second coil 20 is connected to a second coil terminal T22 through the via conductor.

The positions of a first single-layer portion SLP1-A and a second single-layer portion SLP2-A on the first surface S1 illustrated in FIG. 4A correspond to the positions of a first single-layer portion SLP1-B and a second single-layer portion SLP2-B on the second surface S2 illustrated in FIG. 4B, respectively.

Similarly to the example illustrated in FIG. 1, the second coil 20 intersects the first coil conductor 11 at the first single-layer portions SLP1-A and SLP1-B and the second single-layer portions SLP2-A and SLP2-B. That is, the second coil conductor 22 is provided in the second single-layer portions SLP2-A and SLP2-B, and the second coil conductor 24 is provided in the first single-layer portions SLP1-A and SLP1-B. In addition, the extended conductor 13 is also provided in the first single-layer portions SLP1-A and SLP1-B and faces the first coil conductor 11.

Figure 5A:
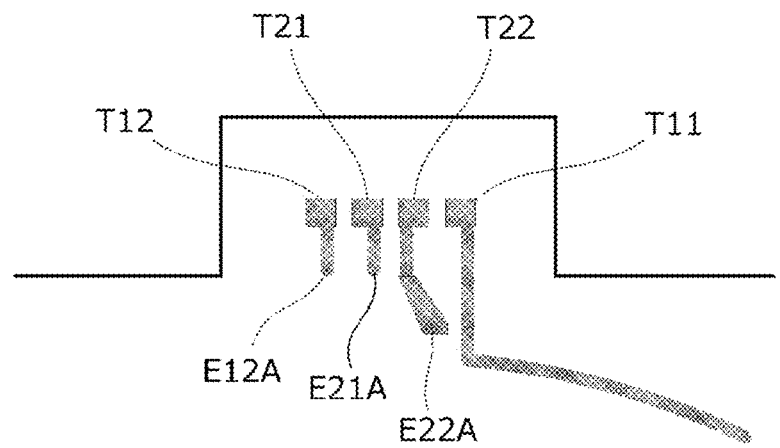
FIGS. 5A and 5B are partially enlarged plan views of the antenna device 101.
Figure 5B:
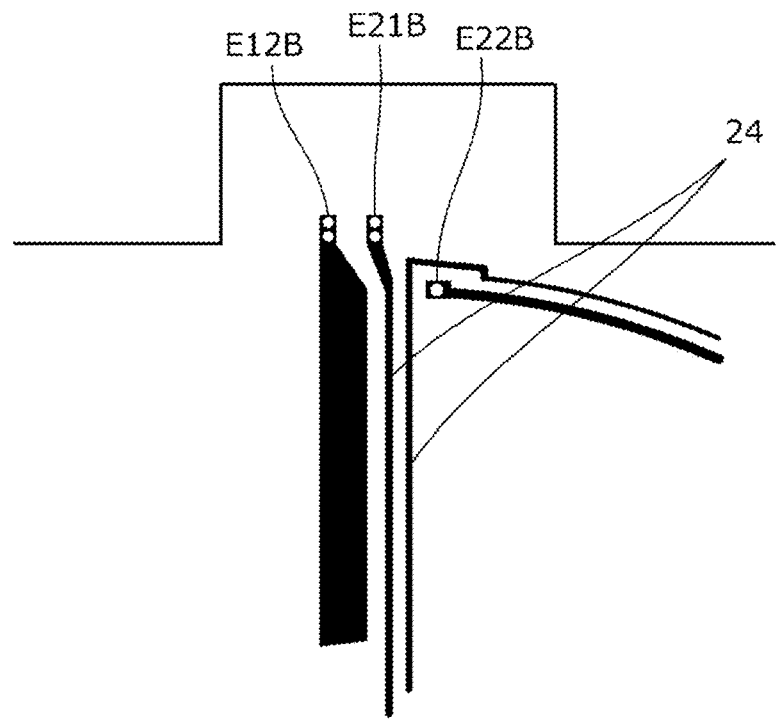

FIGS. 5A and 5B are partially enlarged plan views of the antenna device 101. FIG. 5A is an enlarged view in the vicinity of the first coil terminals T11 and T12 and the second coil terminals T21 and T22 provided on the first surface S1, and FIG. 5B is an enlarged view of each conductor pattern provided on the second surface S2. An electrode E12A and an electrode E12B are electrically connected to each other through the via conductor. Similarly, an electrode E21A and an electrode E21B, and an electrode E22A and an electrode E22B are electrically connected to each other through the via conductor, respectively.

According to the present preferred embodiment, since it is not necessary to locate the second coil 20 only in the coil opening of the first coil 10, the size limitations of the first coil 10 and the second coil 20 are reduced. That is, since both the first coil 10 and the second coil 20 can be large, an antenna device having predetermined antenna characteristics and an electronic apparatus including the antenna device can be obtained without increasing the overall size.

Further, according to the present preferred embodiment, since the portions at which the first coil 10 and the second coil 20 intersect each other are the single-layer portions SLP1-A, SLP1-B, SLP2-A, and SLP2-B, and since the extended conductor 13 is also provided at a portion facing the first single-layer portions SLP1-A and SLP1-B, an increase in overall thickness is avoided, and a miniaturized antenna device and an electronic apparatus including the antenna device are obtained. In addition, since the second coil conductor 24 and the extended conductor 13 are provided in the same first single-layer portions SLP1-A and SLP1-B, it is possible to prevent an increase in the number of single-layer portions and to reduce or prevent an increase in the resistance and through-holes of the first coil 10.

Second Preferred Embodiment

In a second preferred embodiment of the present invention, an example of an antenna device including a plurality of coil openings as coil openings defined by a second coil conductor will be described.

Figure 6:
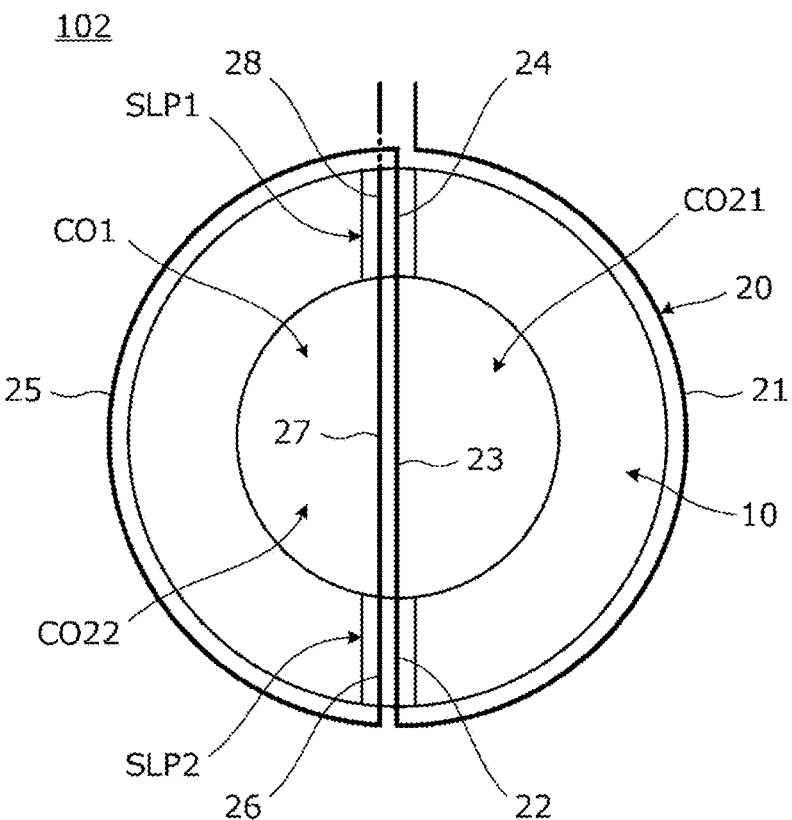
FIG. 6 is a plan view illustrating an antenna device 102 according to a second preferred embodiment of the present invention.

FIG. 6 is a plan view illustrating an antenna device 102 according to the second preferred embodiment. The antenna device 102 includes the first coil 10 including a first coil conductor and the first coil opening CO1, and the second coil 20 including a second coil conductor and second coil openings CO21 and CO22. Although both of the first coil 10 and the second coil 20 are provided on a base material, illustration of the base material is omitted in FIG. 6.

The first coil 10 includes a first coil conductor wound a plurality of times in a spiral shape. The first coil conductor is provided on both surfaces of the base material, and the first coil conductor provided on the first surface of the base material and the first coil conductor provided on the second surface are connected in parallel through a via conductor. However, the first coil 10 includes the first single-layer portion SLP1 and the second single-layer portion SLP2 in which the first coil conductor is provided only on the first surface (the back surface of the paper surface in FIG. 6) of the base material.

The second coil 20 has the second coil conductors 21, 22, 23, and 24, and second coil conductors 25, 26, 27, and 28 provided on the second surface (the front surface of the paper surface in FIG. 6) of the base material, and these second coil conductors 21 to 28 defines a substantially figure-eight or cc shape pattern.

A portion of the first coil 10 overlaps the second coil opening CO21 of the second coil 20 in a plan view with respect to the base material, and a portion of the second coil 20 overlaps the first coil opening CO1 of the first coil 10 in a plan view with respect to the base material. In addition, a portion of the first coil 10 overlaps the second coil opening CO22 of the second coil 20 in a plan view with respect to the base material, and a portion of the second coil 20 overlaps the first coil opening CO1 of the first coil 10 in a plan view with respect to the base material.

The second coil 20 intersects the first coil conductor at a portion facing the first single-layer portion SLP1 and a portion facing the second single-layer portion SLP2 on the second surface of the base material. In the example illustrated in FIG. 6, the second coil conductors 22 and 26 are provided at a portion facing the second single-layer portion SLP2, and the second coil conductors 24 and 28 are provided at a portion facing the first single-layer portion SLP1.

Figure 7:
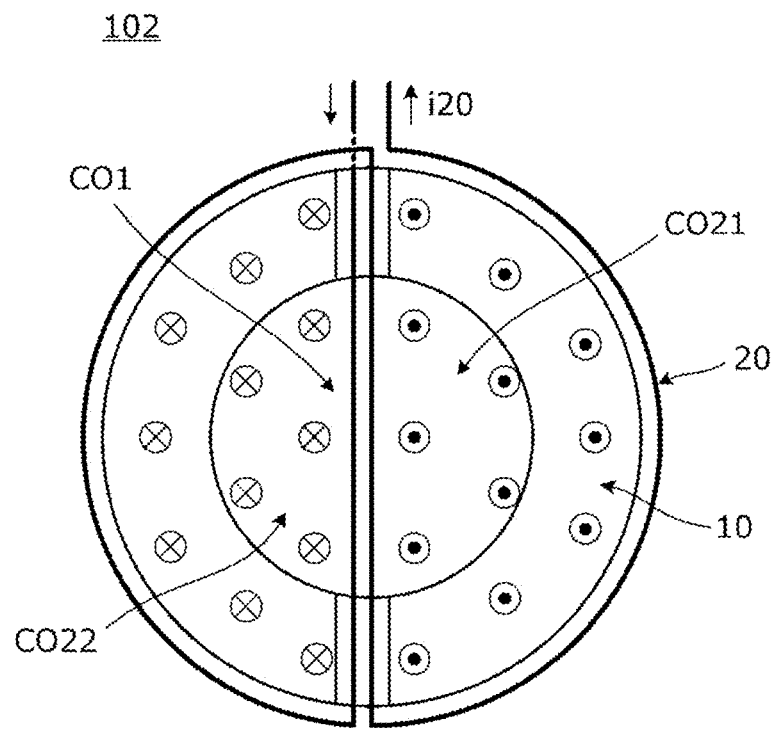
FIG. 7 is a diagram illustrating an example of a direction of a magnetic field passing through the inside and outside of the coil opening of the first coil 10 in the antenna device 102.

FIG. 7 is a diagram illustrating an example of a direction of a magnetic field passing through the inside and outside of the coil opening of the first coil 10 in the antenna device 102. In the phase in which a current i20 flows through the second coil 20 in the direction of the arrow, the magnetic flux going from the back surface to the front surface of the paper sheet is generated in the second coil opening CO21 of the second coil 20, and the magnetic flux going from the front surface to the back surface of the paper surface is generated in the second coil opening CO22 of the second coil 20. The magnetic flux (third magnetic flux) going through the second coil opening CO21 of the second coil 20 goes through the first coil opening CO1 of the first coil 10, and the magnetic flux (fourth magnetic flux) going through the second coil opening CO22 of the second coil 20 goes through the first coil opening CO1 of the first coil 10. That is, in a plan view of the first surface, the third magnetic flux and the fourth magnetic flux have polarities opposite to each other. Further, when a clockwise current flows around the second coil opening CO21, a counterclockwise current flows through the second coil opening CO22.

As long as the third magnetic flux going through the second coil opening CO21 and the fourth magnetic flux going through the second coil opening CO22 have polarities opposite to each other in a plan view of the first surface, the shape of the second coil 20 illustrated in the present preferred embodiment is not limited to that illustrated in the drawings. For example, the coil conductor including the second coil opening CO21 and the coil conductor including the second coil opening CO22 may be connected in series or in parallel. An example of parallel connection will be described later as another preferred embodiment.

Since the third magnetic flux and the fourth magnetic flux have polarities opposite to each other, magnetic field coupling between the first coil 10 and the second coil 20 is reduced or prevented. When the third magnetic flux and the fourth magnetic flux are equal or substantially equal, the coupling coefficient between the first coil 10 and the second coil 20 is extremely low.

FIGS. 8A and 8B are plan views illustrating a specific configuration of the antenna device 102 according to the second preferred embodiment. FIG. 8A is a diagram illustrating a conductor pattern provided on the first surface S1 of the base material 1, and FIG. 8B is a diagram illustrating a conductor pattern provided on the second surface S2 of the base material 1.

The spiral first coil conductor 11 wound a plurality of times is provided on the first surface S1 of the base material 1. The spiral first coil conductor 12 wound a plurality of times is provided on the second surface S2 of the base material 1.

The first coil conductor 11 and the first coil conductor 12 are connected by a plurality of via conductors at a plurality of locations. The regions V1, V2, V3, V4, V5, and V6 illustrated in FIG. 8B are formation regions of the via conductors. The first coil conductor 11 and the first coil conductor 12 are electrically connected to each other in parallel through the plurality of via conductors. As a result, the conductor resistance of the first coil 10 (see FIG. 6) is reduced or prevented.

An outer peripheral end of the first coil 10 (an outer peripheral end of the first coil conductor 11) is connected to the first coil terminal T11. An inner peripheral end of the first coil 10 (an inner peripheral end of the first coil conductor 12) is electrically connected to one end of the extended conductor 13, and the other end of the extended conductor 13 is connected to the first coil terminal T12 through the via conductor.

The second coil 20 includes the second coil conductors 21, 22, 23, 24, 25, 26, 27, and 28, and has a figure-eight or substantially figure-eight or cc shape pattern with two turns. An inner peripheral end of the second coil 20 is connected to the second coil terminal T21 through the via conductor. An outer peripheral end of the second coil 20 is connected to the second coil terminal T22 through the via conductor.

The positions of the first single-layer portion SLP1-A and the second single-layer portion SLP2-A on the first surface S1 illustrated in FIG. 8A correspond to the positions of the first single-layer portion SLP1-B and the second single-layer portion SLP2-B on the second surface S2 illustrated in FIG. 8B, respectively.

Similar to the example illustrated in FIG. 6, the second coil 20 intersects the first coil conductor 11 at a portion facing the first single-layer portions SLP1-A and SLP1-B and a portion facing the second single-layer portions SLP2-A and SLP2-B. The second coil conductors 22 and 26 are provided at a portion facing the second single-layer portions SLP2-A and SLP2-B, and the second coil conductors 24 and 28 are provided at a portion facing the first single-layer portions SLP1-A and SLP1-B. In addition, the extended conductor 13 is also provided in the first single-layer portions SLP1-A and SLP1-B and faces the first coil conductor 11.

According to the second preferred embodiment, as in the case of the first preferred embodiment, an antenna device having predetermined antenna characteristics and an electronic apparatus including the antenna device can be obtained without increasing the overall size.

In addition, according to the second preferred embodiment, as in the case of the first preferred embodiment, an increase in overall thickness is avoided, and a miniaturized antenna device and an electronic apparatus including the antenna device are obtained. In addition, since the second coil conductors 24 and 28 and the extended conductor 13 are provided at the facing portion of the same first single-layer portions SLP1-A and SLP1-B, it is possible to prevent an increase in the number of locations of the single-layer portions and to reduce or prevent an increase in the resistance and through-holes of the first coil 10.

Furthermore, when the first coil 10 is used as, for example, a coil of a wireless power reception device, the coupling between the coil of the wireless power transmission device and the second coil 20 is small, so that the power of the wireless power transmission device is less likely to enter a short-range communication circuit connected to the second coil 20, and destruction of the short-range communication circuit can be more reliably reduced or prevented.

Third Preferred Embodiment

In a third preferred embodiment of the present invention, an example of an antenna device in which a portion of a second coil conductor is provided along an edge of a base material will be described.

FIGS. 9A and 9B are plan views illustrating a configuration of an antenna device 103A according to the third preferred embodiment. FIG. 9A is a diagram illustrating a conductor pattern provided on the first surface S1 of the base material 1, and FIG. 9B is a diagram illustrating a conductor pattern provided on the second surface S2 of the base material 1.

The spiral first coil conductor 11 wound a plurality of times is provided on the first surface S1 of the base material 1. The spiral first coil conductor 12 wound a plurality of times is provided on the second surface S2 of the base material 1.

As in the first preferred embodiment, the first coil conductor 11 and the first coil conductor 12 are connected by a plurality of via conductors at a plurality of locations, and the first coil conductor 11 and the first coil conductor 12 are connected in parallel.

The second coil 20 includes the second coil conductors 21, 22, 23, and 24 and has a rectangular or substantially rectangular shape including two turns. The second coil conductor 21, which is a portion of the second coil 20, is provided along an edge of the base material 1. An outer peripheral end of the second coil 20 is connected to the second coil terminal T21 through the via conductor. An inner peripheral end of the second coil 20 is connected to the second coil terminal T22 through the via conductor.

According to the antenna device 103A illustrated in FIGS. 9S and 9B, since the second coil conductor 21 is provided along the edge of the base material 1, the second coil opening CO2 of the second coil 20 is larger than that in the example illustrated in FIG. 4B and the like. Therefore, the magnetic field engagement coefficient between the second coil 20 and a coil of a communication partner can be easily increased.

FIGS. 10A and 10B are plan views illustrating the configuration of another antenna device 103B according to the third preferred embodiment. FIG. 10A is a diagram illustrating a conductor pattern provided on the first surface S1 of the base material 1, and FIG. 10B is a diagram illustrating a conductor pattern provided on the second surface S2 of the base material 1.

The antenna device 103B of the third preferred embodiment differs in the shape of the second coil conductors 21 and 25 of the second coil conductors 21, 22, 23, 24, 25, 26, 27, and 28 from the example illustrated in FIG. 8B of the second preferred embodiment. In the example illustrated in FIG. 10B, the second coil conductors 21 and 25 are provided along the edge of the base material 1.

According to the antenna device 103B illustrated in FIGS. 10A and 10B, since the second coil conductors 21 and 25 are provided along the edge of the base material 1, the second coil openings CO21 and CO22 of the second coil 20 are larger than those in the example illustrated in FIG. 7 and the like. Therefore, the magnetic field engagement coefficient between the second coil 20 and the coil of the communication partner can be easily increased.

According to the third preferred embodiment, since the coil opening of the second coil 20 can be increased without increasing the size of the base material 1, the performance per unit cost is further improved.

Fourth Preferred Embodiment

In a fourth preferred embodiment of the present invention, an example of an antenna device in which a line width of a portion where a portion of the second coil conductor overlaps the first coil opening CO1 of the first coil is larger than a line width of the other portion will be described.

Figure 11A:
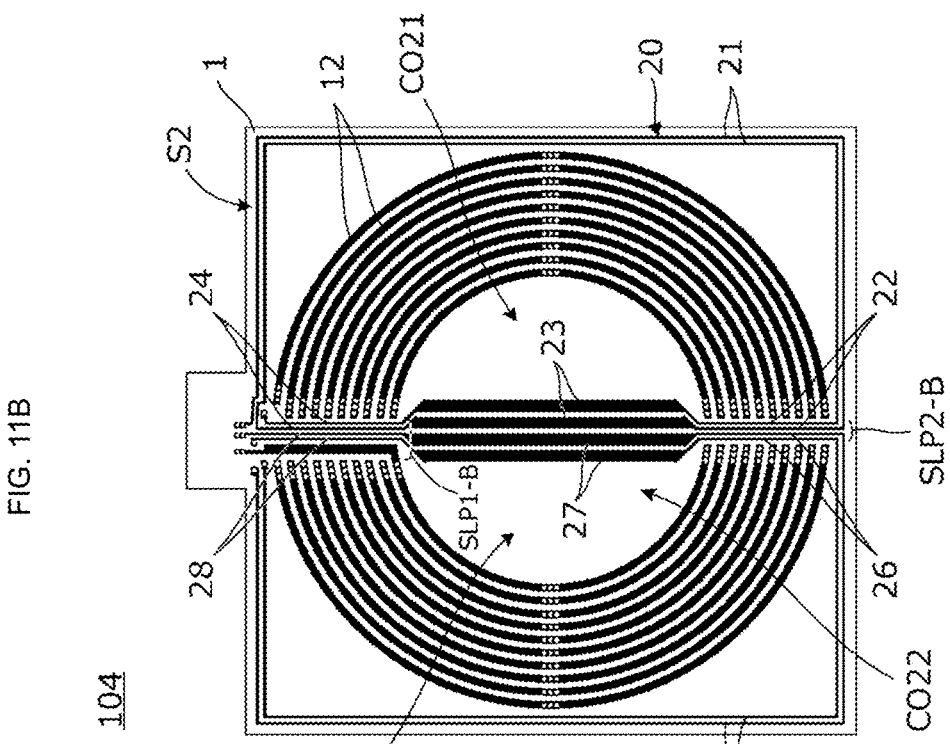
FIGS. 11A and 11B are plan views illustrating an antenna device 104 according to a fourth preferred embodiment of the present invention.
Figure 11B:
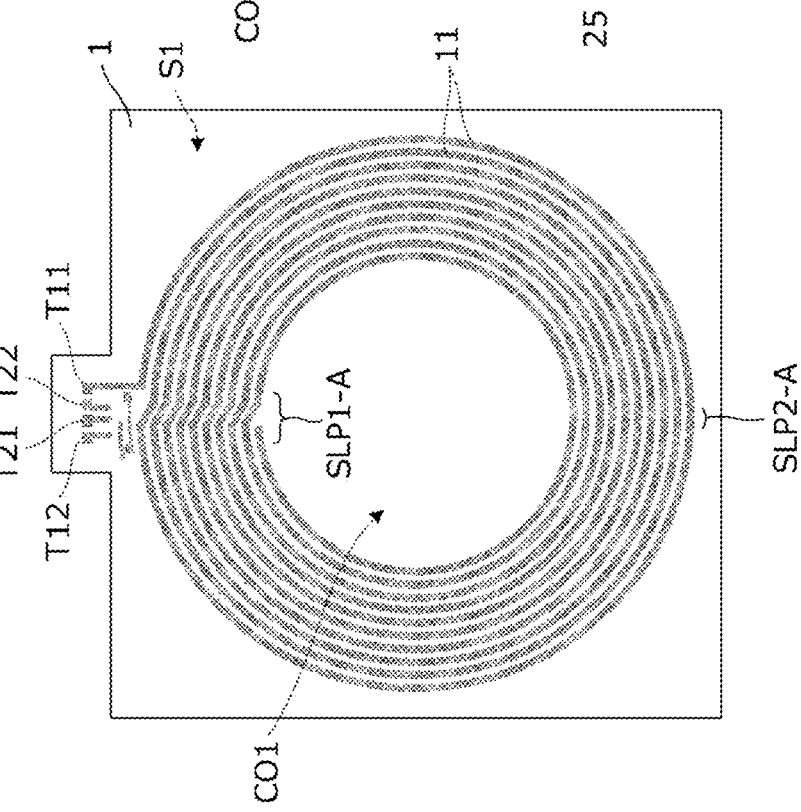

FIGS. 11A and 11B are plan views illustrating a configuration of an antenna device 104 according to the fourth preferred embodiment. FIG. 11A is a diagram illustrating a conductor pattern provided on the first surface S1 of the base material 1, and FIG. 11B is a diagram illustrating a conductor pattern provided on the second surface S2 of the base material 1.

The antenna device 104 of the fourth preferred embodiment differs in the shape of the second coil conductors 23 and 27 of the second coil conductors 21, 22, 23, 24, 25, 26, 27, and 28 from the example illustrated in FIG. 10B of the third preferred embodiment. In the example illustrated in FIG. 11B, the line width of the second coil conductors 23 and 27 is larger than the line width of other portions.

The second coil 20 of the antenna device 104 is most strongly coupled when the second coil conductors 21 to 28 of the second coil 20 and a coil conductor of the communication partner overlap each other.

According to the present preferred embodiment, since the line width of the second coil conductor in the coil opening of the first coil 10 is large, the coupling between the second coil conductor and the coil conductor of the communication partner does not become too strong when the second coil conductor and the coil conductor of the communication partner overlap each other. Accordingly, the displacement of the resonant frequency is reduced or prevented, the strength of the coupling with respect to the position in the plane direction is stabilized, and the communication characteristics are further stabilized. In addition, the conductor resistance of the second coil conductor is reduced, and the loss is reduced.

The above-described advantageous effects are also achieved in the antenna device including a single coil opening of the second coil, as in the examples illustrated in FIGS. 4A, 4B, FIGS. 9A and 9B.

Further, even when the line width of the second coil conductors 21 and 25 is larger than the line width of other portions, the advantageous effects can be obtained. However, the operational effects are more significant in the case where the line width of the second coil conductors 23 and 27 is larger than the case where the line width of the second coil conductors 21 and 25 is large.

On the other hand, the line width of the second coil conductors 22, 24, 26, and 28 is preferably smaller than the line width of other portions. As a result, the formation regions of the first single-layer portions SLP1-A and SLP1-B and the second single-layer portions SLP2-A and SLP2-B can be reduced, and the conductor resistance of the first coil conductor can be reduced.

Fifth Preferred Embodiment

In a fifth preferred embodiment of the present invention, an example of an antenna device in which sizes of coil openings having opposite polarities (opposite phases) among coil openings provided by a second coil conductor are different from each other will be described.

Figure 12B:
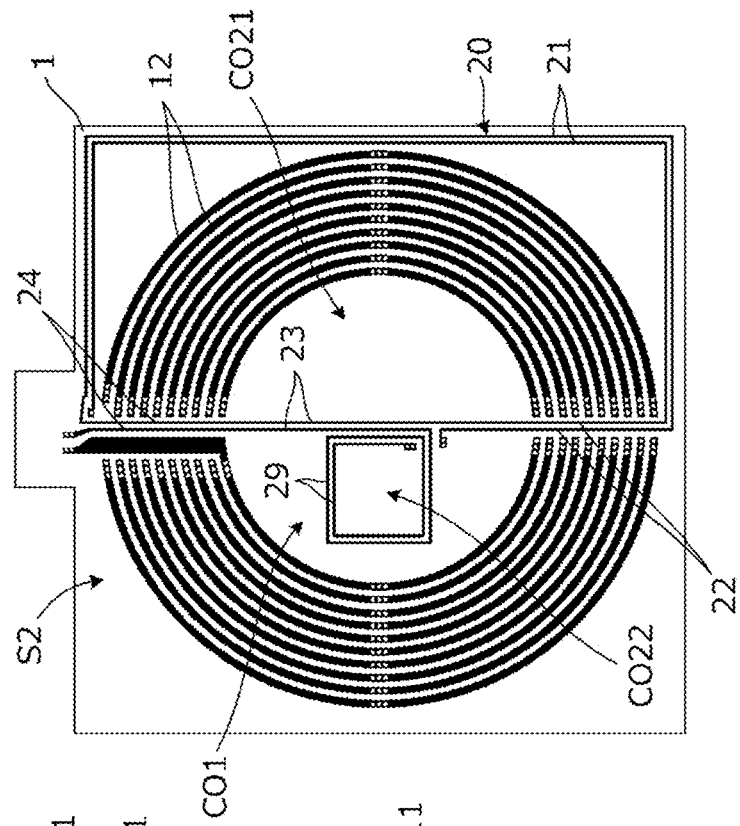
FIGS. 12A and 12B are plan views illustrating an antenna device 105 according to a fifth preferred embodiment of the present invention.
Figure 12A:
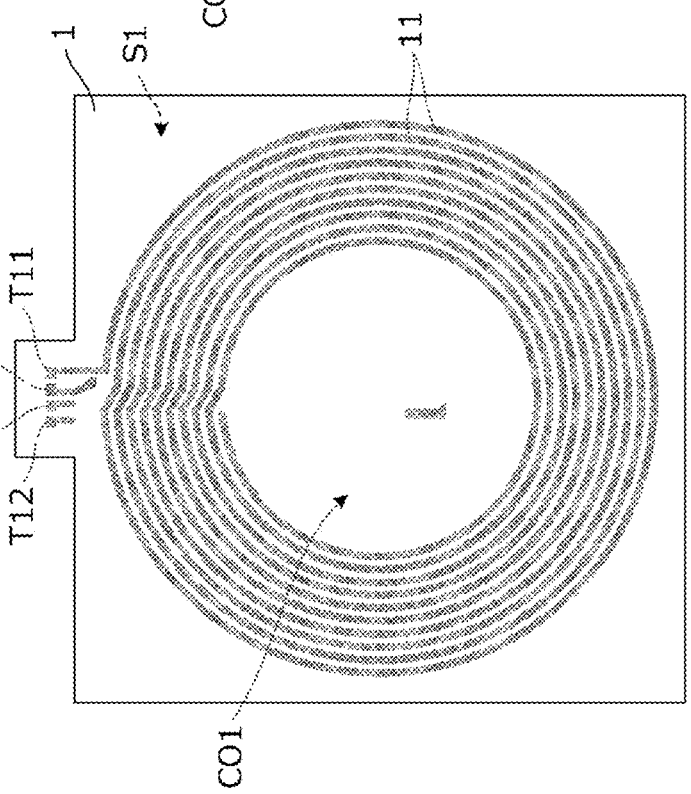

FIGS. 12A and 12B are plan views illustrating a configuration of an antenna device 105 according to the fifth preferred embodiment. FIG. 12A is a diagram illustrating a conductor pattern provided on the first surface S1 of the base material 1, and FIG. 12B is a diagram illustrating a conductor pattern provided on the second surface S2 of the base material 1.

The antenna device 105 of the fifth preferred embodiment differs in the shape of the second coil 20 from the example illustrated in FIG. 10B in the third preferred embodiment. In the example illustrated in FIG. 12B, one second coil opening CO21 of the second coil 20 is defined by the second coil conductors 21, 22, 23, and 24, and on the other hand, the second coil opening CO22 of the second coil 20 is defined by a second coil conductor 29. The other second coil opening CO22 is provided in the first coil opening CO1.

According to the present preferred embodiment, the directivity of the antenna for short-range communication by the second coil 20 can be made different from that of the antenna device illustrated in the first preferred embodiment or the second preferred embodiment. That is, the distribution of the coupling strength when a coil opening of an antenna coil of the communication partner is moved in parallel or substantially parallel along the surface of the base material 1 can be determined by the position and size of the second coil opening CO22 provided by the second coil conductor 29.

Sixth Preferred Embodiment

In a sixth preferred embodiment of the present invention, an example of an antenna device in which a portion of a second coil conductor intersects a first coil conductor at four single-layer portions will be described.

Figure 13A:
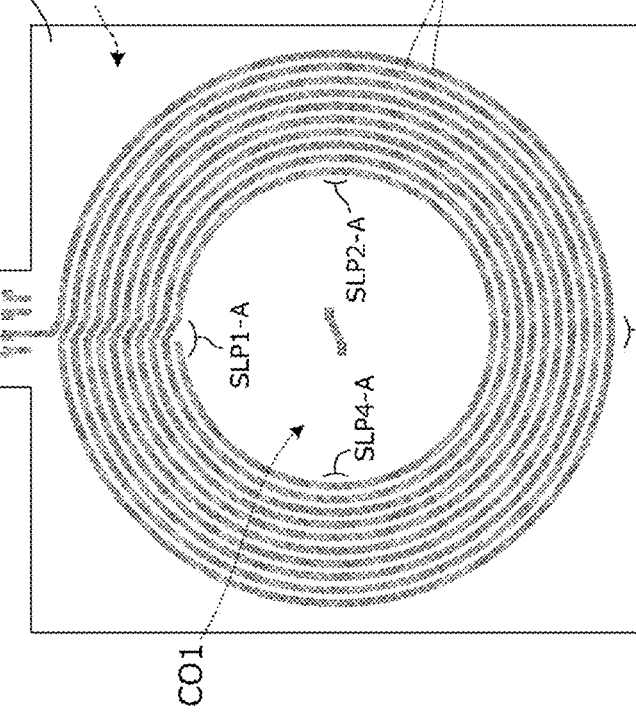
FIGS. 13A and 13B are plan views illustrating a configuration of an antenna device 106 according to a sixth preferred embodiment of the present invention.
Figure 13B:
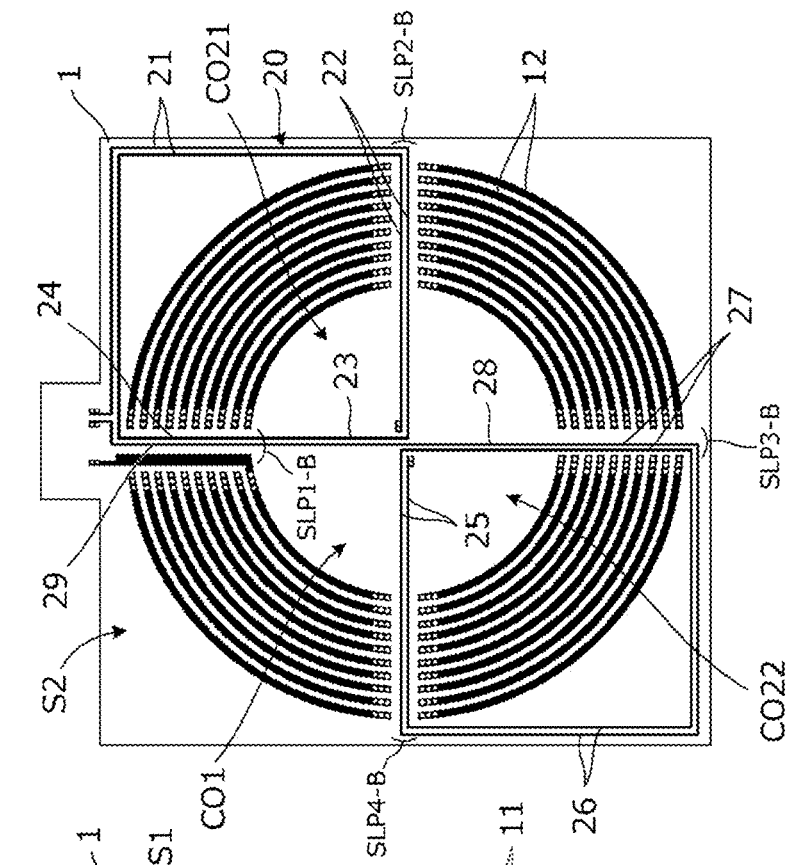

FIGS. 13A and 13B are plan views illustrating a configuration of an antenna device 106 according to the sixth preferred embodiment. FIG. 13A is a diagram illustrating a conductor pattern provided on the first surface S1 of the base material 1, and FIG. 13B is a diagram illustrating a conductor pattern provided on the second surface S2 of the base material 1.

In the antenna device 106 of the sixth preferred embodiment, the second coil opening CO21 is defined by the second coil conductors 21, 22, 23, 24, and 29, and the second coil opening CO22 is defined by the second coil conductors 25, 26, 27, and 28.

The spiral first coil conductor 11 wound a plurality of times is provided on the first surface S1 of the base material 1. The spiral first coil conductor 12 wound a plurality of times is provided on the second surface S2 of the base material 1.

The first coil conductor 11 and the first coil conductor 12 are connected by a plurality of via conductors at a plurality of locations. The first coil conductor 11 and the first coil conductor 12 are electrically connected to each other in parallel through the plurality of via conductors.

The antenna device 106 includes the first single-layer portions SLP1-A and SLP1-B, the second single-layer portions SLP2-A and SLP2-B, third single-layer portions SLP3-A and SLP3-B, and fourth single-layer portions SLP4-A and SLP4-B in which the first coil conductor 11 is provided only on the first surface S1 of the base material 1. The second coil conductors 23 and 28 intersect the first coil conductor 11 at the first single-layer portions SLP1-A and SLP1-B, and the second coil conductor 22 intersects the first coil conductor 11 at the second single-layer portions SLP2-A and SLP2-B. Further, the second coil conductor 27 intersects the first coil conductor 11 at the third single-layer portions SLP3-A and SLP3-B, and the second coil conductor 25 intersects the first coil conductor 11 at the fourth single-layer portions SLP4-A and SLP4-B.

As described above, three or more single-layer portions may be provided.

According to the present preferred embodiment, the directivity of the antenna for short-range communication by the second coil 20 can be made different from that of the antenna devices of the preferred embodiments described so far.

Seventh Preferred Embodiment

In a seventh preferred embodiment of the present invention, an example of an antenna device including a magnetic body will be described.

Figure 14A:
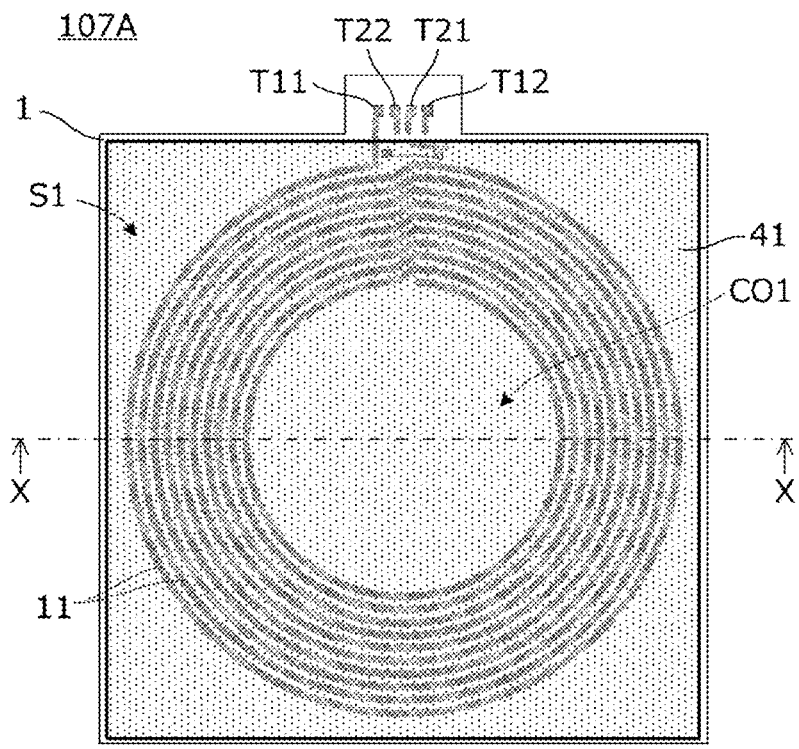
FIG. 14A is a plan view of an antenna device 107A according to a seventh preferred embodiment of the present invention as viewed from a first surface S1 side.
Figure 14B:
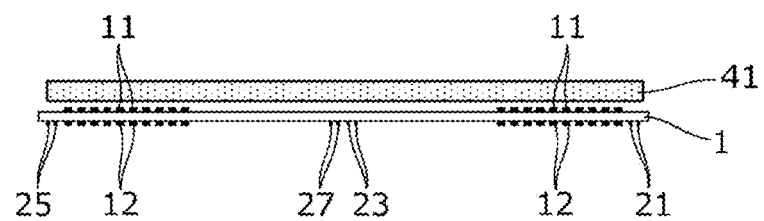
FIG. 14B is a cross-sectional view taken along a line X-X in FIG. 14A.

FIG. 14A is a plan view of the antenna device 107A according to the seventh preferred embodiment as viewed from the first surface S1 side, and FIG. 14B is a cross-sectional view taken along a line X-X in FIG. 14A. This antenna device 107A is a device including a first magnetic body 41 in the antenna device 103B illustrated in FIGS. 10A and 10B in the third preferred embodiment. The first magnetic body 41 is formed by molding a ferromagnetic material into a sheet shape. Examples of the ferromagnetic material include ferrite, an amorphous magnetic material, and a nanocrystal magnetic material. The first magnetic body 41 is provided on the first surface S1 side so as to face the base material 1, and overlaps the first coil conductor 12 and the like and the second coil conductors 21 and 25 and the like in a plan view of the base material 1. Note that illustration of a coverlay and the like is omitted.

The antenna device 107A is provided in an electronic apparatus so that, for example, when the antenna device 107A is in close proximity to a conductor planarly extending in the electronic apparatus, the first magnetic body 41 is interposed between the planar conductor and the base material 1. Thus, the first magnetic body 41 shields unnecessary coupling between the conductor and the first coil or the second coil of the antenna device 107A, and the antenna device 107A is less likely to be adversely affected by the above-described conductor.

Figure 15A:
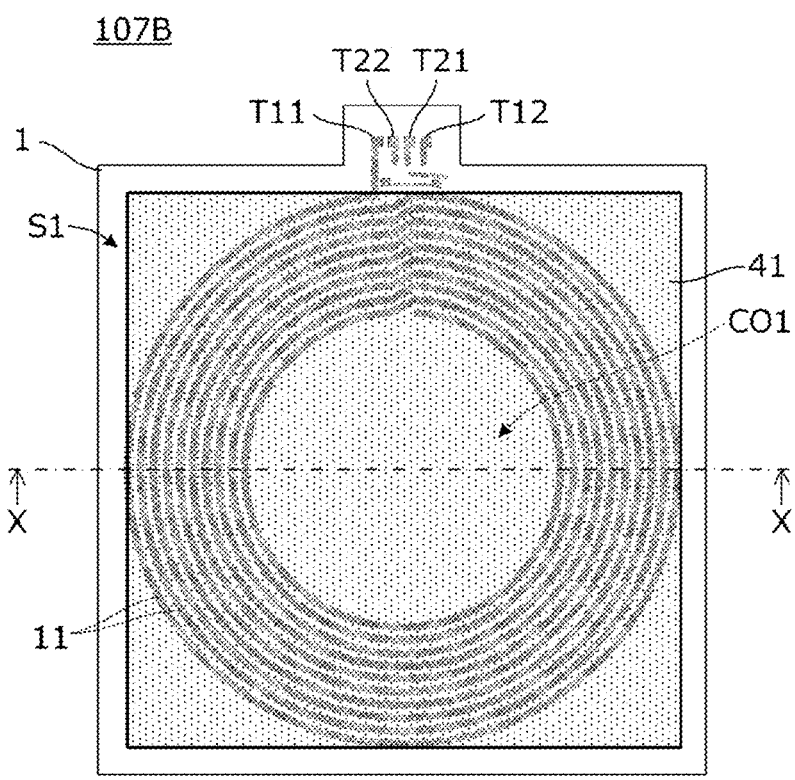
FIG. 15A is a plan view of another antenna device 107B according to the seventh preferred embodiment of the present invention.
Figure 15B:
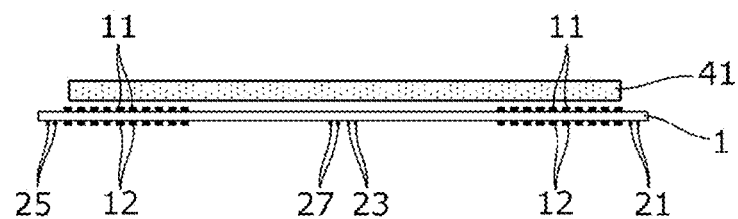
FIG. 15B is a cross-sectional view taken along a line X-X in FIG. 15A.

FIG. 15A is a plan view of another antenna device 107B according to the seventh preferred embodiment, and FIG. 15B is a cross-sectional view taken along a line X-X in FIG. 15A. The first magnetic body 41 of the antenna device 107B is smaller than the first magnetic body 41 of the antenna device 107A. In this example, the first magnetic body 41 covers the inner side of the second coil conductors 21 and 25.

According to the antenna device 107B, the strength of coupling between the second coil by the second coil conductors 21 and 25 and the like and a coil of a coupling partner is reduced in the peripheral portion. In this way, the distribution of the strength of coupling between the second coil and the coil of the coupling partner for the second coil when the coil of the coupling partner is moved in parallel or substantially in parallel along the surface of the base material 1 may be determined by a covering region of the first magnetic body 41 with respect to the second coil.

In the antenna device having the existing structure shown in International Publication No. 2017/094355, it is necessary to insert a magnetic member into the coil of one antenna, which increases the manufacturing cost. However, according to the present preferred embodiment, since the first magnetic body 41 can be arranged simply by overlapping with the base material 1, it is possible to reduce the manufacturing cost in the case where the magnetic body is provided.

Eighth Preferred Embodiment

In an eighth preferred embodiment of the present invention, an example of an antenna device including a magnetic body will be described.

Figure 16B:
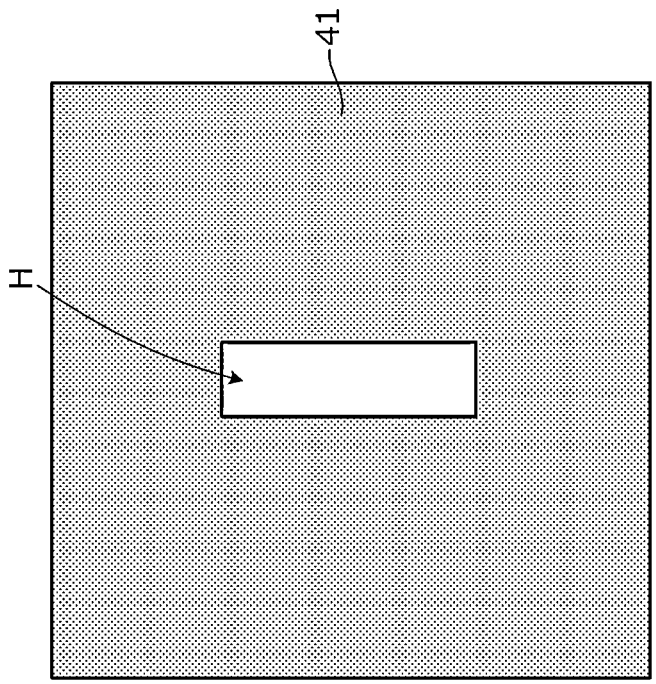
FIG. 16B is a plan view of a first magnetic body 41 included in the antenna device 108.
Figure 16A:
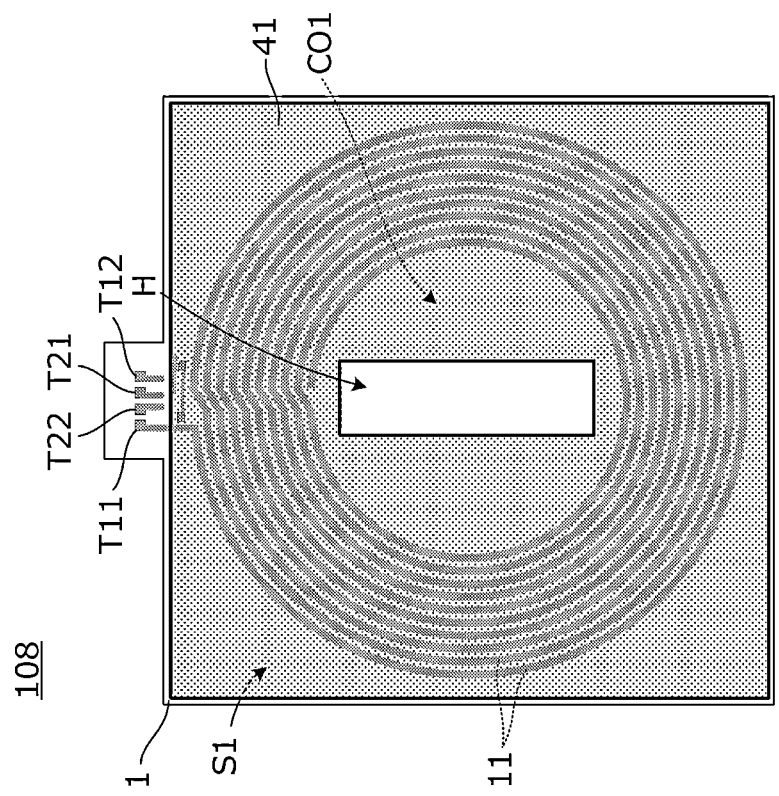
FIG. 16A is a plan view of an antenna device 108 according to an eighth preferred embodiment of the present invention.

FIG. 16A is a plan view of an antenna device 108 according to the eighth preferred embodiment as viewed from the first surface S1 side, and FIG. 16B is a plan view of the first magnetic body 41 included in the antenna device 108. The antenna device 108 is a device including the first magnetic body 41 in the antenna device 103A illustrated in FIGS. 9A and 9B in the third preferred embodiment. The first magnetic body 41 is formed by molding a ferromagnetic material into a sheet shape, and includes an opening H in a central portion.

In addition, in the present preferred embodiment, a portion of the second coil including the second coil conductor 21 and the like does not overlap the first magnetic body 41 in a plan view of the base material 1. Specifically, the first magnetic body 41 does not overlap a portion of the second coil conductor 23 in a portion of the opening H of the first magnetic body 41. According to this structure, the magnetic field strength in the second coil conductor 23 (see FIG. 9B) can be reduced. In this way, the distribution of the strength of coupling between the second coil and the coil of the coupling partner for the second coil when the coil of the coupling partner is moved in parallel or substantially in parallel along the surface of the base material 1 may be determined by the covering region of the first magnetic body 41 with respect to the second coil.

Ninth Preferred Embodiment

In a ninth preferred embodiment of the present invention, FIG. 17A is a plan view of an antenna device 109A according to the ninth preferred embodiment as viewed from the first surface S1 side. FIG. 17B is a plan view of the first magnetic body 41 included in the antenna device 109A, and FIG. 17C is a plan view of a second magnetic body 42 included in the antenna device 109A. The antenna device 109A is a device further including the second magnetic body 42 in the antenna device 107A illustrated in FIG. 14A in the seventh preferred embodiment.

The second magnetic body 42 is formed by molding a ferromagnetic material into a sheet shape. The second magnetic body 42 overlaps the second coil conductors 23 and 27 in a plan view of the base material 1. The magnetic material of the first magnetic body 41 is a material suitable for wireless power supply using the first coil, and the magnetic material of the second magnetic body 42 is a material suitable for short-range communication using the second coil. For example, the relative magnetic permeability of the first magnetic body 41 is approximately 600 in the 100 kHz band of frequencies of wireless power supply, and the relative magnetic permeability of the second magnetic body 42 is approximately 200 in the 13.56 MHz band of frequencies of short-range communication.

In this way, by bringing the second magnetic body 42, which has a small variation in magnetic permeability and a small loss even in the frequency band of short-range communication, close to the second coil conductors 23 and 27, it is possible to easily increase the coupling between the second coil and the coil of the coupling partner of the second coil.

FIG. 18A is a plan view of another antenna device 109B according to the ninth preferred embodiment as viewed from the first surface S1 side. FIG. 18B is a plan view of the first magnetic body 41 included in the antenna device 109B, and FIG. 18C is a plan view of the second magnetic body 42 included in the antenna device 109B. This antenna device 109B is different from the antenna device 109A illustrated in FIG. 17A in the shape of the second magnetic body 42. In the antenna device 109B, the second magnetic body 42 is also provided at a position overlapping the second coil conductors 21 and 25 provided outside the first coil conductor 12 in a plan view of the base material 1.

According to the antenna device 109B, variations in inductance of the second coil due to the second coil conductors 21, 23, 25, and 27 or the like are reduced or prevented by bringing the second magnetic body 42 having a small variation in magnetic permeability and a small loss even in a frequency band of short-range communication close to the second coil conductors 21, 23, 25, 27.

Figures 19A, 19B, 19C:
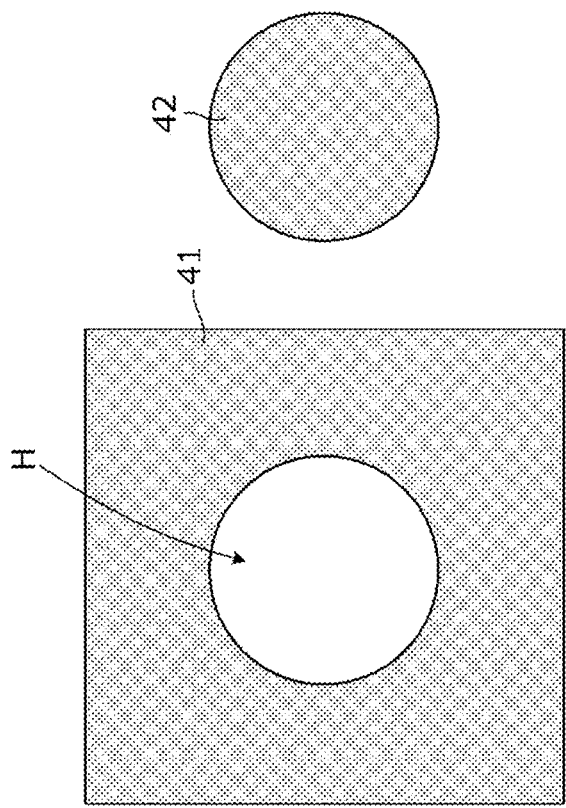
FIG. 19A is a plan view of another antenna device 109C according to the ninth preferred embodiment of the present invention.
FIG. 19B is a plan view of the first magnetic body 41 included in the antenna device 109C.
FIG. 19C is a plan view of the second magnetic body 42 included in the antenna device 109C.

FIG. 19A is a plan view of another antenna device 109C according to the ninth preferred embodiment as viewed from the first surface S1 side. FIG. 19B is a plan view of the first magnetic body 41 included in the antenna device 109C, and FIG. 19C is a plan view of the second magnetic body 42 included in the antenna device 109C. This antenna device 109C is different from the antenna device 109A illustrated in FIG. 17A in the shape of the first magnetic body 41. In the antenna device 109C, the first magnetic body 41 includes the opening H in a portion that is overlapped by the second magnetic body 42. That is, the first magnetic body 41 has a shape that does not overlap the second magnetic body 42.

According to the antenna device 109C, the first magnetic body 41 and the second magnetic body 42 do not overlap each other, this results in an overall thinner design. In addition, the thickness of the second magnetic body 42 can be increased accordingly, which further improves the performance of short-range communication using the second coil.

Figure 20C:
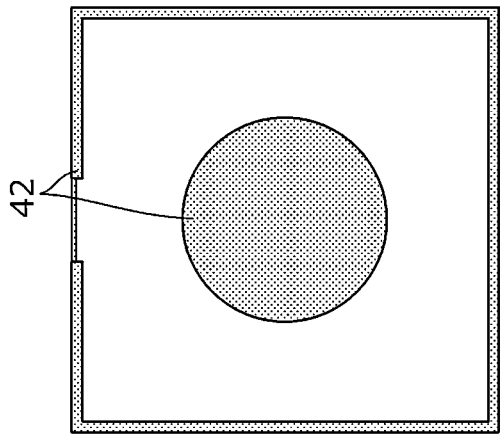
FIG. 20C is a plan view of the second magnetic body 42 included in the antenna device 109D.
Figure 20B:
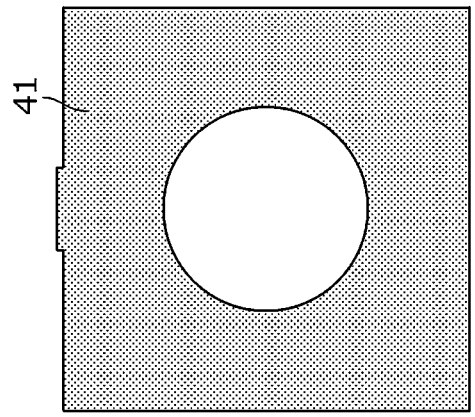
FIG. 20B is a plan view of the first magnetic body 41 included in the antenna device 109D.
Figure 20A:
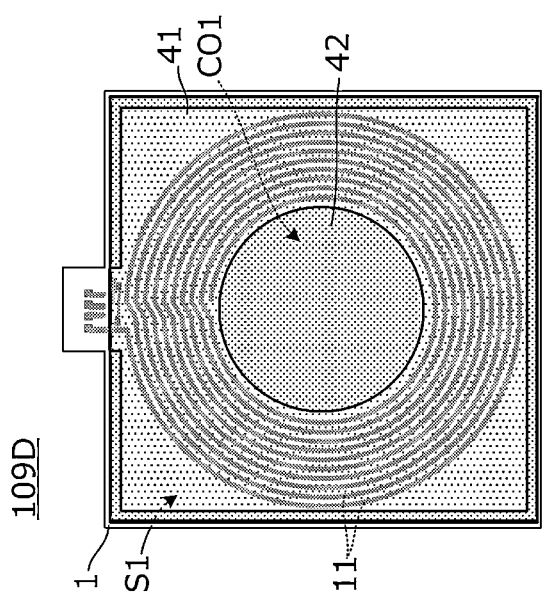
FIG. 20A is a plan view of another antenna device 109D according to the ninth preferred embodiment of the present invention.

FIG. 20A is a plan view of another antenna device 109D according to the ninth preferred embodiment as viewed from the first surface S1 side. FIG. 20B is a plan view of the first magnetic body 41 included in the antenna device 109D, and FIG. 20C is a plan view of the second magnetic body 42 included in the antenna device 109D. This antenna device 109D is different from the antenna device 109C illustrated in FIG. 19A in the shape of the first magnetic body 41. In the antenna device 109D, the first magnetic body 41 includes the opening H in a portion that is overlapped by the second magnetic body 42. That is, the first magnetic body 41 has a shape that does not overlap the second magnetic body 42.

According to the antenna device 109D, the first magnetic body 41 and the second magnetic body 42 do not overlap each other, which results in an overall thinner design. In addition, the thickness of the second magnetic body 42 can be increased accordingly, which further improves the performance of short-range communication using the second coil.

Tenth Preferred Embodiment

In a tenth preferred embodiment of the present invention, an example of an antenna device including a third coil will be described.

Figure 21:
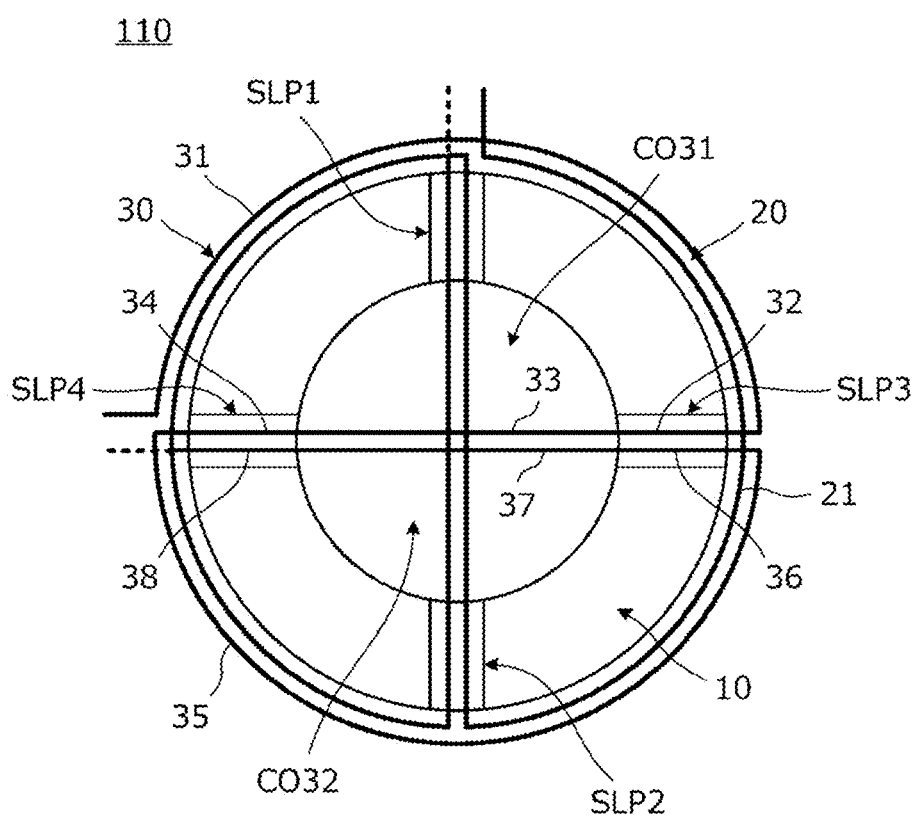
FIG. 21 is a plan view illustrating an antenna device 110 according to a tenth preferred embodiment of the present invention.

FIG. 21 is a plan view illustrating an antenna device 110 according to the tenth preferred embodiment. The antenna device 110 includes the first coil 10, the second coil 20, and a third coil 30. Although the first coil 10, the second coil 20, and the third coil 30 are all provided on a base material, illustration of the base material is omitted in FIG. 21.

The configurations of the first coil 10 and the second coil 20 are the same or substantially the same as those of the antenna device 102 illustrated in FIG. 6 in the second preferred embodiment. In the tenth preferred embodiment, the third coil 30 including third coil conductors 31, 32, 33, 34, 35, 36, 37, and 38 is provided. Third coil openings CO31 and CO32 are defined by the third coil conductors 31 to 38, and a figure-eight or substantially figure-eight or cc shape pattern is provided.

The antenna device 110 includes a third single-layer portion SLP3 and a fourth single-layer portion SLP4 in which the first coil conductor is provided only on the first surface of the base material (the back surface of the paper surface in FIG. 21). The third coil conductors 32 and 36 are provided in the third single-layer portion SLP3, and the third coil conductors 34 and 38 are provided in the fourth single-layer portion SLP4.

The above-described figure-eight or substantially figure-eight or cc shape pattern of the third coil 30 is in a positional relationship rotated by about 90 degrees with respect to the above-described figure-eight or substantially figure-eight or cc shape pattern of the second coil 20. Therefore, coupling of the third coil 30 with the first coil 10 is reduced or prevented, and also coupling of the third coil 30 with the second coil 20 is reduced or prevented.

FIGS. 22A and 22B are plan views illustrating a specific configuration of the antenna device 110 according to the tenth preferred embodiment. FIG. 22A is a diagram illustrating a conductor pattern provided on the first surface S1 of the base material 1, and FIG. 22B is a diagram illustrating a conductor pattern provided on the second surface S2 of the base material 1. The antenna device 110 is obtained by adding the third coil conductors 31 to 38 and a third coil conductor 39 to the antenna device illustrated in FIGS. 10A and 10B. One end of the first coil conductor 11 is connected to the first coil terminal T11, and one end of the extended conductor 13 of the first coil conductor is connected to the first coil terminal T12. One end of the second coil conductor 24 is connected to the second coil terminal T21, and one end of the second coil conductor 28 is connected to the second coil terminal T22. In addition, one end of the third coil conductor 31 is connected to a third coil terminal T31, and one end of the third coil conductor 39 is connected to a third coil terminal T32.

Eleventh Preferred Embodiment

In an eleventh preferred embodiment of the present invention, an example of an antenna device in which second coil conductors including two second coil openings are connected in parallel will be described.

FIGS. 23A and 23B are plan views illustrating a configuration of an antenna device 111 according to the eleventh preferred embodiment. FIG. 23A is a diagram illustrating a conductor pattern provided on the first surface S1 of the base material 1, and FIG. 23B is a diagram illustrating a conductor pattern provided on the second surface S2 of the base material 1.

The antenna device 111 of the eleventh preferred embodiment differs in connection structures of the second coil conductors 21, 22, 23, 24, 25, 26, 27, and 28 with respect to the second coil terminals T21 and T22 from the example illustrated in FIGS. 10A and 10B in the third preferred embodiment.

Figure 24A:
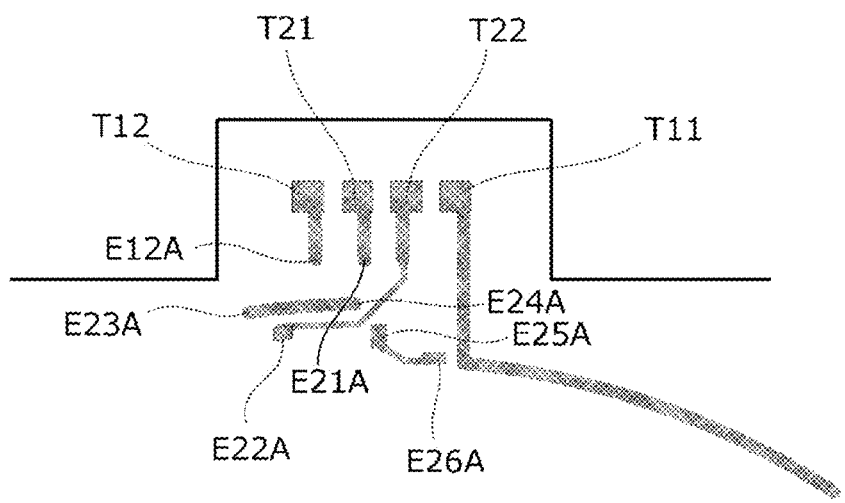
FIGS. 24A and 24B are partially enlarged plan views of the antenna device 111.
Figure 24B:
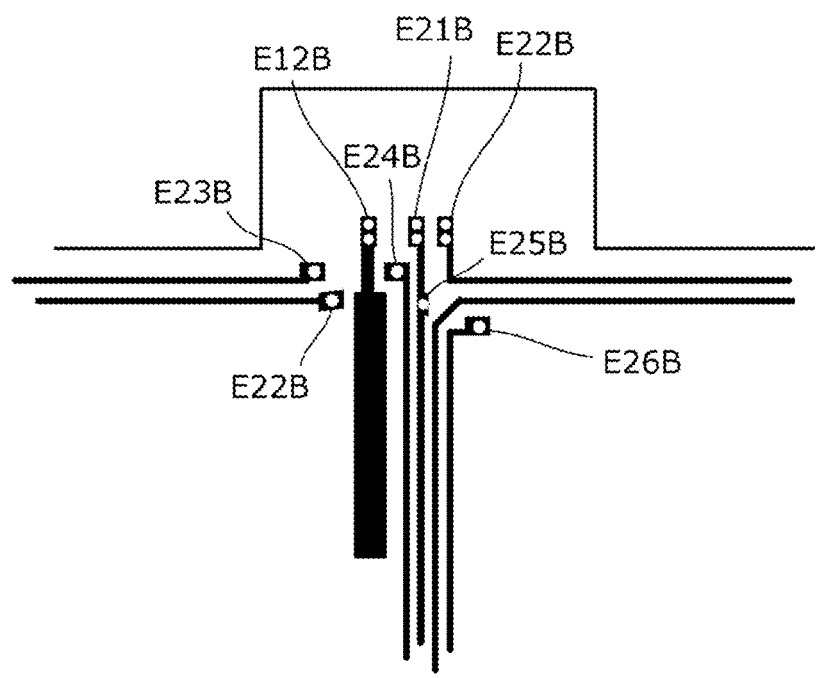

FIGS. 24A and 24B are partially enlarged plan views of the antenna device 111. FIG. 24A is an enlarged view in the vicinity of the first coil terminals T11 and T12 and the second coil terminals T21 and T22 provided on the first surface S1, and FIG. 24B is an enlarged view of each conductor pattern provided on the second surface S2. The electrode E12A and the electrode E12B are electrically connected to each other through the via conductor. Similarly, the electrode E21A and the electrode E21B, and the electrode E22A and the electrode E22B are electrically connected to each other through the via conductor, respectively. Further, an electrode, E23A and an electrode E23B, an electrode E24A and an electrode E24B, an electrode E25A and an electrode E25B, and an electrode E26A and an electrode E26B are electrically connected to each other through the via conductor, respectively.

In the antenna device 111 of the present preferred embodiment, the second coil conductors 21, 22, 23, and 24 and the second coil conductors 25, 26, 27, and 28 are connected in parallel to the second coil terminals T21 and T22. In this way, the coil conductors including a plurality of second coil openings may be connected in parallel.

Twelfth Preferred Embodiment

In a twelfth preferred embodiment of the present invention, an example of an antenna device in which a second coil conductor including two second coil openings defines a current path that reciprocates between one coil opening and the other coil opening will be described. The second coil conductor repeats a figure-eight turn over the two second coil openings.

Figure 25A:
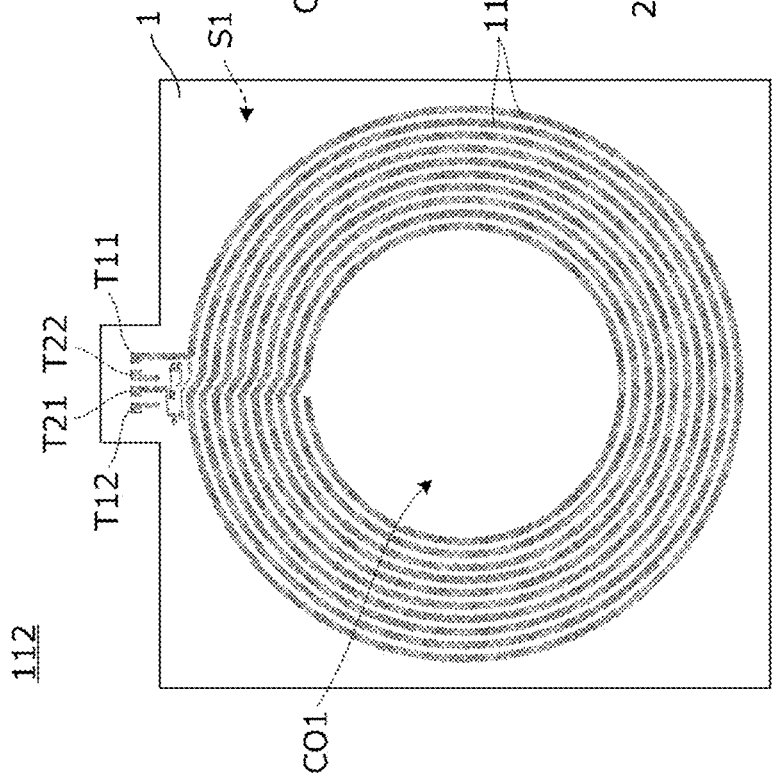
FIGS. 25A and 25B are plan views illustrating an antenna device 112 according to a twelfth preferred embodiment of the present invention.
Figure 25B:
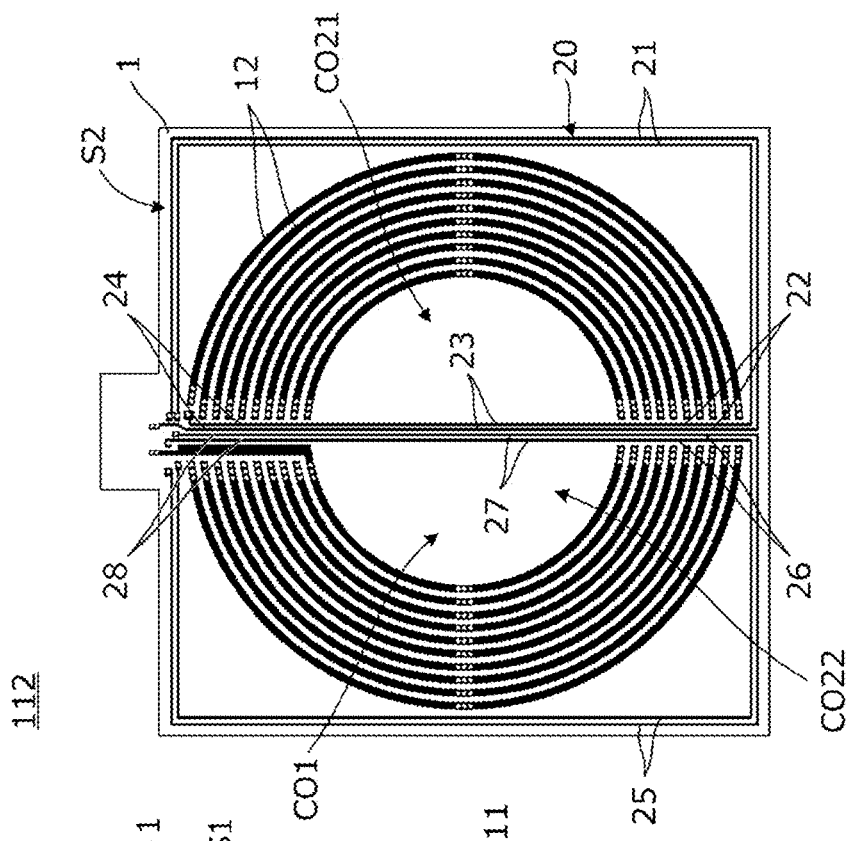

FIGS. 25A and 25B are plan views illustrating a configuration of an antenna device 112 according to the twelfth preferred embodiment. FIG. 25A is a diagram illustrating a conductor pattern provided on the first surface S1 of the base material 1, and FIG. 25B is a diagram illustrating a conductor pattern provided on the second surface S2 of the base material 1.

The antenna device 112 of the twelfth preferred embodiment differs in connection structures of the second coil conductors 21, 22, 23, 24, 25, 26, 27, and 28 with respect to the second coil terminals T21 and T22 from the example illustrated in FIGS. 10A and 10B of the third preferred embodiment.

In the antenna device 112 of the present preferred embodiment, for example, a current flowing in from the second coil terminal T21 flows through a path outside the second coil opening CO22, then flows through a path inside the second coil opening CO21, then flows through a path inside the second coil opening CO22, further flows through a path outside the second coil opening CO22, and flows out from the second coil terminal T22.

In this way, the second coil conductor may be provided over a plurality of second coil openings for each turn.

Thirteenth Preferred Embodiment

In a thirteenth preferred embodiment of the present invention, a configuration of an antenna device provided in an electronic apparatus will be described.

FIGS. 26A to 26C are plan views illustrating an internal configuration of the electronic apparatus according to the thirteenth preferred embodiment.

In housings of an electronic apparatus 201A illustrated in FIG. 26A, an electronic apparatus 201B illustrated in FIG. 26B, and an electronic apparatus 201C illustrated in FIG. 26C, a circuit board 5 on which many electronic components are mounted and a battery 4 are provided. In addition, the antenna device 107A overlaps the battery 4. Pogo pins protrude from the circuit board 5, and tips of the pogo pins abut against the first coil terminal and the second coil terminal of the antenna device 107A, so that circuits provided on the circuit board 5 are electrically connected to the antenna device 107A.

The outer shape of each of the electronic apparatuses 201A, 201B, and 201C includes a housing whose short-side direction is an X-axis direction, and the antenna device 107A is provided in the housing. This antenna device 107A is the antenna device illustrated in FIG. 14A or 15A in the seventh preferred embodiment. In FIG. 26A, FIGS. 26B and 26C, patterns of the first coil conductor and the second coil conductor are illustrated in a simplified manner.

In FIG. 26A to 26C, two-dot chain lines are lines passing through the center of gravity of each of the second coil openings CO21 and CO22 defined by the second coil conductors 21 and 25 and the like.

In the antenna device 107A, when the center of the coil opening of the coil of the coupling partner of the second coil moves along the above-described two-dot chain line, a peak of the coupling strength occurs at any position on the line. Thus, in the electronic apparatus 201B illustrated in FIG. 26B, the center in the short-side direction (X-axis direction) and the coil of the coupling partner of the second coil are overlapped, thus easily achieving strong coupling. As compared with the electronic apparatus 201A, it is possible to reduce communication failures when the center in the short-side direction (X-axis direction) is overlapped with the coil of the coupling partner of the second coil, and to improve communication accuracy. In addition, by moving along a long-side direction, it is possible to immediately find a position where strong coupling occurs.

Even when the two-dot chain line is slightly deviated from the center in the short-side direction of the electronic apparatus 201B, the operations and advantageous effects can be achieved. For example, it is more preferable to provide the antenna device 107A in the housing of the electronic apparatus such that the center of gravity of each of the second coil openings CO21 and CO22 is in a central region obtained by dividing the region of the electronic apparatus 201B into three equal or substantially equal portions in the short-side direction. Further, it is more preferable to provide the antenna device 107A in the housing of the electronic apparatus so that the two-dot chain line passes through the central region obtained by dividing the region of the electronic apparatus 201B into three equal or substantially equal portions in the short-side direction.

In general, since an electronic apparatus is placed on a charging stand so that the center of the electronic apparatus is aligned or substantially aligned with the center of the charging stand, as in the electronic apparatus 201C illustrated in FIG. 26C, the antenna device 107A is preferably provided at the center or approximate center of the electronic apparatus 201C in the long-side direction.

Fourteenth Preferred Embodiment

In a fourteenth preferred embodiment of the present invention, an antenna device is described in which an arrangement relationship between a first coil and a second coil and an arrangement relationship between the first coil and the second coil with respect to a housing of an electronic apparatus are different from those of the examples described so far.

Figure 27A:
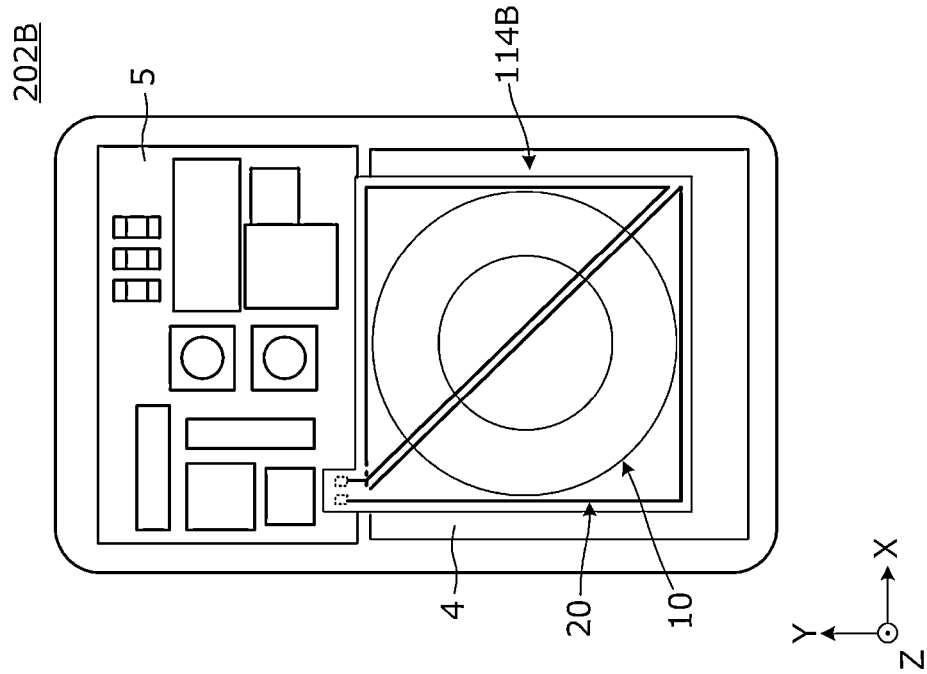
FIG. 27A is a plan view illustrating an internal configuration of an electronic apparatus 202A according to a fourteenth preferred embodiment.
Figure 27B:
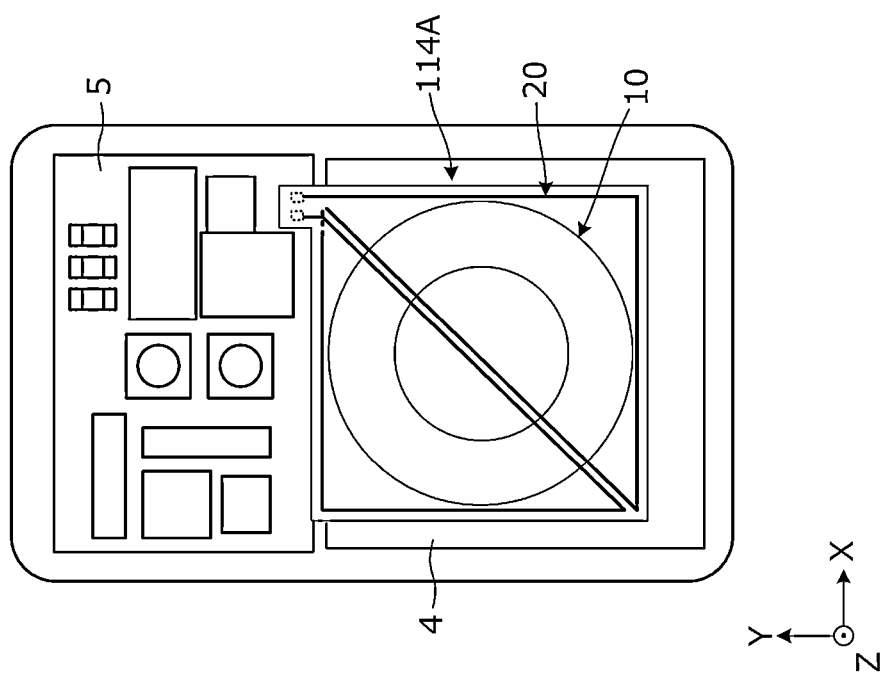
FIG. 27B is a plan view illustrating an internal configuration of another electronic apparatus 202B according to the fourteenth preferred embodiment of the present invention.

FIG. 27A is a plan view illustrating an internal configuration of an electronic apparatus 202A according to the fourteenth preferred embodiment, and FIG. 27B is a plan view illustrating an internal configuration of another electronic apparatus 202B according to the fourteenth preferred embodiment.

In housings of the electronic apparatus 202A illustrated in FIG. 27A and the electronic apparatus 202B illustrated in FIG. 27B, the circuit board 5 on which many electronic components are mounted and the battery 4 are provided. In addition, antenna devices 114A and 114B overlap the battery 4.

The outer shape of each of the electronic apparatuses 202A and 202B includes a housing whose short-side direction is the X-axis direction, and the antenna devices 114A and 114B are provided in the housing. These antenna devices 114A and 114B include the first coil 10 and the second coil 20. Although the first coils of these antenna devices 114A and 114B are illustrated in a simplified manner, they are the same or substantially the same as the first coils illustrated in FIGS. 26A and 26B and the like. In the second coil 20, a line of the second coil conductor intersecting the first coil 10 is inclined by +45 degrees or −45 degrees.

As described above, in the second coil conductor, a line intersecting the first coil 10 may be inclined from the vertical and horizontal directions of the housing of the electronic apparatus. This makes it possible to change the position of a point (null point) at which communication cannot be performed due to the positional relationship of the coil with the communication partner.

Fifteenth Preferred Embodiment

In a fifteenth preferred embodiment of the present invention, an antenna device is described in which the configuration of a second coil conductor including two second coil openings of a second coil is different from that of the examples described so far.

Figure 28A:
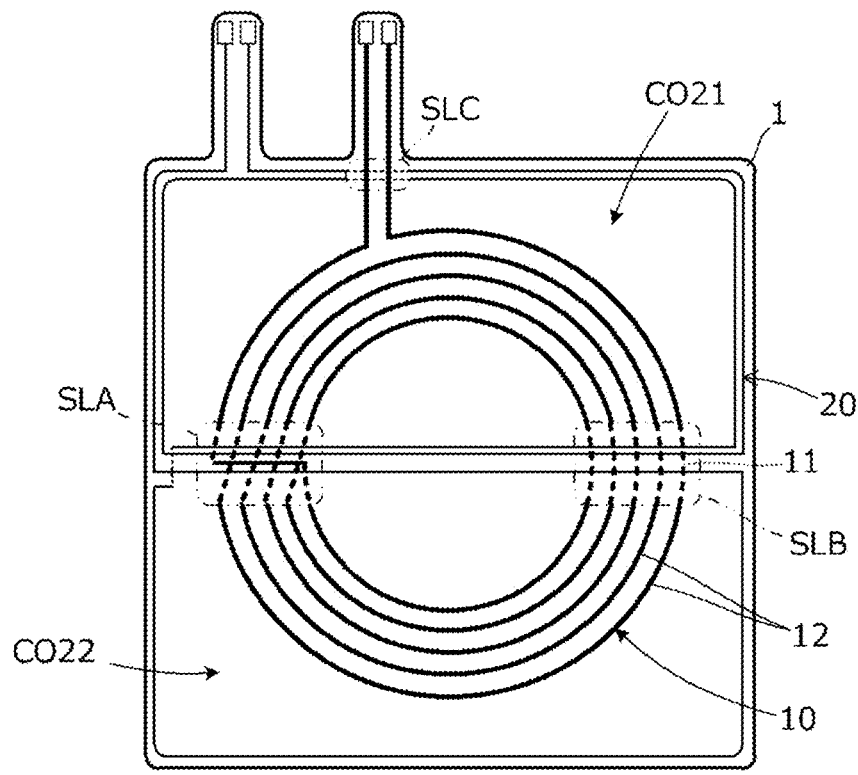
FIGS. 28A and 28B are plan views of an antenna device according to a fifteenth preferred embodiment of the present invention.
Figure 28B:
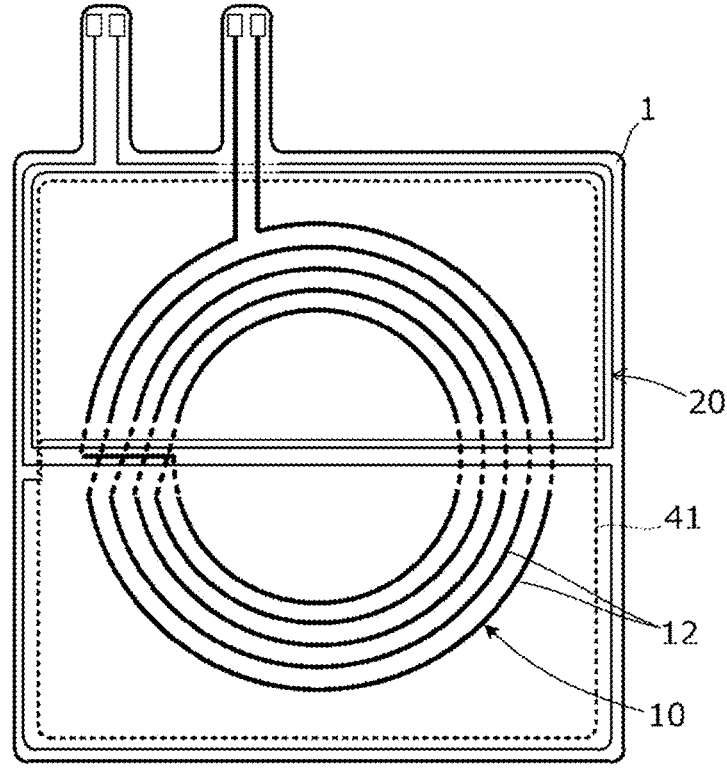

FIGS. 28A and 28B are plan views of the antenna device according to the fifteenth preferred embodiment. FIG. 28A is a plan view in a state in which the first magnetic body 41 is not provided, and FIG. 28B is a plan view in a state in which the first magnetic body 41 is provided.

In FIGS. 28A and 28B, the first coil 10 includes a first coil conductor provided on both surfaces of the base material 1, and the second coil 20 includes a second coil conductor provided on the upper surface of the base material 1. In FIGS. 28A and 28B, patterns indicated by broken lines are conductor patterns provided on the lower surface of the base material 1. Solid lines in regions SLA, SLB, and SLC indicate conductor patterns provided only on the upper surface of the base material 1. Patterns indicated by solid lines of the first coil conductor in other regions are conductor patterns provided on both surfaces of the base material 1. The conductor patterns facing each other along both surfaces are connected to each other through via conductors dispersedly provided at a plurality of locations.

The second coil conductor of the second coil 20 includes two second coil openings CO21 and CO22, and the number of turns of the second coil conductor including the second coil opening CO21 is two, and the number of turns of the second coil conductor including the second coil opening CO22 is one, for example.

As illustrated in FIG. 28B, the first magnetic body 41 overlaps the first coil 10, and does not overlap four peripheral sides of the second coil 20.

In this manner, by making the numbers of turns of the second coil conductors defining the two second coil openings CO21 and CO22 different from each other, it is possible to change the directivity of the antenna for short-range communication compared to a case where the numbers of turns thereof are equal.

Sixteenth Preferred Embodiment

In a sixteenth preferred embodiment of the present invention, an antenna device is described in which the intersecting position of the second coil conductor with respect to the first coil is different from that of the examples described so far.

Figure 29A:
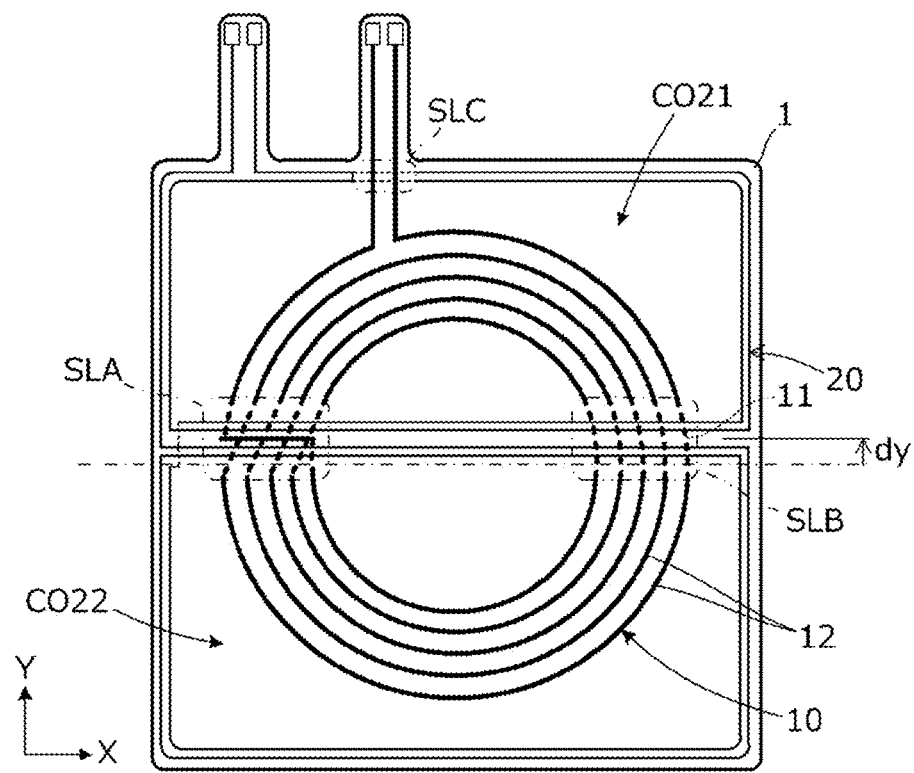
FIGS. 29A and 29B are plan views of an antenna device according to a sixteenth preferred embodiment of the present invention.
Figure 29B:
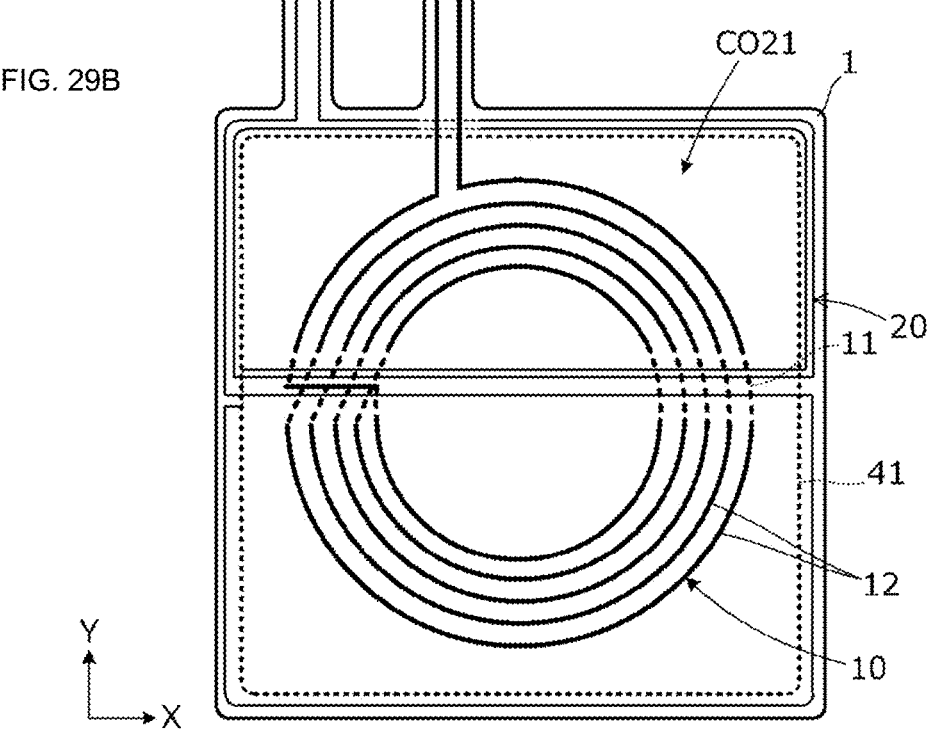

FIGS. 29A and 29B are plan views of the antenna device according to the sixteenth preferred embodiment. FIG. 29A is a plan view in a state in which the first magnetic body 41 is not provided, and FIG. 29B is a plan view in a state in which the first magnetic body 41 is provided.

In FIGS. 29A and 29B, the first coil 10 includes a first coil conductor provided on both surfaces of the base material 1, and the second coil 20 includes a second coil conductor provided on the upper surface of the base material 1. In FIGS. 29A and 29B, patterns indicated by broken lines are conductor patterns provided on the lower surface of the base material 1. Solid lines in regions SLA, SLB, and SLC indicate conductor patterns provided only on the upper surface of the base material 1. Patterns indicated by solid lines of the first coil conductor in other regions are conductor patterns provided on both surfaces of the base material 1. The conductor patterns facing each other along both surfaces are connected to each other through via conductors dispersedly provided at a plurality of locations.

In the present preferred embodiment, the intersecting position of the second coil conductor with respect to the first coil 10 is shifted by dy in a Y direction from the center line of the first coil 10 in the Y direction.

In this manner, by making the sizes of the two second coil openings CO21 and CO22 different from each other, it is possible to change the directivity of the antenna for short-range communication compared to a case where the sizes of the two second coil openings CO21 and CO22 are equal or substantially equal to each other.

Seventeenth Preferred Embodiment

In a seventeenth preferred embodiment of the present invention, an antenna device in which second coils are provided on both surfaces of a base material will be exemplified.

Figure 30:
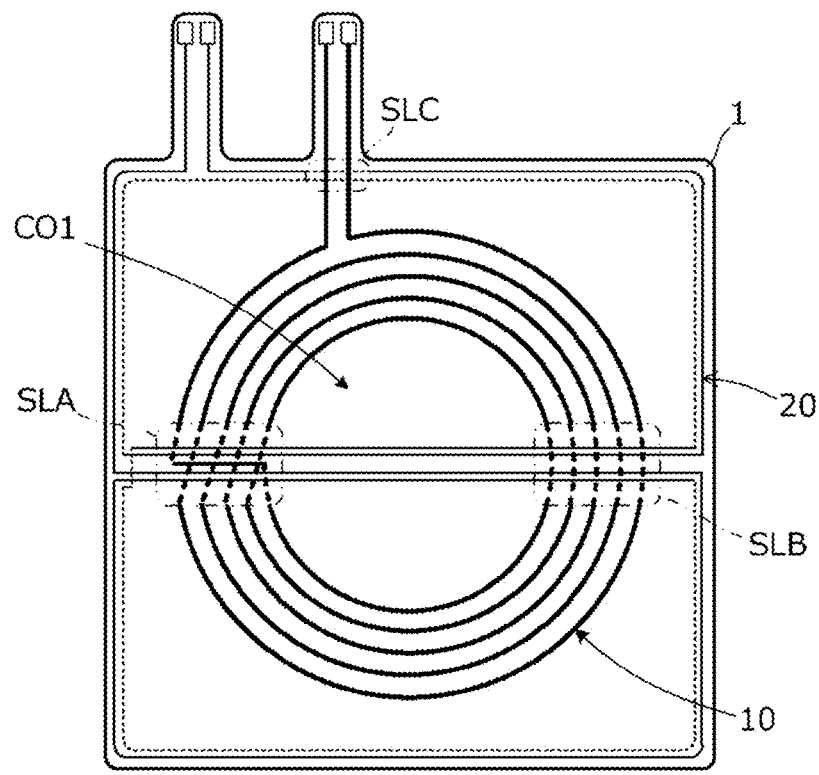
FIG. 30 is a plan view of an antenna device according to a seventeenth preferred embodiment of the present invention.

FIG. 30 is a plan view of an antenna device according to the seventeenth preferred embodiment. In FIG. 30, a pattern indicated by a broken line is a conductor pattern provided on the lower surface of the base material 1. Solid lines in the regions SLA, SLB, and SLC indicate conductor patterns provided only on the upper surface of the base material 1. Patterns indicated by solid lines of the first coil conductor in other regions are conductor patterns provided on both surfaces of the base material 1. The conductor patterns facing each other along both surfaces are connected to each other through via conductors dispersedly provided at a plurality of locations.

The conductor pattern of the second coil 20 provided on the upper surface of the base material 1 and the conductor pattern provided on the lower surface are connected in series. In FIG. 30, in consideration of clarity of the drawing, the conductor pattern (solid line) on the upper surface of the second coil conductor of the base material 1 and the conductor pattern (broken line) on the lower surface of the second coil conductor are drawn so as to be shifted from each other, but may overlap each other.

In this manner, when the second coil includes the second coil conductors on both surfaces of the base material 1, the number of the second coil conductors in a plan view can be reduced, and thus the formation region of the first coil 10 can be enlarged and the first coil opening CO1 can be expanded. As a result, the coupling between the coil of the wireless power transmission device and the first coil 10 is strengthened. Further, the coupling range in the plane direction is widened.

Although a magnetic body overlapping the first coil 10 is not illustrated, the first magnetic body 41 illustrated in FIG. 29B or the like may be provided.

Eighteenth Preferred Embodiment

In an eighteenth preferred embodiment of the present invention, a cross-sectional structure of an electronic apparatus in which an antenna device is provided will be exemplified.

Figure 31A:
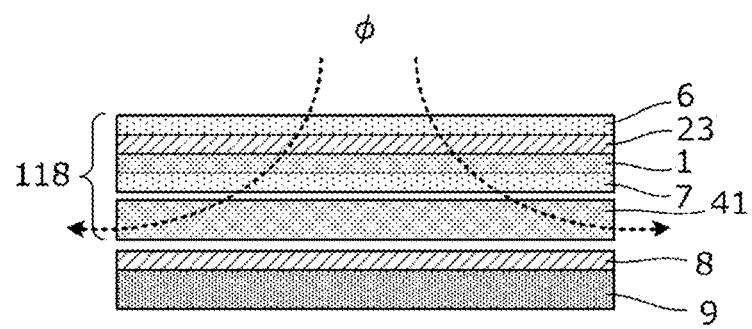
FIGS. 31A and 31B are partial cross-sectional views of an electronic apparatus illustrating an antenna device 118 according to an eighteenth preferred embodiment of the present invention and a structure in the vicinity of the antenna device 118.
Figure 31B:
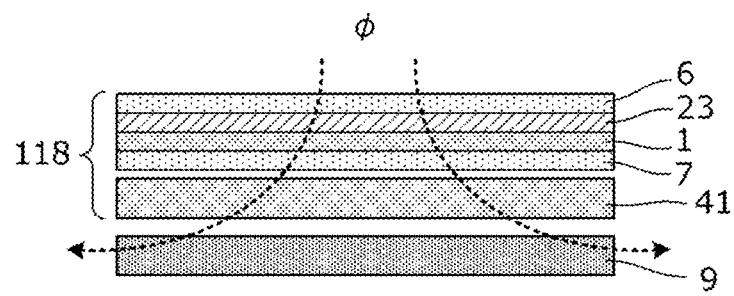

FIGS. 31A and 31B are partial cross-sectional views of an electronic apparatus illustrating an antenna device 118 according to the eighteenth preferred embodiment and a structure in the vicinity of the antenna device 118. In FIGS. 31A and 31B, an upper portion is a communication surface, and a lower portion is, for example, a battery side.

The antenna device 118 includes the base material 1, the second coil conductor 23, coverlays 6 and 7, and the first magnetic body 41. The first coil conductor does not appear at this cross-sectional position. The first magnetic body 41 is, for example, a nanocrystal sheet. The first magnetic body 41 may be attached to the coverlay 7. A graphite sheet 9 for heat dissipation is provided inside the housing. In the present preferred embodiment, as illustrated in FIG. 31A, a copper foil 8 is provided between the graphite sheet 9 and the antenna device 118. In this example, the copper foil 8 is attached to the surface of the graphite sheet 9.

In the example illustrated in FIG. 31B, a magnetic flux $\varphi$ going through the coil opening of the second coil passes through the first magnetic body 41 and reaches the graphite sheet 9, and an eddy current flows through the graphite sheet 9. Although the electrical conductivity of the graphite sheet is low, an eddy current flows, and thus a loss due to the eddy current occurs.

On the other hand, in the electronic apparatus of the present preferred embodiment illustrated in FIG. 31A, since the copper foil 8 is provided in front of the graphite sheet 9, the magnetic flux $\varphi$ going through the coil opening of the second coil hardly reaches the graphite sheet 9, and a large eddy current does not flow through the graphite sheet 9. As described above, in order to reduce the loss due to the eddy current in the graphite sheet 9, it is preferable that a metal layer such as the above-described copper foil 8 is provided.

Nineteenth Preferred Embodiment

In a nineteenth preferred embodiment of the present invention, an antenna device is described in which the positional relationship of two intersecting portions of the second coil conductor with respect to the first coil is different from the examples described so far.

Figure 32A:
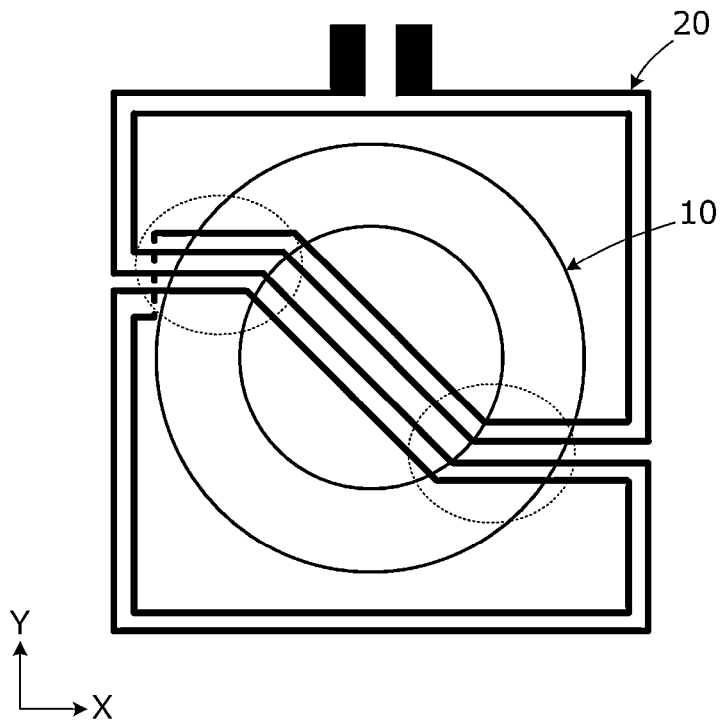
FIGS. 32A and 32B are plan views of an antenna device according to a nineteenth preferred embodiment of the present invention.
Figure 32B:
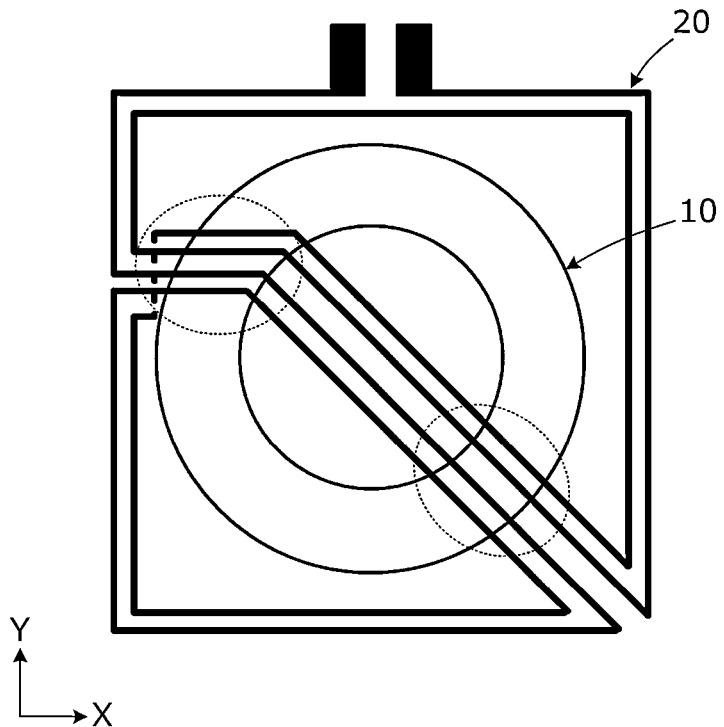

FIGS. 32A and 32B are plan views of the antenna device according to the nineteenth preferred embodiment. Each of the antenna devices includes the first coil 10 and the second coil 20. In the example illustrated in FIG. 32A, the second coil conductor of the second coil 20 intersects the first coil 10 parallel or substantially parallel to the X direction as illustrated by being enclosed by ellipses in the drawing, but these two intersecting points are different in the Y direction. In addition, in the example illustrated in FIG. 32B, as indicated by being enclosed by ellipses in the drawing, there are a portion in which the second coil conductor of the second coil 20 intersects the first coil 10 parallel to the X direction and a portion in which the second coil conductor of the second coil 20 intersects the first coil 10 obliquely with respect to the X direction or the Y direction.

In this way, the intersecting portion of the second coil conductor of the second coil 20 with respect to the first coil 10 need not be on a straight line.

Twentieth Preferred Embodiment

In a twentieth preferred embodiment of the present invention, an antenna device in which a relationship between a second coil and a magnetic body or a heat dissipation member is improved will be exemplified.

Figure 33A:
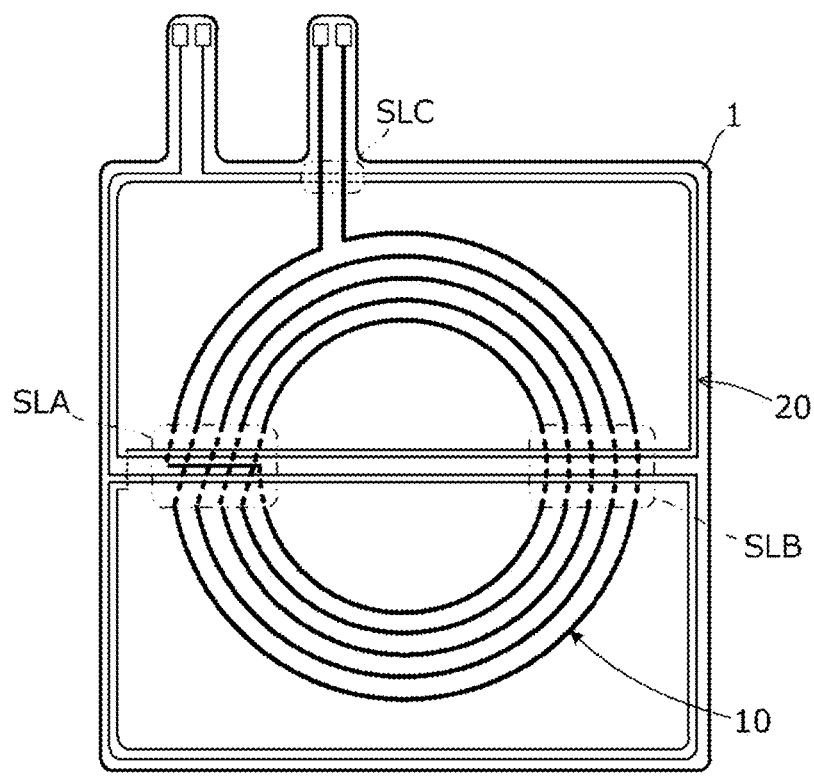
FIG. 33A is a plan view of an antenna device according to a twentieth preferred embodiment of the present invention.
Figure 33B:
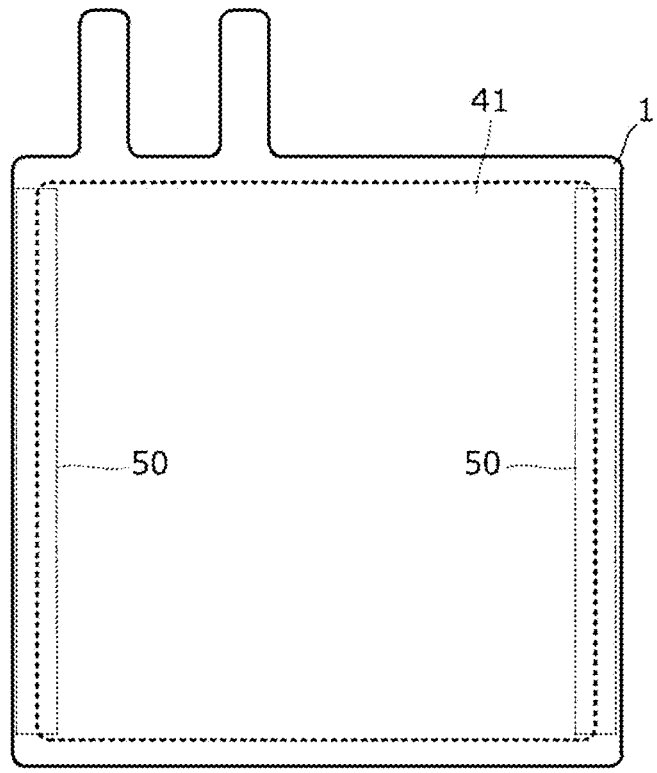
FIG. 33B is a plan view illustrating an electrode and a magnetic body provided on a lower surface of a base material 1 of the antenna device.

FIG. 33A is a plan view of an antenna device according to the twentieth preferred embodiment, and FIG. 33B is a plan view illustrating an electrode and a magnetic body provided on the lower surface of the base material 1 of the antenna device.

The antenna device illustrated in FIGS. 33A and 33B includes the base material 1, the first coil 10, and the second coil 20. The configurations of the first coil 10 and the second coil 20 are as illustrated in FIGS. 29A and 29B.

Guard electrodes 50 are provided on the lower surface of the base material 1 at opposite positions on the right and left sides of the second coil 20. The guard electrode 50 is, for example, a copper foil pattern of a flexible substrate.

Figure 34A:
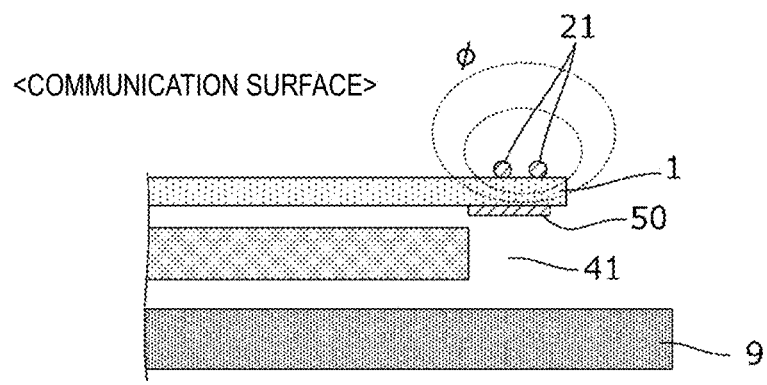
FIG. 34A is a partial cross-sectional view of an electronic apparatus illustrating the antenna device according to the twentieth preferred embodiment of the present invention and a structure in the vicinity of the antenna device.
Figure 34B:
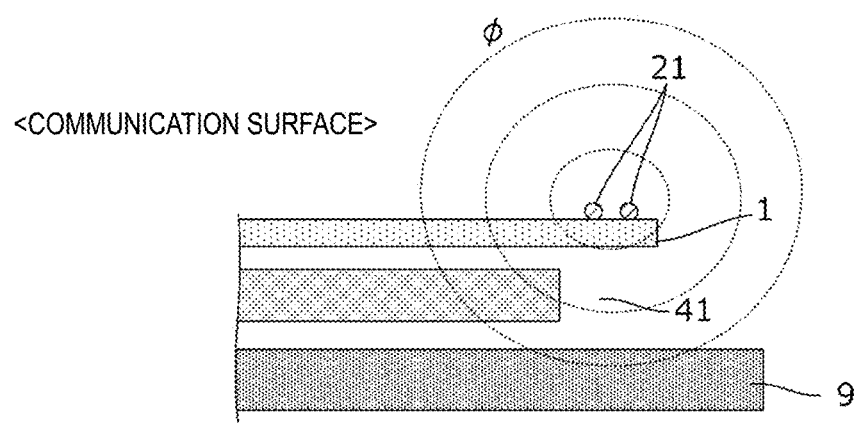
FIG. 34B is a partial cross-sectional view of an electronic apparatus as a comparative example.

FIG. 34A is a partial cross-sectional view of an electronic apparatus illustrating the antenna device according to the twentieth preferred embodiment and a structure in the vicinity of the antenna device. FIG. 34B is a partial cross-sectional view of an electronic apparatus as a comparative example. In FIGS. 34A and 34B, an upper portion is a communication surface, and a lower portion is, for example, a battery side.

In the comparative example illustrated in FIG. 34B, the magnetic flux $\varphi$ going through the coil opening of the second coil reaches the graphite sheet 9, an eddy current flows through the graphite sheet 9, and a loss due to the eddy current occurs.

In addition, in the comparative example illustrated in FIG. 34B, variation in capacitance is likely to occur between the second coil conductor 21 and a conductive member such as a battery or a ground conductor of a printed circuit board. Therefore, the resonant frequency of a resonance circuit including the second coil may deviate from predetermined frequencies (for example, 13.56 MHz, which is a frequency of short-range wireless communication) due to the presence or absence of a conductive member such as a battery or a ground conductor of a printed circuit board or a variation in distance.

On the other hand, in the electronic apparatus of the present preferred embodiment illustrated in FIG. 34A, since the guard electrode 50 is provided in front of the first magnetic body 41 and the graphite sheet 9, the magnetic flux φ that goes through the coil opening of the second coil and reaches the graphite sheet 9 decreases, and an eddy current hardly flows through the graphite sheet 9. Since the electrical conductivity of the guard electrode 50 is high, an AC resistance component Rac due to the eddy current is small. As a result, the Q value of the second coil is improved, and the communication characteristics of short-range wireless communication are improved. In addition, there is no possibility that the resonant frequency of the resonance circuit including the second coil deviates from the predetermined frequency due to the presence or absence of a conductive member such as a battery or a ground conductor of a printed circuit board or variation in distance. In addition, the inductance of a portion of the second coil conductor 21 protruding from the first magnetic body 41 varies due to a variation in mounting of the base material 1 or the like. However, the presence of the guard electrode 50 reduces or prevents the variation in the inductance.

Twenty-first Preferred Embodiment

In a twenty-first preferred embodiment of the present invention, an antenna device having an electrode other than a first coil conductor and a second coil conductor will be exemplified.

Figure 35A:
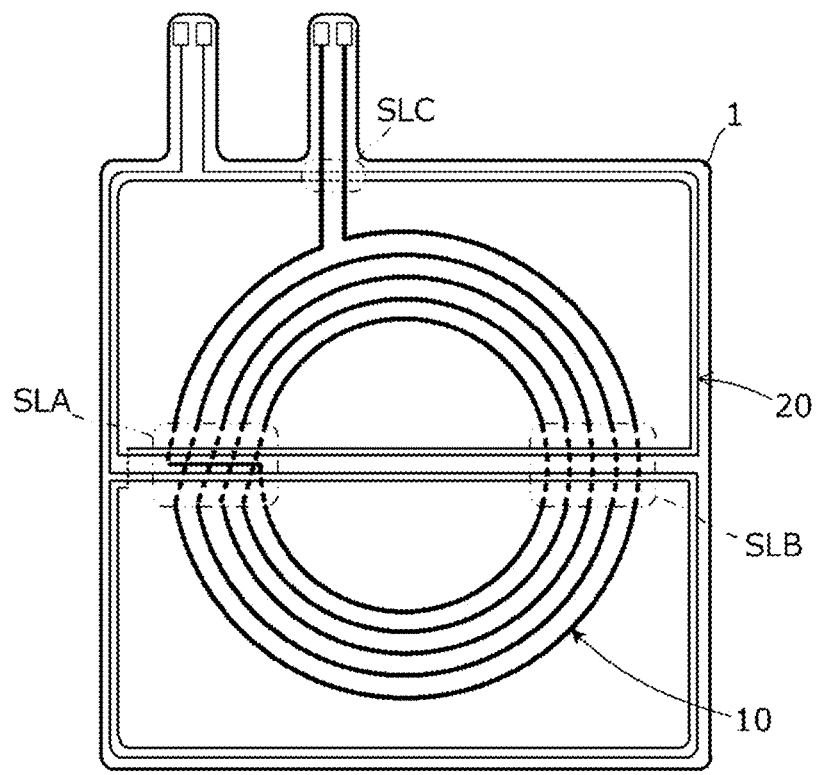
FIG. 35A is a plan view of an antenna device according to a twenty-first preferred embodiment of the present invention.
Figure 35B:
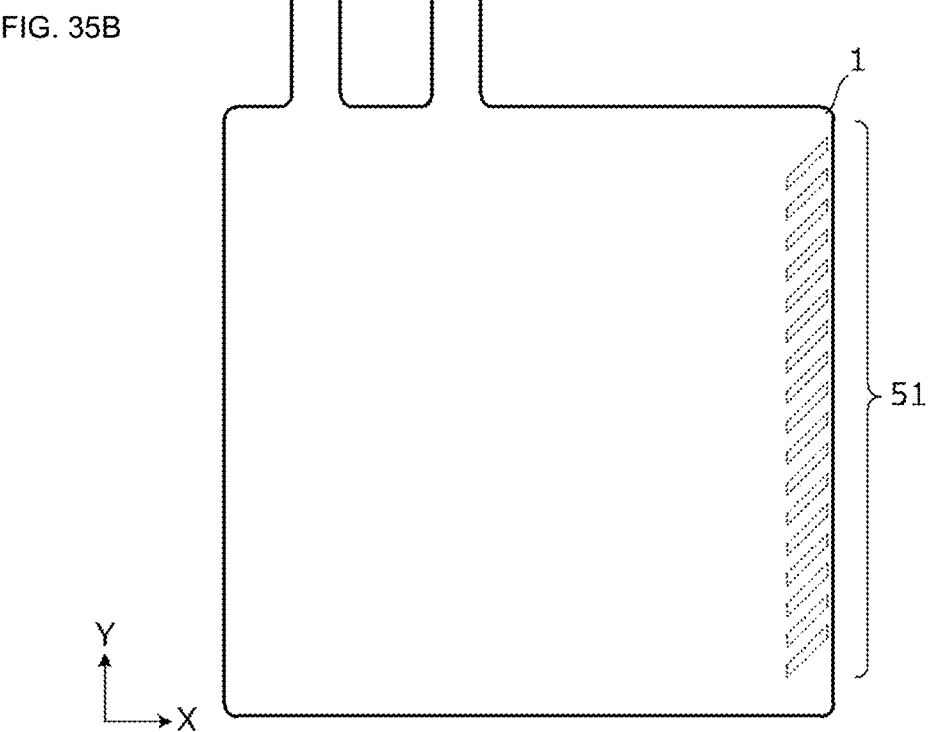
FIG. 35B is a plan view illustrating an electrode provided on the lower surface of the base material 1 of the antenna device.

FIG. 35A is a plan view of an antenna device according to the twenty-first preferred embodiment, and FIG. 35B is a plan view illustrating an electrode provided on the lower surface of the base material 1 of the antenna device.

The antenna device illustrated in FIGS. 35A and 35B includes the base material 1, the first coil 10, and the second coil 20. The configurations of the first coil 10 and the second coil 20 are as illustrated in FIGS. 29A and 29B.

A reinforcing electrode 51 is provided on the lower surface of the base material 1 along the right side of the base material 1. The reinforcing electrode 51 is, for example, a copper foil pattern of a flexible substrate. The reinforcing electrode 51 is an assembly of a plurality of electrodes each inclined from the X direction and the Y direction.

As described above, by providing the reinforcing electrode 51 on the base material 1, the rigidity of the antenna device is increased, and the antenna device can be easily incorporated into a housing of an electronic apparatus such as, for example, a smartphone and easily replaced. In addition, since the reinforcing electrode 51 is an assembly of a plurality of electrodes insulated from each other, an eddy current is less likely to flow through the reinforcing electrode 51 as compared with a case where the reinforcing electrode is a single continuous electrode, and thus the reinforcing electrode 51 is less likely to interfere with a magnetic flux generated by the antenna device or a magnetic flux entering the antenna device. Thus, the antenna device can have rigidity while maintaining the characteristics of wireless power reception and short-range wireless communication.

Twenty-Second Preferred Embodiment

In a twenty-second preferred embodiment of the present invention, an electronic apparatus in which a member inside a housing of the electronic apparatus is effectively used as a portion of an antenna will be exemplified.

Figure 36:
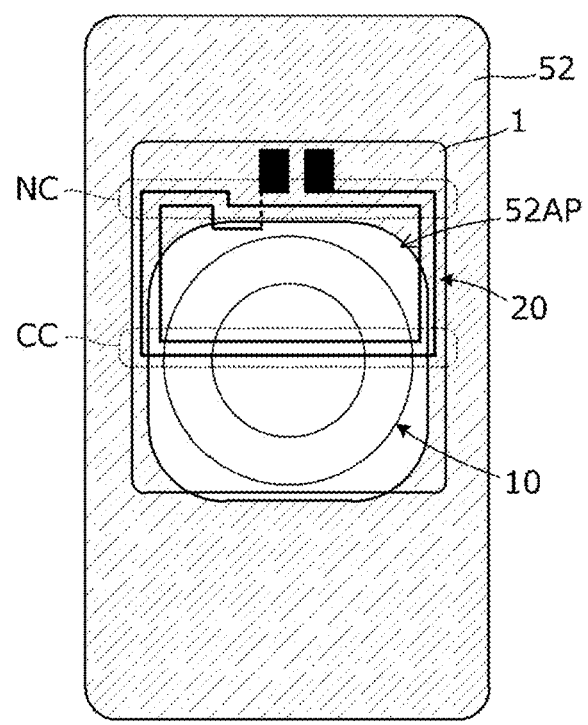
FIG. 36 is a plan view illustrating an internal configuration of an electronic apparatus according to a twenty-second preferred embodiment of the present invention.

FIG. 36 is a plan view illustrating an internal configuration of an electronic apparatus according to the twenty-second preferred embodiment. An antenna device including the base material 1, the first coil 10, and the second coil 20, and an internal metal frame 52 are provided in a housing of the electronic apparatus.

The internal metal frame 52 includes an opening 52AP. The opening 52AP electromagnetically exposes a communication contributing portion CC of the second coil 20 that contributes to communication, and electromagnetically hides a communication non-contributing portion NC that does not contribute to communication.

As described above, the communication non-contributing portion NC is electromagnetically hidden, such that the directivity can be directed toward the front end of the electronic apparatus. Further, a current is induced in the internal metal frame 52 due to the coupling between an edge of the opening of the internal metal frame 52 and the communication non-contributing portion NC, and the internal metal frame 52 can be used as a booster.

Twenty-Third Preferred Embodiment

In a twenty-third preferred embodiment of the present invention, an antenna device including a first magnetic body having a shape different from that of the examples described so far will be exemplified.

Figure 37A:
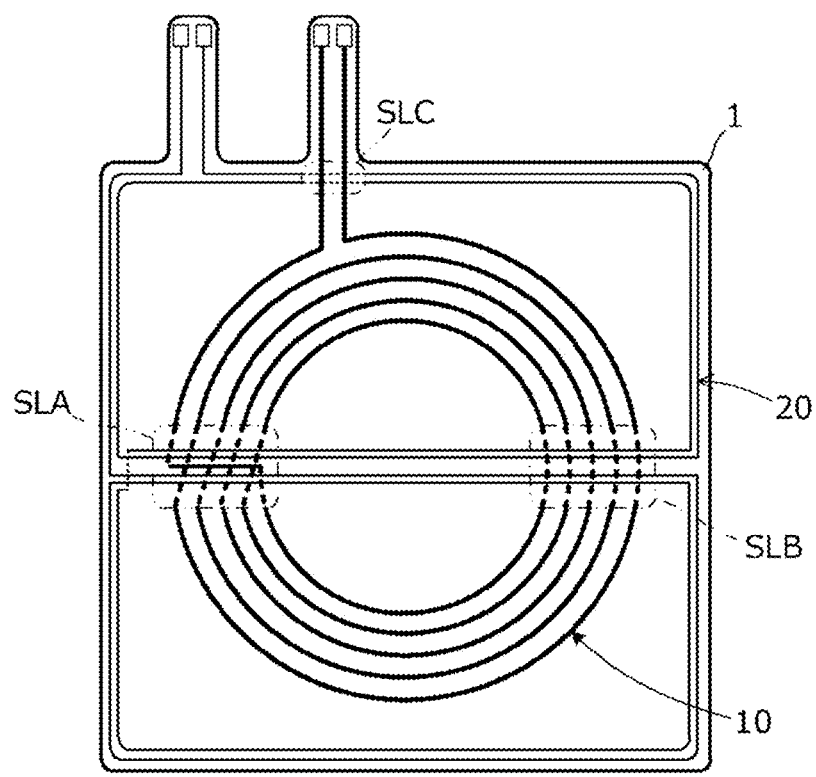
FIG. 37A is a plan view of an antenna device according to a twenty-third preferred embodiment of the present invention.
Figure 37B:
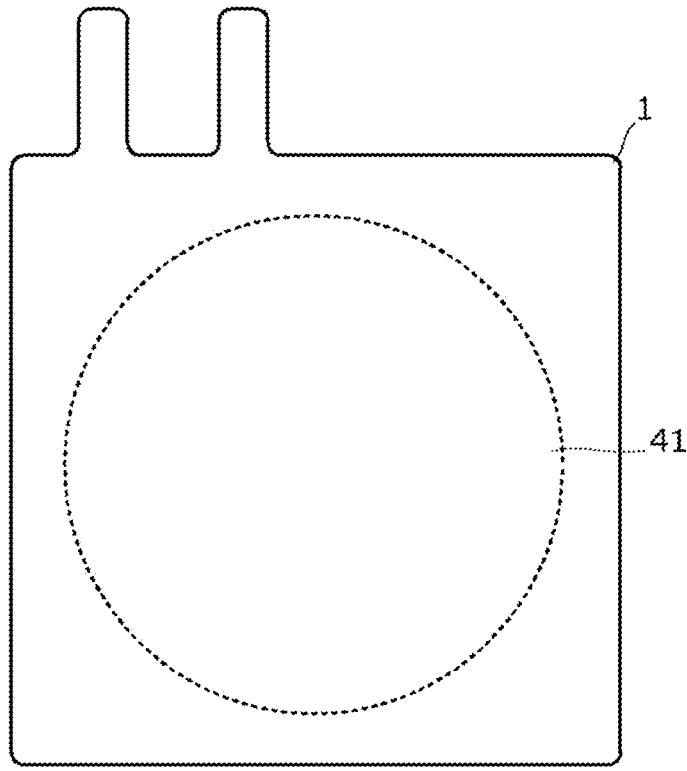
FIG. 37B is a plan view illustrating a shape of the first magnetic body 41 provided on the lower surface of the base material 1 of the antenna device.

FIG. 37A is a plan view of the antenna device according to the twenty-third preferred embodiment, and FIG. 37B is a plan view illustrating the shape of the first magnetic body 41 provided on the lower surface of the base material 1 of the antenna device.

The antenna device illustrated in FIGS. 37A and 37B includes the base material 1, the first coil 10, and the second coil 20. The configurations of the first coil 10 and the second coil 20 are as illustrated in FIGS. 29A and 29B.

The first magnetic body 41 has a circular or substantially circular shape equal to or slightly larger than the outer shape of the first coil 10. The first magnetic body 41 is, for example, a nanocrystal sheet. The first magnetic body 41 overlaps a portion of the second coil 20 that intersects the first coil 10.

The first magnetic body 41 overlaps the entire or substantially the entire first coil 10. Even when the area of the first magnetic body 41 is small, the wireless power reception performance is not significantly affected. In the present preferred embodiment, it is possible to reduce the area of the first magnetic body 41 while having the advantageous effects of the structure of another antenna device 107B according to the seventh preferred embodiment (FIGS. 15A and 15B).

Twenty-Fourth Preferred Embodiment

In a twenty-fourth preferred embodiment of the present invention, an antenna device in which the configuration of two second coil openings of a second coil are different from that of the examples described so far will be exemplified.

Figure 38A:
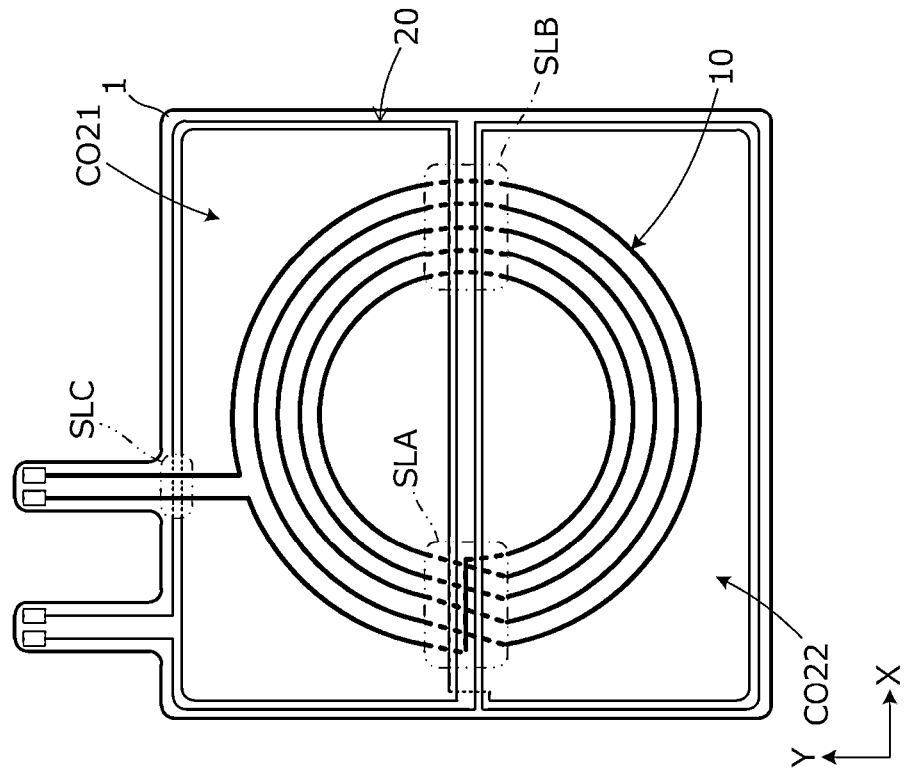
FIG. 38A is a plan view of an antenna device according to a twenty-fourth preferred embodiment of the present invention.
Figure 38B:
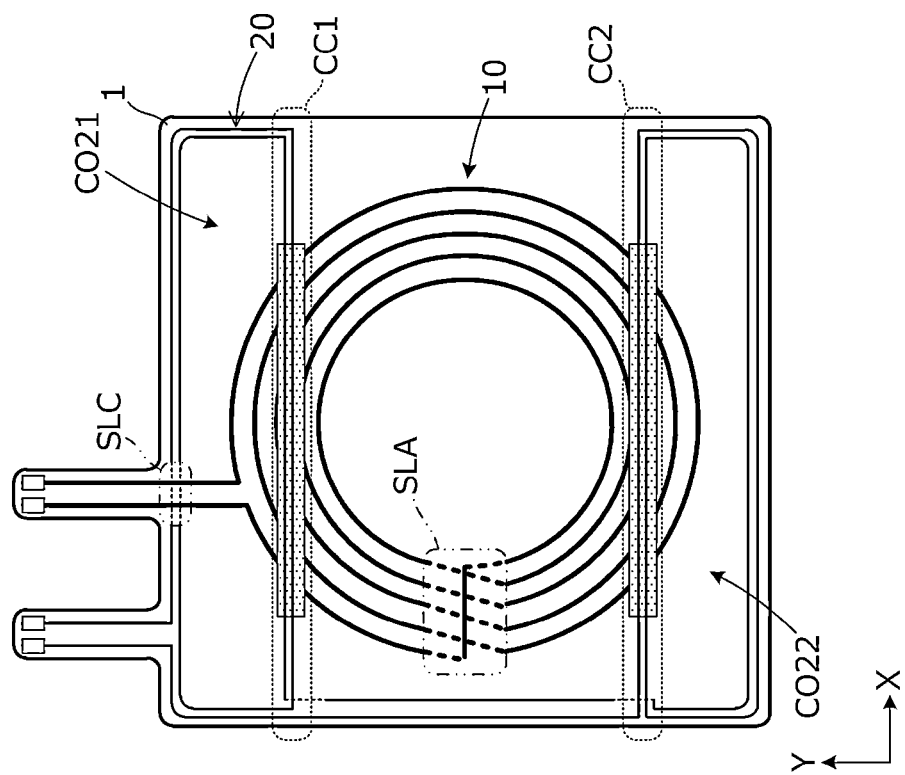
FIG. 38B is a plan view of an antenna device as a comparative example.

FIG. 38A is a plan view of an antenna device according to the twenty-fourth preferred embodiment, and FIG. 38B is a plan view of an antenna device as a comparative example. The antenna device according to the comparative example is the same or substantially the same as the antenna device illustrated in FIG. 33A.

The second coil conductor of the second coil 20 defines two second coil openings CO21 and CO22, and in the antenna device illustrated in FIG. 38A, the second coil opening CO21 and the second coil opening CO22 are separated from each other in the Y direction. Communication contributing portions CC1 and CC2 that contribute to communication extend in the Y direction.

As described above, when the above-described communication contributing portion CC1 or CC2 is closer to a front end portion of the electronic apparatus, the directivity is changed, and communication at the front end portion of the electronic apparatus becomes easier.

Twenty-Fifth Preferred Embodiment

In a twenty-fifth preferred embodiment of the present invention, an antenna device in which the shape of a second coil is different from that of the examples described so far will be exemplified.

Figure 39A:
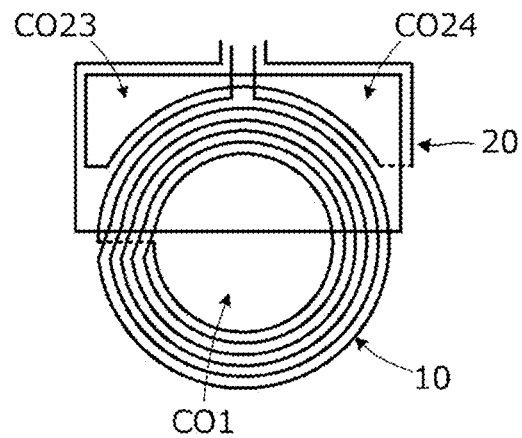
FIGS. 39A and 39B are plan views of an antenna device according to a twenty-fifth preferred embodiment of the present invention.
Figure 39B:
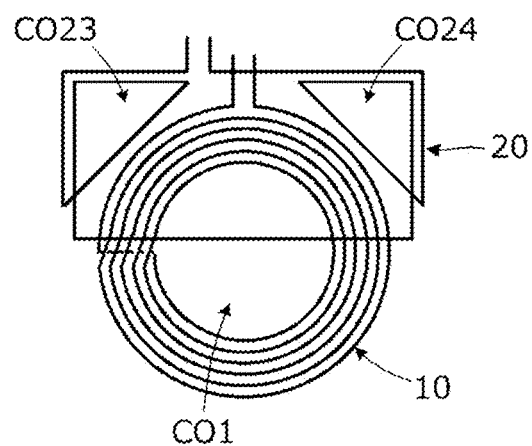

FIGS. 39A and 39B are plan views of an antenna device according to the twenty-fifth preferred embodiment. Each of the antenna devices includes the first coil 10 and the second coil 20. The second coil conductor of the second coil 20 includes a plurality of coil openings having different sizes. Small second coil openings CO23 and CO24 are provided outside the opening CO1 of the first coil 10.

Figure 40:
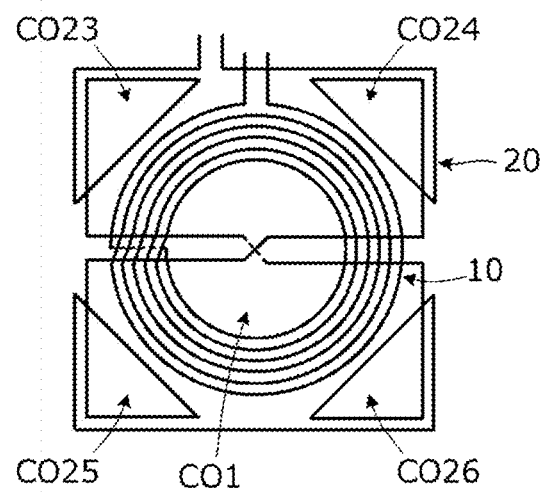
FIG. 40 is a plan view of another antenna device of the twenty-fifth preferred embodiment of the present invention.

FIG. 40 is a plan view of another antenna device of the present preferred embodiment. This antenna device also includes the first coil 10 and the second coil 20. The second coil conductor of the second coil 20 includes a plurality of coil openings having different sizes. The small second coil openings CO23 and CO24 and small second coil openings CO25 and CO26 are provided outside the opening CO1 of the first coil 10.

According to the present preferred embodiment, by biasing the distribution of the second coil openings, it is possible to set the directivity of the antenna for short-range wireless communication by the second coil 20. For example, the directivity can be directed toward the front end of the electronic apparatus.

Further, the unnecessary coupling between the second coil 20 and the first coil 10 can be adjusted by the above-described small second coil openings CO23, CO24, CO25, and CO26. That is, the unnecessary coupling can be adjusted by the positional relationship and the winding direction (coupling polarity) of the second coil openings CO23, CO24, CO25, and CO26 and the first coil opening CO1.

Further, since a line length of the second coil conductor can be adjusted by the conductor pattern defining the above-described second coil openings CO23, CO24, CO25, and CO26, the second coil 20 can be easily set to a predetermined inductance.

Twenty-Sixth Preferred Embodiment

In a twenty-sixth preferred embodiment of the present invention, some examples of the positional relationship between a magnetic body included in an antenna device and a first coil and a second coil will be described.

Figure 41A:
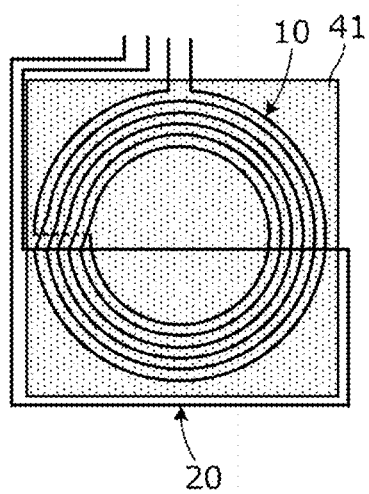
FIGS. 41A and 41B are plan views of an antenna device according to a twenty-sixth preferred embodiment of the present invention.
Figure 41B:
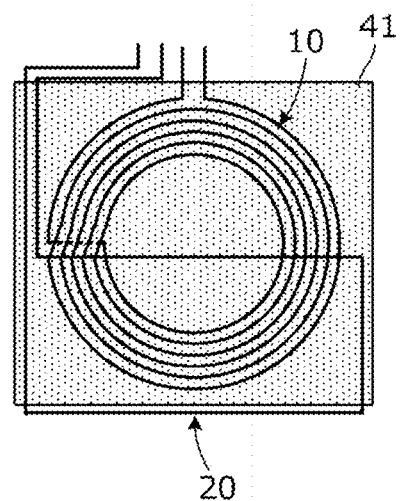
Figure 42A:
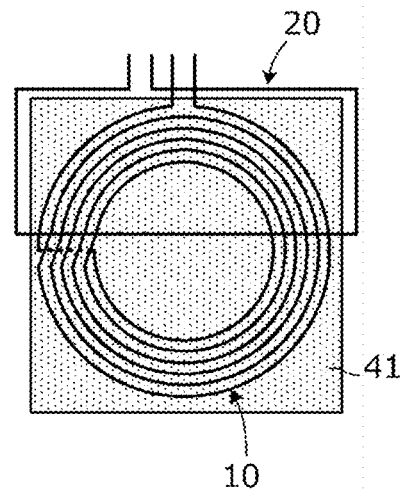
FIGS. 42A and 42B are plan views of the antenna device according to the twenty-sixth preferred embodiment of the present invention.
Figure 42B:
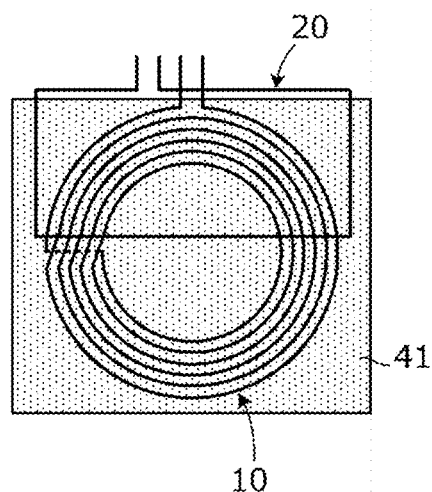

FIGS. 41A, 41B, FIGS. 42A and 42B are plan views of an antenna device according to the twenty-sixth preferred embodiment. In the example of FIG. 41A, the first magnetic body 41 does not overlap the right and left sides and the lower side of the second coil 20. In the example of FIG. 41B, the first magnetic body 41 overlaps the right and left sides of the second coil 20. In addition, in the example of FIG. 42A, the first magnetic body 41 does not overlap the right and left sides and the upper side of the second coil 20. In the example of FIG. 42B, the first magnetic body 41 overlaps the right and left sides of the second coil 20.

As illustrated in the examples of FIG. 41B and FIG. 42B, the magnetic body may overlap the right and left sides of the second coil conductor. The magnetic body may overlap the entire or substantially the entire second coil, but it is preferable that the magnetic body does not overlap a portion or an entire other than the central line (the upper side in FIGS. 41A and 41B and the lower side in FIGS. 42A and 42B, which mainly contributes to communication.

In addition, in the examples of FIGS. 41A and 41B, since the second coil conductor is not provided in an upper portion of the antenna device, a null point (a point at which communication cannot be performed due to a positional relationship of a coil with a communication partner) is less likely to occur in a range towards the upper portion. Similarly, in the examples of FIGS. 42A and 42B, since the second coil conductor is not provided in a lower portion of the antenna device, a null point is less likely to occur in a range towards the lower portion.

Figure 43:
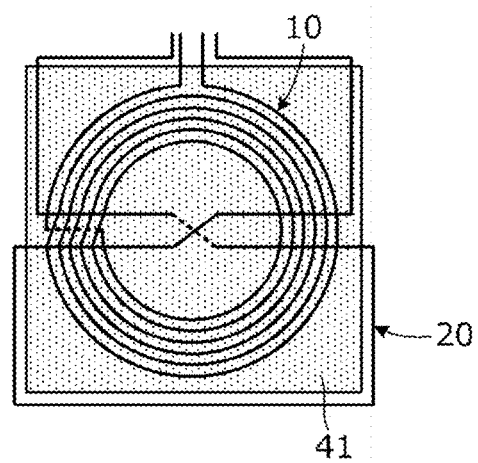
FIG. 43 is a plan view of another antenna device according to the twenty-sixth preferred embodiment of the present invention.
Figure 44A:
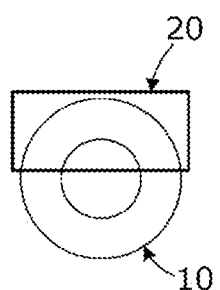
FIGS. 44A to 44E are schematic plan views of an antenna device according to a twenty-seventh preferred embodiment of the present invention.
Figure 44B:
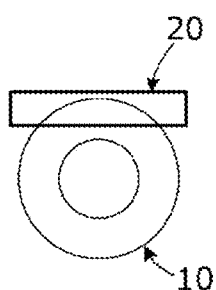
Figure 44C:
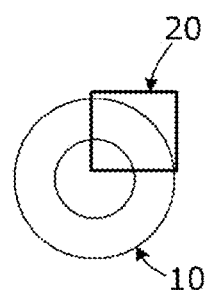
Figure 44D:
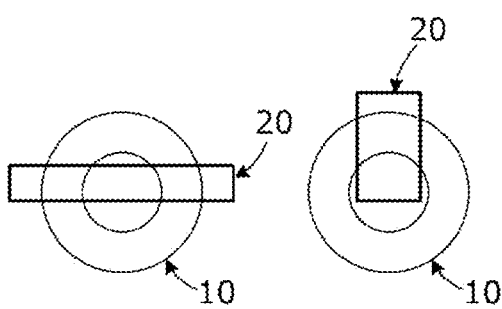
Figure 44E:
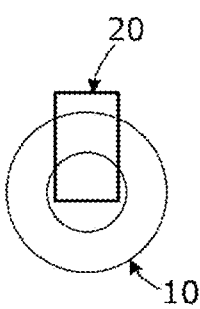
Figure 45A:
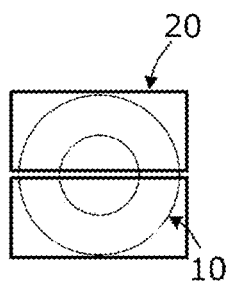
FIGS. 45A to 45J are schematic plan views of another antenna device according to the twenty-seventh preferred embodiment of the present invention.
Figure 45B:
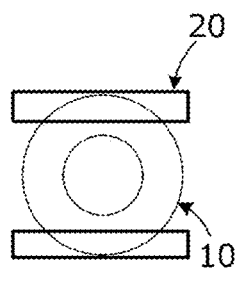
Figure 45C:
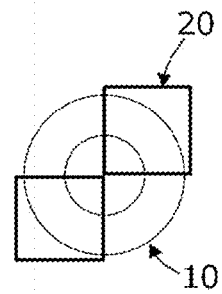
Figure 45D:
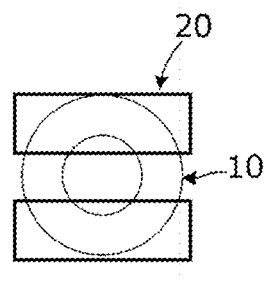
Figure 45E:
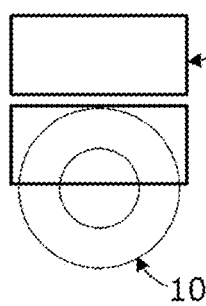
Figure 45F:
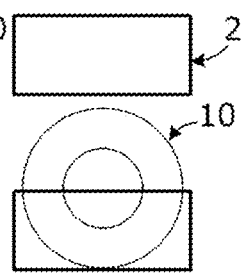
Figure 45G:
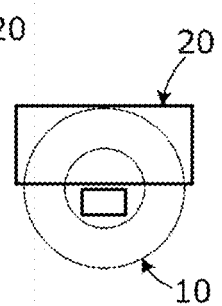
Figure 45H:
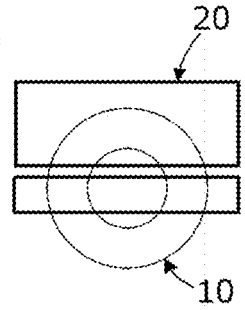
Figure 45I:
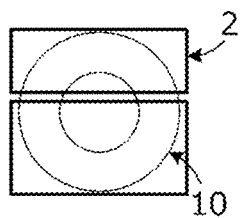
Figure 45J:
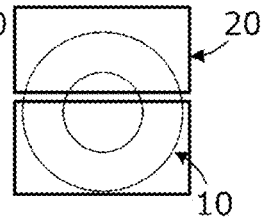
Figure 46A:
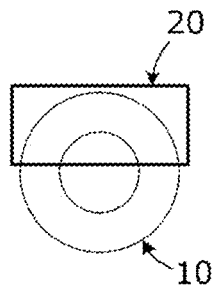
FIGS. 46A to 46M are schematic plan views of an antenna device according to a twenty-eighth preferred embodiment of the present invention.
Figure 46B:
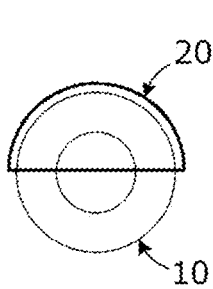
Figure 46C:
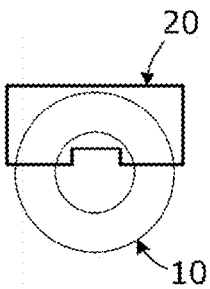
Figure 46D:
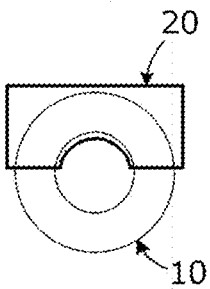
Figure 46E:
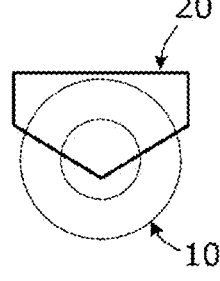
Figure 46F:
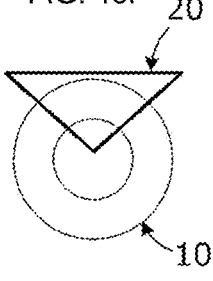
Figure 46G:
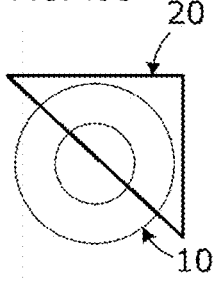
Figure 46H:
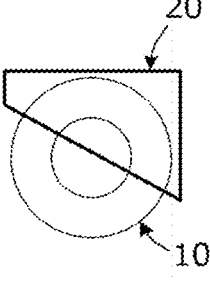
Figure 46I:
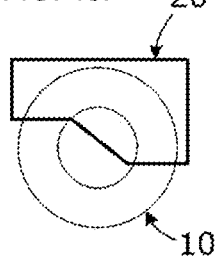
Figure 46J:
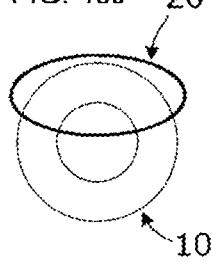
Figure 46K:
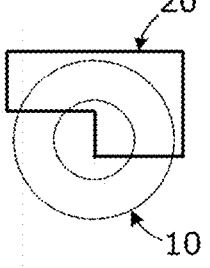
Figure 46L:
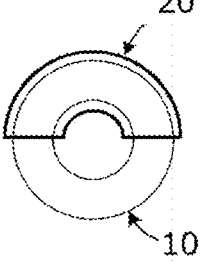
Figure 46M:
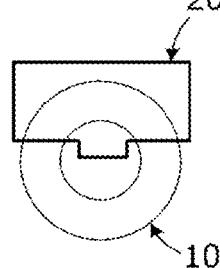

FIG. 43 is a plan view of another antenna device according to the twenty-sixth preferred embodiment. In this example, a lower half portion and an upper half portion of the second coil 20 are different in a loop size of the second coil conductor. The first magnetic body 41 does not overlap the right and left sides and the lower side in the lower half portion of the second coil 20, but the first magnetic body 41 overlaps the right and left sides in the upper half portion of the second coil 20.

In this manner, by providing a difference in overlap between the second coil conductor portions defining the two openings of the second coil 20 and the magnetic body, it is possible to determine the directivity of the antenna for short-range wireless communication by the second coil 20.

Twenty-Seventh Preferred Embodiment

In a twenty-seventh preferred embodiment, some examples of the shape of a second coil and the arrangement relationship between a first coil and the second coil will be described.

FIGS. 44A to 44E are schematic plan views of an antenna device according to the twenty-seventh preferred embodiment. Each of the antenna devices includes the second coil 20 including one main second coil opening and the first coil 10. In these figures, the first coil 10 and the second coil 20 show schematic shapes. The basic configurations of the first coil 10 and the second coil 20 are the same or substantially the same as those described so far. The shape of the second coil 20 and the arrangement relationship between the first coil 10 and the second coil 20 may be as described above.

FIGS. 45A to 45J are schematic plan views of another antenna device according to the twenty-seventh preferred embodiment. Each of the antenna devices includes the second coil 20 including two main second coil openings and the first coil 10. In these figures, the first coil 10 and the second coil 20 show schematic shapes. The basic configurations of the first coil 10 and the second coil 20 are the same or substantially the same as those described so far. The shape of the second coil 20 and the arrangement relationship between the first coil 10 and the second coil 20 may be such as described above.

The second coil may be configured by combining the second coils in the plurality of antenna devices described above. Further, the arrangement of the second coil in the up-down and right-left directions may be changed.

Twenty-Eighth Preferred Embodiment

In a twenty-eighth preferred embodiment, some examples of the shape of a second coil and the arrangement relationship between a first coil and the second coil will be described.

FIGS. 46A to 46M are schematic plan views of an antenna device according to the twenty-eighth preferred embodiment. Each of the antenna devices includes the first coil 10 and the second coil 20 including one main second coil opening. In these figures, the first coil 10 and the second coil 20 show schematic shapes. The basic configurations of the first coil 10 and the second coil 20 are the same or substantially the same as those described so far. The shape of the second coil 20 and the arrangement relationship between the first coil 10 and the second coil 20 may be such as described above.

Figure 47A:
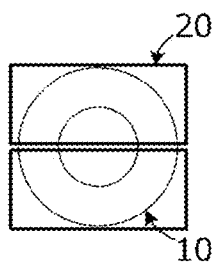
FIGS. 47A to 47S are schematic plan views of another antenna device according to the twenty-eighth preferred embodiment of the present invention.
Figure 47B:
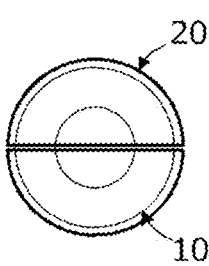
Figure 47C:
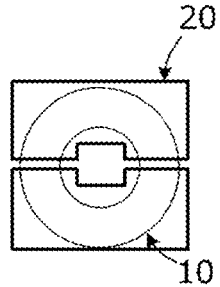
Figure 47D:
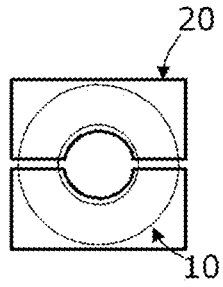
Figure 47E:
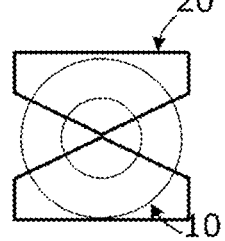
Figure 47F:
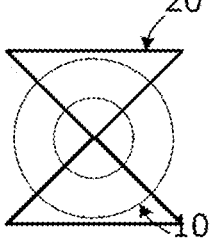
Figure 47G:
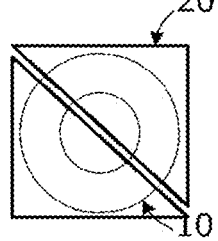
Figure 47H:
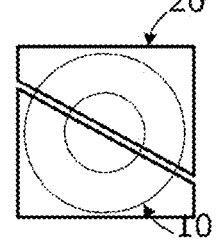
Figure 47I:
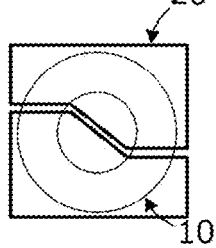
Figure 47J:
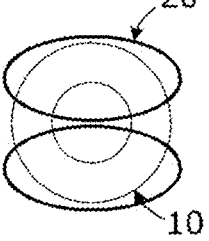
Figure 47K:
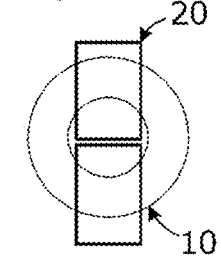
Figure 47L:
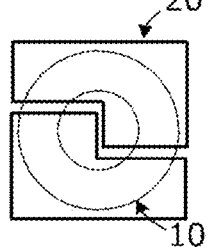
Figure 47M:
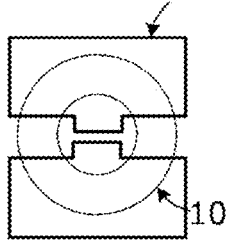
Figure 47N:
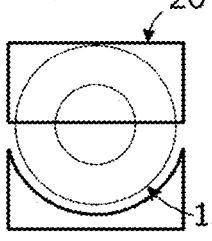
Figure 47O:
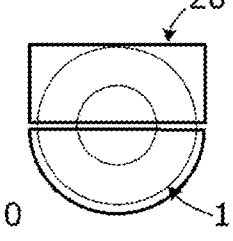
Figure 47P:
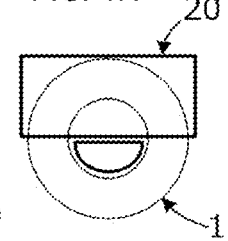
Figure 47Q:
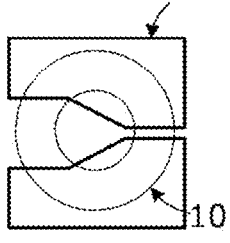
Figure 47R:
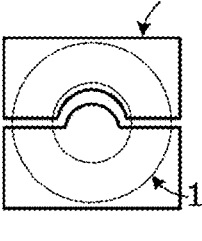
Figure 47S:
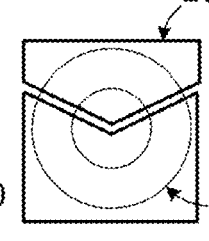
Figure 48A:
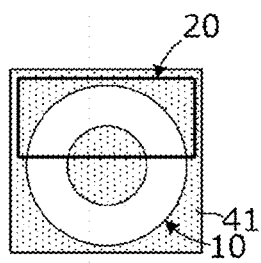
FIGS. 48A to 48E are schematic plan views of the antenna device according to a twenty-ninth preferred embodiment of the present invention.
Figure 48B:
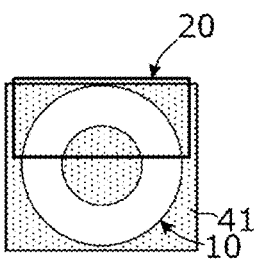
Figure 48C:
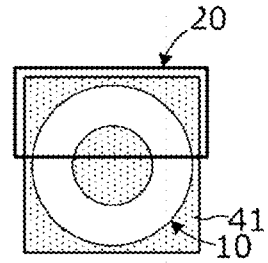
Figure 48D:
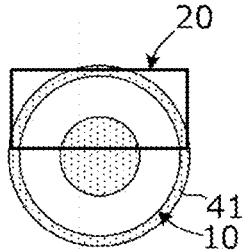
Figure 48E:
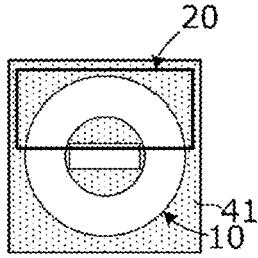
Figure 49A:
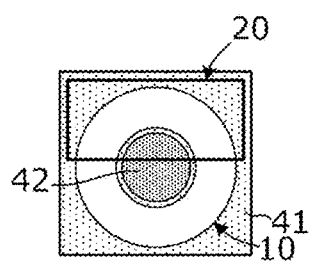
Figure 49B:
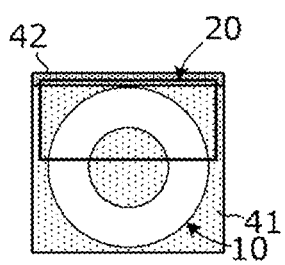
Figure 49C:
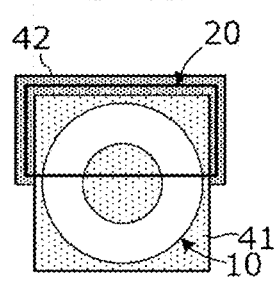
Figure 49D:
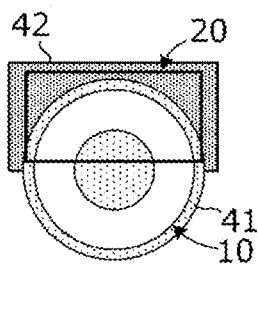
Figure 49E:
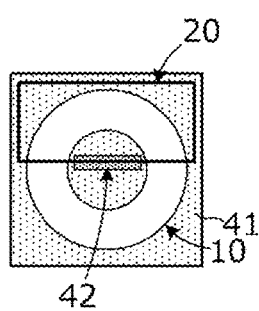

FIGS. 47A to 47S are schematic plan views of another antenna device according to the twenty-eighth preferred embodiment. Each of the antenna devices includes the first coil 10 and the second coil 20 including one main second coil opening. In these figures, the first coil 10 and the second coil 20 show schematic shapes. The basic configurations of the first coil 10 and the second coil 20 are the same or substantially the same as those described so far. The shape of the second coil 20 and the arrangement relationship between the first coil 10 and the second coil 20 may be such as described above.

The second coil may be configured by combining the second coils in the plurality of antenna devices described above. Further, the arrangement of the second coil in the up-down and right-left directions may be changed.

Twenty-Ninth Preferred Embodiment

In a twenty-ninth preferred embodiment of the present invention, some examples of the shape of a second coil and the arrangement relationship between a first coil and the second coil will be described.

FIGS. 48A to 48E are schematic plan views of an antenna device according to the twenty-ninth preferred embodiment. Each of the antenna devices includes the first magnetic body 41, the second coil 20 including one main second coil opening, and the first coil 10. In these figures, the first coil 10 and the second coil 20 show schematic shapes. The basic configurations of the first coil 10 and the second coil 20 are the same or substantially the same as those described so far. The shape of the first magnetic body 41 and the arrangement relationship of the first magnetic body 41 with respect to the first coil 10 and the second coil 20 may be such as described above.

FIGS. 49A to 49H are schematic plan views of another antenna device according to the twenty-ninth preferred embodiment. Each of the antenna devices includes the first magnetic body 41, the second magnetic body 42, the second coil 20 including one main second coil opening, and the first coil 10. In these figures, the first coil 10 and the second coil 20 show schematic shapes. The basic configurations of the first coil 10 and the second coil 20 are the same or substantially the same as those described so far. The shapes of the first magnetic body 41 and the second magnetic body 42 and the arrangement relationship of the first magnetic body 41 and the second magnetic body 42 with respect to the first coil 10 and the second coil 20 may be such as described above. Further, the second magnetic body 42 may overlap the first magnetic body 41, or an opening may be provided in the first magnetic body 41 at a portion where the second magnetic body 42 is provided.

FIGS. 50A to 50G are schematic plan views of another antenna device according to the twenty-ninth preferred embodiment. Each of the antenna devices includes the first magnetic body 41, the second coil 20 including two main second coil openings, and the first coil 10. In these figures, the first coil 10 and the second coil 20 show schematic shapes. The basic configurations of the first coil 10 and the second coil 20 are the same or substantially the same as those described so far. The shape of the first magnetic body 41 and the arrangement relationship of the first magnetic body 41 with respect to the first coil 10 and the second coil 20 may be such as described above.

FIGS. 51A to 51G are schematic plan views of another antenna device according to the twenty-ninth preferred embodiment. Each of the antenna devices includes the first magnetic body 41, the second magnetic body 42, the second coil 20 including two main second coil openings, and the first coil 10. In these figures, the first coil 10 and the second coil 20 show schematic shapes. The basic configurations of the first coil 10 and the second coil 20 are the same or substantially the same as those described so far. The shapes of the first magnetic body 41 and the second magnetic body 42 and the arrangement relationship of the first magnetic body 41 and the second magnetic body 42 with respect to the first coil 10 and the second coil 20 may be such as described above.

Thirtieth Preferred Embodiment

In a thirtieth preferred embodiment of the present invention, an example of an antenna device including a first coil, a second coil, and a third coil will be described.

Figure 52:
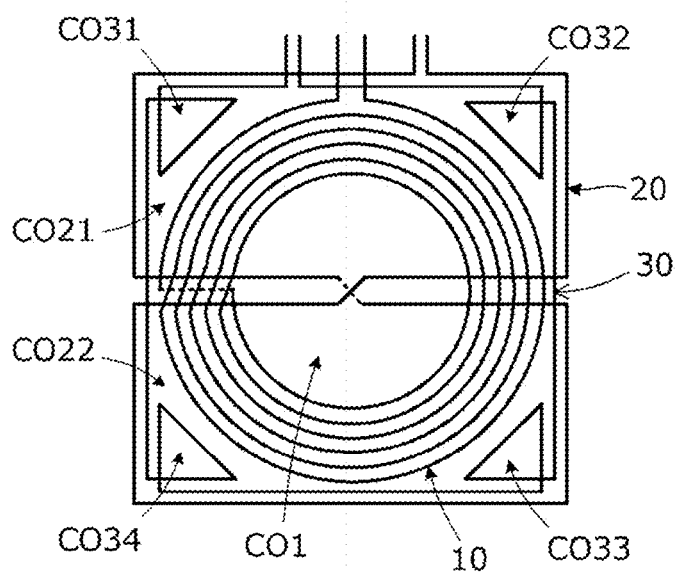
FIG. 52 is a plan view of an antenna device according to a thirtieth preferred embodiment of the present invention.
Figure 53:
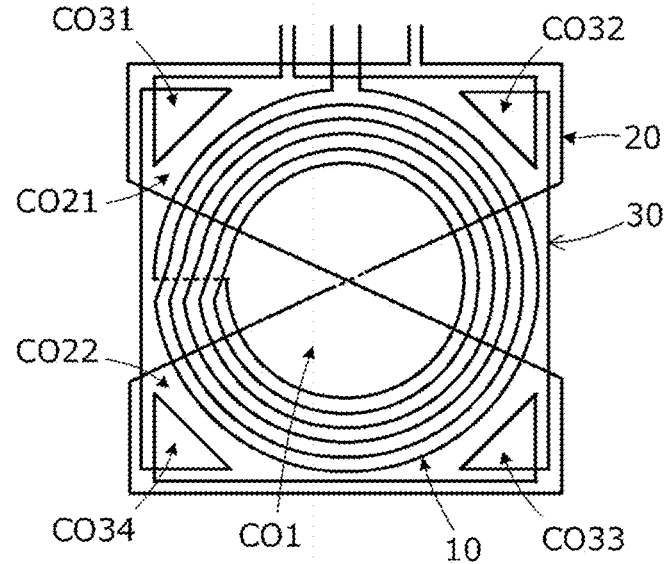
FIG. 53 is a plan view of another antenna device according to the thirtieth preferred embodiment of the present invention.

FIG. 52 is a plan view of an antenna device according to the thirtieth preferred embodiment. FIG. 53 is a plan view of another antenna device according to the thirtieth preferred embodiment. Each of the antenna devices includes the first coil 10, the second coil 20, and the third coil 30. The basic configuration of the first coil 10 is the same or substantially the same as that described so far. The coil conductor of the third coil 30 includes each of the third coil openings CO31 and CO32 and third coil openings CO33 and CO34 close to the first coil 10. With this configuration, unnecessary coupling between the first coil 10 and the third coil 30 can be reduced or prevented.

Thirty-First Preferred Embodiment

In a thirty-first preferred embodiment of the present invention, an example of an antenna device including a first coil, a second coil, and a third coil will be described.

Figure 54:
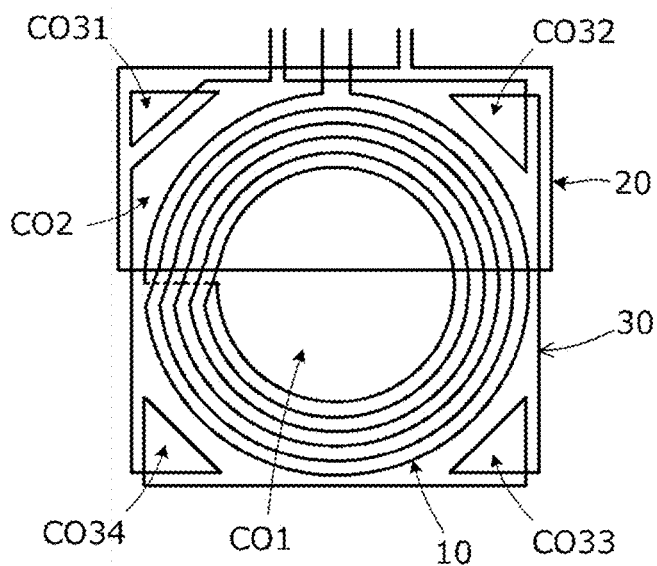
FIG. 54 is a plan view of an antenna device according to a thirty-first preferred embodiment of the present invention.

FIG. 54 is a plan view of an antenna device according to the thirty-first preferred embodiment. The antenna device includes the first coil 10, the second coil 20, and the third coil 30. The basic configuration of the first coil 10 is the same or substantially the same as that described so far. The third coil openings CO31, CO32, CO33, and CO34 of the third coil 30 each are provided outside the first coil 10. The third coil openings CO31 and CO32 are provided inside the two corners of the second coil 20. The second coil opening CO2 and the third coil openings CO31 and CO32 are magnetically coupled to each other due to overlap of the coil openings. However, the winding directions of the third coil opening CO31 and the third coil opening CO32 are opposite to each other. Therefore, unnecessary coupling between the second coil 20 and the third coil 30 can be reduced or prevented by appropriately determining the degree of coupling in which the polarities of the coupling are opposite to each other. In addition, unnecessary coupling between the first coil 10 and the third coil 30 can also be reduced or prevented by appropriately determining the degree of coupling in the above-described opposite relationship to each other.

Figure 55:
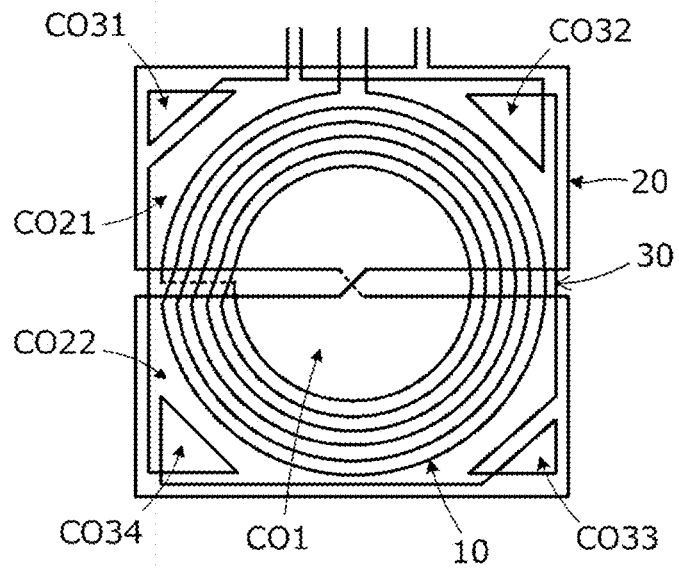
FIG. 55 is a plan view of another antenna device according to the thirty-first preferred embodiment of the present invention.

FIG. 55 is a plan view of another antenna device according to the thirty-first preferred embodiment. The antenna device includes the first coil 10, the second coil 20, and the third coil 30. The basic configuration of the first coil 10 is the same or substantially the same as that described so far. The coil conductor of the third coil 30 defines the third coil openings CO31, CO32, CO33, and CO34 inside the four corners of the second coil 20, respectively. The second coil opening CO21 and the third coil openings CO31 and CO32 are magnetically coupled to each other due to overlap of the coil openings. However, the winding directions of the third coil opening CO31 and the third coil opening CO32 are opposite to each other. Similarly, the second coil opening CO22 and the third coil openings CO33 and CO34 are magnetically coupled to each other due to overlap of the coil openings. However, the winding directions of the third coil opening CO33 and the third coil opening CO34 are opposite to each other. Therefore, unnecessary coupling between the second coil 20 and the third coil 30 can be reduced or prevented by appropriately determining the degree of coupling in which the polarities are opposite to each other. In addition, unnecessary coupling between the first coil 10 and the third coil 30 can also be reduced or prevented by appropriately determining the degree of coupling in the above-described opposite relationship to each other.

Thirty-Second Preferred Embodiment

In a thirty-second preferred embodiment of the present invention, an example of an antenna device including a first coil, a second coil, and a third coil will be described.

Figure 56:
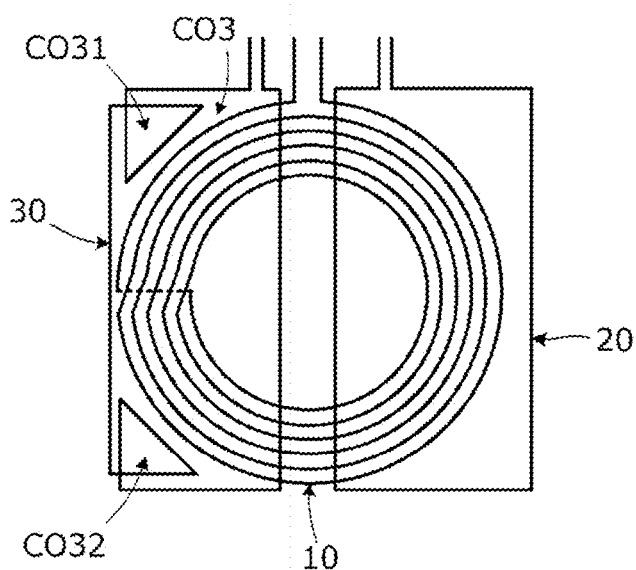
FIG. 56 is a plan view of an antenna device according to a thirty-second preferred embodiment of the present invention.

FIG. 56 is a plan view of an antenna device according to the thirty-second preferred embodiment. The antenna device includes the first coil 10, the second coil 20, and the third coil 30. The basic configuration of the first coil 10 is the same or substantially the same as that described so far. The third coil 30 does not overlap the second coil 20. The third coil 30 includes third coil openings CO3 and the third coil openings CO31 and CO32, and the third coil 30 and the second coil 20 are magnetically coupled to each other. However, since the third coil openings CO31 and CO32 of the third coil 30 are provided at positions farther away from the second coil 20, unnecessary coupling between the second coil 20 and the third coil 30 is small.

Thirty-Third Preferred Embodiment

In a thirty-third preferred embodiment of the present invention, an example of an antenna device including a first coil, a second coil, and a third coil will be described.

Figure 57:
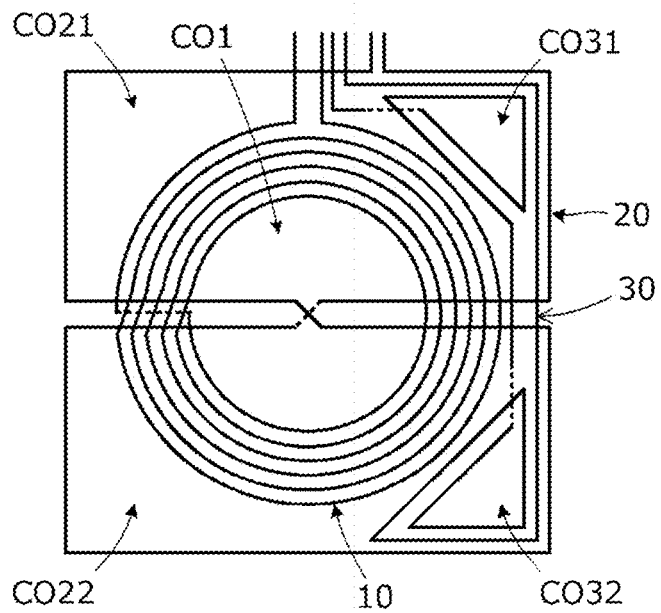
FIG. 57 is a plan view of an antenna device according to a thirty-third preferred embodiment of the present invention.
Figure 58A:
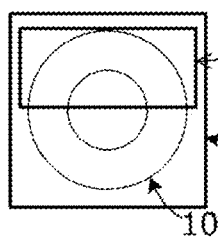
FIGS. 58A to 58E are plan views of an antenna device according to a thirty-fourth preferred embodiment of the present invention.
Figure 58B:
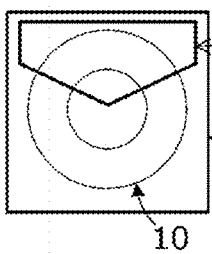
Figure 58C:
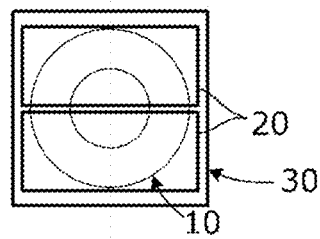
Figure 58D:
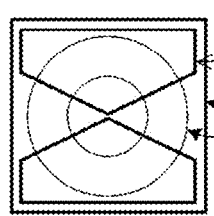
Figure 58E:
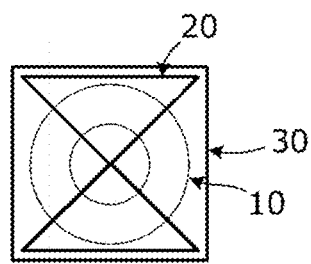
Figure 59A:
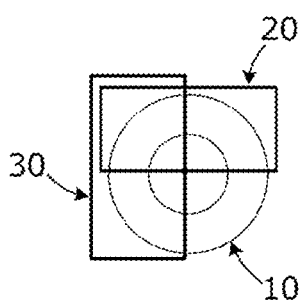
FIGS. 59A to 59D are plan views of another antenna device according to the thirty-fourth preferred embodiment of the present invention.
Figure 59B:
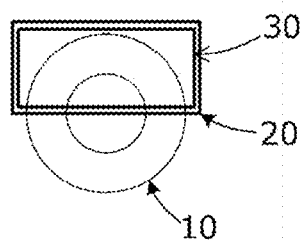
Figure 59C:
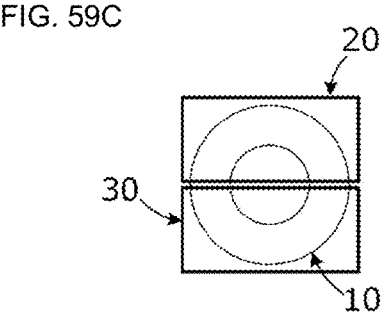
Figure 59D:
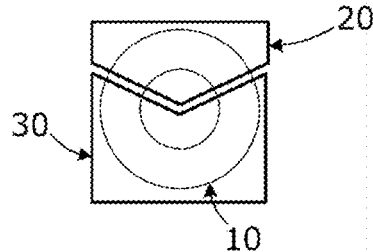

FIG. 57 is a plan view of an antenna device according to the thirty-third preferred embodiment. The antenna device includes the first coil 10, the second coil 20, and the third coil 30. The basic configuration of the first coil 10 is the same or substantially the same as that described so far. The third coil opening CO31 is provided inside a corner of the second coil opening CO21. Similarly, the third coil opening CO32 is provided inside a corner of the second coil opening CO22. The coupling between the third coil opening CO31 and the second coil opening CO21 and the coupling between the third coil opening CO32 and the second coil opening CO22 have opposite polarities. Therefore, unnecessary coupling between the second coil 20 and the third coil 30 can be reduced or prevented by appropriately determining the degree of coupling in which the polarities are opposite to each other.

In the present preferred embodiment, since the third coil opening does not overlap the first coil opening CO1, unnecessary coupling between the first coil 10 and the third coil 30 is small.

Thirty-Fourth Preferred Embodiment

In a thirty-fourth preferred embodiment, some examples of the shape and arrangement of each coil in an antenna device including a first coil, a second coil, and a third coil will be described.

FIGS. 58A to 58E are plan views of an antenna device according to the thirty-fourth preferred embodiment. Each of the antenna devices includes the first coil 10, the second coil 20, and the third coil 30. In these figures, each of the coils shows a schematic shape. The basic configuration of each coil is the same or substantially the same as that described so far.

In the examples illustrated in FIGS. 58A to 58E, the third coil 30 including a large overall loop and the second coil 20 including a smaller loop are provided, but the third coil 30 and the second coil 20 may be in the opposite relationship to each other (may be interchanged).

FIGS. 59A to 59D are plan views of another antenna device according to the thirty-fourth preferred embodiment. Each of the antenna devices includes the first coil 10, the second coil 20, and the third coil 30. In these figures, each of the coils shows a schematic shape. The basic configuration of each coil is the same or substantially the same as that described so far.

In the examples illustrated in FIGS. 59A to 59D, the second coil 20 and the third coil 30 having the same or substantially the same overall loop size are provided, but the third coil 30 and the second coil 20 may be in the opposite relationship to each other (may be interchange).

Figure 60A:
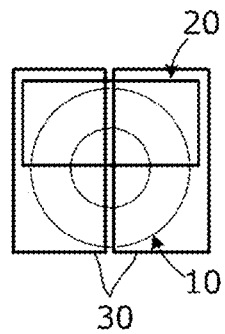
FIGS. 60A and 60B are plan views of another antenna device according to the thirty-fourth preferred embodiment of the present invention.
Figure 60B:
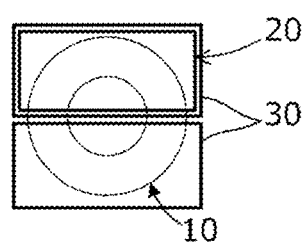

FIGS. 60A and 60B are plan views of another antenna device according to the thirty-fourth preferred embodiment. Each of the antenna devices includes the first coil 10, the second coil 20, and the third coil 30. In these figures, each of the coils shows a schematic shape. The basic configuration of each coil is the same or substantially the same as that described so far.

In the examples illustrated in FIGS. 60A and 60B, the third coil 30 having a figure-eight or substantially figure-eight or cc shape pattern and the second coil 20 having a single loop shape are provided, but the third coil 30 and the second coil 20 may be in the opposite relationship to each other (may be interchanged).

Figure 61A:
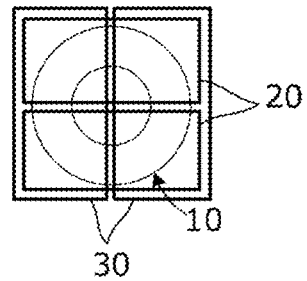
FIGS. 61A to 61C are plan views of another antenna device according to the thirty-fourth preferred embodiment of the present invention.
Figure 61B:
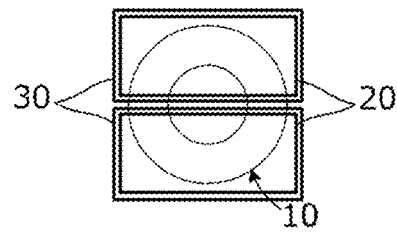
Figure 61C:
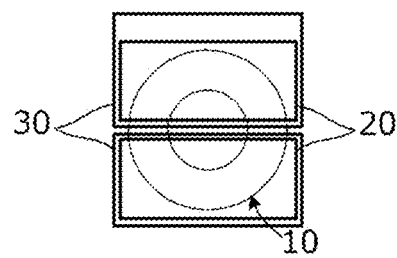

FIGS. 61A to 61C are plan views of another antenna device according to the thirty-fourth preferred embodiment. Each of the antenna devices includes the first coil 10, the second coil 20, and the third coil 30. In these figures, each of the coils shows a schematic shape. The basic configuration of each coil is the same or substantially the same as that described so far.

In the examples illustrated in FIGS. 61A to 61C, the second coil 20 and the third coil 30 having a figure-eight or substantially figure-eight or cc shape pattern are provided, but the third coil 30 and the second coil 20 may be in the opposite relationship to each other (may be interchanged).

Figure 62A:
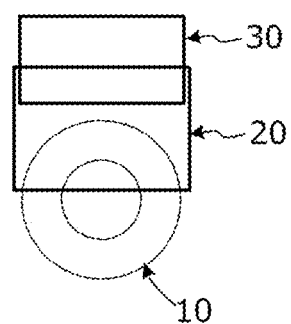
FIGS. 62A and 62B are plan views of another antenna device according to the thirty-fourth preferred embodiment of the present invention.
Figure 62B:
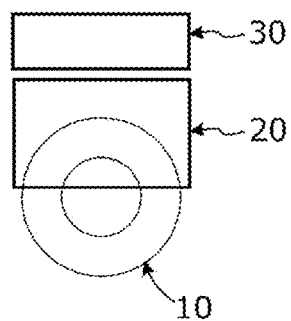

FIGS. 62A and 62B are plan views of another antenna device according to the thirty-fourth preferred embodiment. Each of the antenna devices includes the first coil 10, the second coil 20, and the third coil 30. In these figures, each of the coils shows a schematic shape. The basic configuration of each coil is the same or substantially the same as that described so far.

In the example illustrated in FIG. 62A, the coil opening of the second coil 20 and the coil opening of the third coil 30 partially overlap each other. In the example illustrated in FIG. 62B, the coil opening of the second coil 20 and the coil opening of the third coil 30 do not overlap each other. The third coil 30 and the second coil 20 may be in the opposite relationship to each other (may be interchanged). When the coil opening of the second coil 20 and the coil opening of the third coil 30 partially overlap each other, the antenna device can be reduced in size, and when the coil opening of the second coil 20 and the coil opening of the third coil 30 do not overlap each other, mutual magnetic field coupling can be reduced or prevented.

In each preferred embodiment of the present invention described above, an example in which the first coil is used for wireless power supply and the second coil is used for short-range communication has been described, but conversely, it is also possible to use the second coil for wireless power supply and use the first coil for short-range communication.

In addition, in each preferred embodiment of the present invention described above, examples in which the outlines of the first coil and the second coil are a circular or substantially circular shape, a rectangular or a substantially rectangular shape, and a semicircular or substantially semicircular shape have been described, but the outlines of the first coil and the second coil are not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
    a base material including a first surface and a second surface opposed to each other;
    a first coil on the base material and including a first coil conductor and a first coil opening; and
    a second coil on the base material and including a second coil conductor and a second coil opening; wherein
    a portion of the first coil overlaps the second coil opening of the second coil conductor in a plan view with respect to the base material;
    a portion of the second coil overlaps the first coil opening of the first coil conductor in the plan view with respect to the base material;
    the first coil conductor is on the first surface and the second surface;
    the first coil includes a portion in which the first coil conductor on the first surface and the first coil conductor on the second surface overlap each other in the plan view with respect to the base material;
    the first coil includes a first single-layer portion and a second single-layer portion in which the first coil conductor on the first surface and the first coil conductor on the second surface do not overlap each other in the plan view with respect to the base material, and the first coil conductor is only on the first surface of the base material; and
    a portion at which the second coil conductor intersects the first coil conductor is a portion of the second surface facing the first single-layer portion and a portion of the second surface facing the second single-layer portion in the plan view with respect to the base material.

2. The antenna device according to claim 1, wherein the first coil includes an extended conductor extending from an inner peripheral end of the first coil to an outer side of the first coil at a portion of the second surface facing the first single-layer portion or the second single-layer portion.

3. The antenna device according to claim 1, wherein a portion of the second coil conductor is along an edge of the base material.

4. The antenna device according to claim 1, wherein a plurality of coil openings are defined by the second coil conductor, and the plurality of coil openings includes coil openings in which generated magnetic fluxes have polarities opposite to each other.

5. The antenna device according to claim 4, wherein in the second coil conductor, a line width of a portion that overlaps the first coil opening of the first coil conductor is larger than a line width of another portion.

6. The antenna device according to claim 4, wherein sizes of the coil openings having the opposite polarities among the plurality of coil openings defined by the second coil conductor are different from each other.

7. The antenna device according to claim 4, wherein
    the first coil includes a third single-layer portion and a fourth single-layer portion in which the first coil conductor is provided only on the first surface of the base material; and
    a portion of the second coil conductor intersects the first coil conductor at a portion of the second surface facing the third single-layer portion and a portion of the second surface facing the fourth single-layer portion.

8. The antenna device according to claim 1, further comprising:
    a third coil on the base material and including a third coil conductor and a third coil opening; wherein
    a plurality of coil openings are defined by the third coil conductor, and the plurality of coil openings includes coil openings in which generated magnetic fluxes have polarities opposite to each other; and
    a portion of the third coil overlaps the first coil opening of the first coil and the second coil opening of the second coil in the plan view with respect to the base material.

9. The antenna device according to claim 1, further comprising a first magnetic body facing the base material and overlapping the first coil conductor and the second coil conductor in the plan view of the base material.

10. The antenna device according to claim 9, wherein a portion of the second coil does not overlap the first magnetic body in the plan view of the base material.

11. The antenna device according to claim 10, wherein a portion of the second coil that does not overlap the first magnetic body in the plan view of the base material is in the first coil opening of the first coil conductor.

12. The antenna device according to claim 9, further comprising a second magnetic body overlapping the second coil conductor in the plan view of the base material.

13. The antenna device according to claim 12, wherein the first magnetic body has a shape that does not overlap the second magnetic body.

14. An electronic apparatus comprising:
    an antenna device; and
    a first system circuit and a second system circuit connected to the antenna device; wherein
    the antenna device includes:
        a base material including a first surface and a second surface opposed to each other;
        a first coil on the base material and including a first coil conductor and a first coil opening; and
        a second coil on the base material and including a second coil conductor and a second coil opening;

a portion of the first coil overlaps the second coil opening of the second coil conductor in a plan view with respect to the base material;

a portion of the second coil overlaps the first coil opening of the first coil conductor in the plan view with respect to the base material;

the first coil conductor is on the first surface and the second surface;

the first coil includes a portion in which the first coil conductor on the first surface and the first coil conductor on the second surface overlap each other in the plan view with respect to the base material, the first coil includes a first single-layer portion and a second single-layer portion in which the first coil conductor on the first surface and the first coil conductor on the second surface do not overlap each other in the plan view with respect to the base material, and the first coil conductor is only on the first surface of the base material; and a portion at which the second coil conductor intersects the first coil conductor is a portion of the second surface facing the first single-layer portion and a portion of the second surface facing the second single-layer portion in a plan view with respect to the base material.

15. The electronic apparatus according to claim 14, wherein an outer shape of the electronic apparatus includes a short-side direction; and among a plurality of coil openings defined by the second coil conductor, a center of gravity of each of the coil openings in which generated magnetic fluxes have polarities opposite to each other is in a central region obtained by dividing a region of the electronic apparatus into three equal or substantially equal portions in the short-side direction.

16. The electronic apparatus according to claim 14, wherein the first coil includes an extended conductor extending from an inner peripheral end of the first coil to an outer side of the first coil at a portion of the second surface facing the first single-layer portion or the second single-layer portion.

17. The electronic apparatus according to claim 14, wherein a portion of the second coil conductor is along an edge of the base material.

18. The electronic apparatus according to claim 14, wherein a plurality of coil openings are defined by the second coil conductor, and the plurality of coil openings includes coil openings in which generated magnetic fluxes have polarities opposite to each other.

19. The electronic apparatus according to claim 18, wherein in the second coil conductor, a line width of a portion that overlaps the first coil opening of the first coil conductor is larger than a line width of another portion.

20. The electronic apparatus according to claim 18, wherein sizes of the coil openings having the opposite polarities among the plurality of coil openings defined by the second coil conductor are different from each other.

* * * * *